(12) United States Patent
Richards

(10) Patent No.: US 11,538,050 B2
(45) Date of Patent: Dec. 27, 2022

(54) DYNAMIC SURVEY BASED ON TIME STAMPING

(71) Applicant: iHeartMedia Management Services, Inc., San Antonio, TX (US)

(72) Inventor: William Richards, Plano, TX (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/145,425

(22) Filed: Sep. 28, 2018

(65) Prior Publication Data

US 2019/0034946 A1 Jan. 31, 2019

Related U.S. Application Data

(63) Continuation of application No. 14/707,405, filed on May 8, 2015, now Pat. No. 10,089,643, which is a continuation of application No. 13/031,511, filed on Feb. 21, 2011, now Pat. No. 9,117,198.

(60) Provisional application No. 61/306,739, filed on Feb. 22, 2010.

(51) Int. Cl.
*G06Q 30/02* (2012.01)
*G06Q 10/10* (2012.01)

(52) U.S. Cl.
CPC ....... *G06Q 30/0203* (2013.01); *G06Q 10/103* (2013.01)

(58) Field of Classification Search
CPC .. G06Q 10/103; G06Q 30/0203; G06Q 30/30; G06Q 30/0277; G06Q 10/10; G06F 3/04812; G06F 3/0482; G06F 3/0484; G06F 3/0488; G07F 17/329; G07F 7/02; H04N 21/6582; H04N 21/25
See application file for complete search history.

(56) References Cited

U.S. PATENT DOCUMENTS

| | | | |
|---|---|---|---|
| 6,718,551 B1 * | 4/2004 | Swix | G06Q 30/02 348/E7.075 |
| 7,159,178 B2 * | 1/2007 | Vogt | G06Q 10/10 709/203 |
| 7,253,817 B1 * | 8/2007 | Plantec | G06Q 30/02 345/418 |
| 7,962,604 B1 * | 6/2011 | Morris | G06Q 30/0244 709/224 |

(Continued)

FOREIGN PATENT DOCUMENTS

WO WO-2010078539 A2 * 7/2010 ............. G06Q 30/02

*Primary Examiner* — Steven P Sax
(74) *Attorney, Agent, or Firm* — Garlick & Markison; Edward J. Marshall

(57) ABSTRACT

A hosting server streams a media item to a participant device, and receives from the participant device time-stamp information indicating an interaction time associated with a participant interaction with the media item. In response to receiving the time-stamp information, the hosting server determines, from the time-stamp information, a consumed portion of the media item. The consumed portion of the media item corresponds to a portion of the media item streamed to the participant device prior to the interaction time. A determination is made, based on the consumed portion of the media item, whether to transmit survey content to the participant device. In response to determining that survey content is to be presented, the survey content is transmitted to the participant device.

11 Claims, 90 Drawing Sheets

(56) References Cited

U.S. PATENT DOCUMENTS

| | | | |
|---|---|---|---|
| 8,560,350 B2* | 10/2013 | Nadai | G06Q 30/04 705/4 |
| 9,396,279 B1* | 7/2016 | O'Donnell | H04L 65/4007 |
| 2002/0112004 A1* | 8/2002 | Reid | H04L 29/06027 715/753 |
| 2002/0128898 A1 | 9/2002 | Leroy, Jr. et al. | |
| 2004/0073947 A1* | 4/2004 | Gupta | H04N 21/433 725/134 |
| 2004/0181747 A1* | 9/2004 | Hull | G06F 3/1204 715/202 |
| 2005/0185823 A1* | 8/2005 | Brown | G08B 13/19673 382/103 |
| 2005/0251820 A1* | 11/2005 | Stefanik | H04N 21/812 725/34 |
| 2006/0218070 A1* | 9/2006 | Lange | G06Q 30/08 705/37 |
| 2007/0143130 A1* | 6/2007 | Hearn | G06Q 10/10 386/326 |
| 2007/0195944 A1 | 8/2007 | Korenblit et al. | |
| 2008/0077517 A1 | 3/2008 | Sappington | |
| 2008/0114709 A1 | 5/2008 | Dixon et al. | |
| 2008/0189408 A1* | 8/2008 | Cancel | G06Q 10/04 709/224 |
| 2008/0243590 A1* | 10/2008 | Rich | G06Q 30/02 705/7.32 |
| 2008/0300967 A1* | 12/2008 | Buckley | G06Q 30/02 705/7.34 |
| 2009/0006180 A1* | 1/2009 | Hameen-Anttila | G06Q 30/0206 705/7.29 |
| 2009/0150917 A1* | 6/2009 | Huffman | H04H 60/32 725/9 |
| 2009/0204470 A1* | 8/2009 | Weyl | G06Q 10/06 705/7.13 |
| 2009/0232481 A1* | 9/2009 | Baalbergen | H04N 21/8455 386/328 |
| 2009/0287559 A1* | 11/2009 | Chen | G06Q 30/0222 705/14.23 |
| 2009/0287574 A1* | 11/2009 | Kane | G06Q 30/0277 705/14.73 |
| 2010/0077095 A1* | 3/2010 | Wong | H04N 21/6582 709/231 |
| 2010/0122293 A1* | 5/2010 | Craner | H04N 7/17318 725/40 |
| 2010/0161382 A1 | 6/2010 | Cole | |
| 2010/0332302 A1 | 12/2010 | Rotem et al. | |

* cited by examiner

| Format Most Used: | ☐ A/C - Hot ☑ A/C - Mainstream ☐ A/C |
| | ☑ Christian-Rock ☐ CHR-Pop |
| | ☑ CHR-Rhythmic ☑ Classic Hits ☑ C |
| | ☐ PPM-new WMA ☐ Urban ☑ VIDEO |
| Trendsetters: | A Top 20 % B Next 2 |
| Do you want to send out birthday greetings? | ⦿ Yes ○ No |
| Popup Configuration: | 50 % |

1702

Save

Survey Details

Name your survey*: Video hooks   Survey Description*: Testing video hooks   ☐ Default Survey
Survey Start Date*: Friday, October 09, 2009   Survey End Date*: Friday, November 27, 2009
☑ Allow answers from Unfamiliar users?   ☐ Forced Listening?   ☑ Auto Start?   ☐ Force User to Update Profile?
Minimum sign up age*: 12   Redirect URL: http://www.defaultclient.com   Popup Configuration*: 50 %
Display Media items in: ⦿ Order  ○ Random  ☑ Display Title?  ☑ Display Artist?
☑ Display Content Progress?  ☑ Display Overall Survey Progress Bar?

3800 → 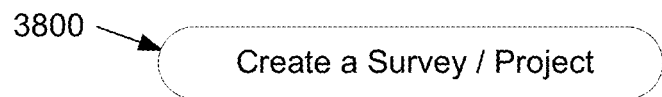
FIG. 38
3900 → Create New Survey
3902 → (+) New Survey
3904 → 📋 Copy A Survey Template
3906 → 📄 Copy An Existing Survey
FIG. 39
4000 → 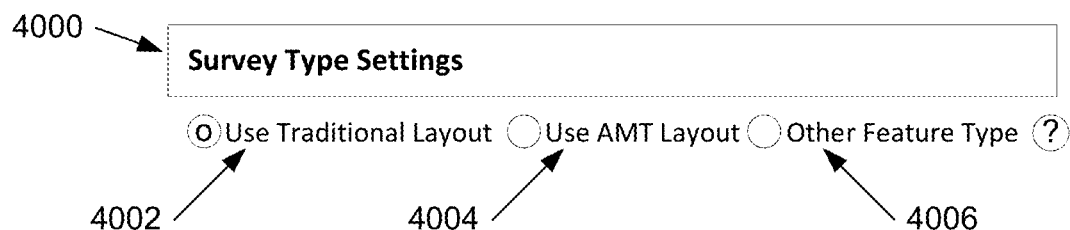
FIG. 40

Demographics Filters

Age Groups: ☐ 10-25 ☐ 12-54 ☐ 18-28 ☐ 30-45 ☐ 45-54 ☐ 50-60

Gender:
☐ Male   ☐ Female

Ethnicities (Race):
☐ Asian        ☐ Caucasian       ☐ Hispanic/Latino
☐ European     ☐ African-American

Behavioral Questions Based Filters

Of the following radio stations, which ones do you listen to on a regular basis? (P):
☐ Station 2   ☐ KISS-FM   ☐ Station 1
☐ Others Of all the stations listed, which one is your favorite? If you c station, just indicate that below. (P1):
☐ Station 2   ☐ KISS-FM
☐ Others      ☐ No P1

Do you have another station that you like about as much as your favorite station? If so, which one? (P2):
☐ Station 2   ☐ KISS-FM   ☐ Station 1

Of the following morning shows, which ones do you listen t (PAM):
☐ Morning Show 1   ☐ Morning Show 2

Statistical Questions

☐ Mean   ☐ Standard Deviation (St Dev)   ☐ Familiar (FAM%)   ☐ Not Familiar (UNF%)   ☐ Tired Of (Burn)   ☐ T/O-Little Less
☐ T/O-Lot Less   ☐ T/O-Never Again   ☐ TS AVG   ☐ TS%   ☐ Content Length

Report - Radio Face Off - Classic Songs

Participants Invited: 9  Completed: 3  Export:

STATION 1 - Classic Hits 1
Respondents: 3

| # | Content length | Artist | Title | Most switched song % | Station most switched to | Avg. length listening | Most Tune-Outs | Most Tune-Ins | Mean |
|---|---|---|---|---|---|---|---|---|---|
| 1 | 00:07 | America | Sister Golden Hair | 66% | Station2 | 00:02 | Looking Glass - Brandy (You're A Fine Girl) | | - |
| 2 | 00:07 | Bachman Turner Overdrive | You Ain't Seen Nothing Yet | 66% | Station2 | 00:03 | Rod Stewart - Maggie May | | - |
| 3 | 00:07 | Eagles | Take It Easy | 66% | Station2 | 00:03 | Whitesnake - Here I Go Again | Whitesnake - Here I Go Again | - |

STATION 2 - Classic Hits 2
Respondents: 3

TIME STAMPING - VIDEO (5)

| | | P12-54(5) | | | | | |
|---|---|---|---|---|---|---|---|
| # | Artist | Title | Mean | Farm% | T/O% | Content Length | Avg.Dump /Stop | Dump/Stop % | Total Duration |
| 1 | Beatles Rock Band | Demo (very short) | 4.44 | 80% | 20% | 00:20 | 00:21 | 105% | 00:17 |
| 2 | Beyonce | Single Ladies (Put A Ring On It) | 3.82 | 100% | 28% | 00:28 | 00:13 | 46% | 00:22 |
| 3 | Taylor Swift | Love Story | 3.29 | 60% | 25% | 00:25 | 00:06 | 24% | 00:14 |

| Media Items | Score | | Deviation Bob | | Deviation Julie | | Deviation Steve | | Deviation Josh | | Deviation Mary | | Deviation Bubba |
|---|---|---|---|---|---|---|---|---|---|---|---|---|---|
| Media 1 | 3.96 | 2 | 1.96 | 4 | 0.04 | 4 | 0.04 | 1 | 2.96 | 5 | 1.04 | 3 | 0.96 |
| Media 2 | 3.11 | 3 | 0.11 | 5 | 1.89 | 3 | 0.11 | 5 | 1.89 | 3 | 0.11 | 1 | 2.11 |
| Media 3 | 4.14 | 1 | 3.14 | 4 | 0.14 | 4 | 0.14 | 2 | 2.14 | 3 | 1.14 | 2 | 2.14 |
| Media 4 | 2.88 | 5 | 2.12 | 1 | 1.88 | 3 | 0.12 | 2 | 0.88 | 3 | 0.12 | 5 | 2.12 |
| Media 5 | 3.77 | 2 | 1.77 | 4 | 0.23 | 4 | 0.23 | 1 | 2.77 | 4 | 0.23 | 4 | 0.23 |
| Media 6 | 4.11 | 2 | 2.11 | 5 | 0.89 | 3 | 1.11 | 2 | 2.11 | 5 | 0.89 | 1 | 3.11 |
| Media 7 | 2.44 | 5 | 2.56 | 4 | 1.56 | 3 | 0.56 | 5 | 2.56 | 2 | 0.44 | 4 | 1.56 |
| | Total | | 13.77 | | 6.63 | | 8805 2.31 | | 15.31 | | 3.97 | | 12.23 |
| | | | Sixth | | Third | | First | | Fifth | | Second | | Fourth |

DYNAMIC SURVEY BASED ON TIME STAMPING

CROSS-REFERENCE TO RELATED APPLICATIONS

The present U.S. Utility Patent Application claims priority pursuant to 35 U.S.C. § 120 as a continuation of U.S. Utility application Ser. No. 14/707,405, entitled "LISTENER SURVEY TOOL WITH TIME STAMPING", filed May 8, 2015, scheduled to issue as U.S. Pat. No. 10,089,643 on Oct. 2, 2018, which is a continuation of U.S. Utility application Ser. No. 13/031,511, entitled, "LISTENER SURVEY TOOL WITH TIME STAMPING," filed Feb. 21, 2011, issued as U.S. Pat. No. 9,117,198 on Aug. 25, 2015, which claims priority pursuant to 35 U.S.C. § 119(e) to U.S. Provisional Application No. 61/306,739, entitled "LISTENER SURVEY TOOL WITH TIME STAMPING," filed Feb. 22, 2010, all of which are hereby incorporated herein by reference in their entirety and made part of the present U.S. Utility Patent Application for all purposes.

FIELD OF INVENTION

The present disclosure relates in general to automated surveys, and more particularly to dynamically presenting surveys based on Time Stamping.

BACKGROUND

Conventional software for media surveys may be generally centered around music hooks and basic questions. But such media surveys may not be compelling, engaging, and present a user-friendly interface that will keep clients participating more often, and create a better bond with the client. Conventional survey systems generally do not allow clients to conduct surveys using an all in one project. For example, Radio Face-Off and AMT is are separate tools, that do not provide an All-In-One solution for clients.

SUMMARY

Various embodiments of the present disclosure allow the formation of a system or method to provide feedback regarding a user's perception regarding a particular feature, content, or questions presented in a survey.

In one aspect of the disclosure, media is displayed on a remotely located end-user device and user interaction with the media is monitored via a computer, which also records a time-stamp that is based on the user interaction with the media. A survey based on the time stamp is displayed on the end-user device.

The media can include one or more of the following: audio, video, and website content. One or more of the following can be set: media available for display, one or more surveys, conditions for display of each survey, and filters for reports. The user interaction can include changing a media selection. In at least one embodiment, the user can select media for display and change media selection for display. The change of selection can be recorded. The display of the survey can be conditioned upon the percentage of the duration of the media observed by the user. Another survey can be displayed if the media runs for its full duration.

In at least one embodiment, the time stamp can record the amount of time that has passed between the initial display of media on the end-user device and the user's interaction with the media. The time stamp can also record the amount of time elapsed from an earlier-recorded time stamp to the user interaction with the media.

In at least one embodiment, the survey can record the user's answer to a query regarding the media and it can also record the user's answer to a query regarding the user interaction. The survey can include one or more of the following: Pop-up questions and stop questions.

User interactions and timestamps for a plurality of users can be recorded, and each user interaction record can be compared to those of the plurality of other users to determine how close each user is to the mean score. Users can be ranked based on the comparison. The interaction of a plurality of users can be recorded, and a report of user interactions can be displayed. A trendsetter algorithm can be applied to the user interaction record.

In at least one embodiment, the at least some of the above actions can be performed by a computer-readable media made of instructions for a computer processor to perform the actions.

In another aspect of the disclosure, a system can include media for one or more users to sample, a survey that a user may interact with relating to the media; and Time Stamping. Users can sample media sample using an end-user device to play the media made available electronically via the system. The display that a user may interact with can include a Pop-up screen displayed electronically on the end-user device. A user may interact with a survey using the input device of their computer. Time stamping records one or more of the user's actions with relation to the media or the survey, electronically monitoring and saving reaction times, which may then be used to generate a report for electronic transmission to the client sponsoring the survey.

The survey displayed can be determined by the reaction time stamp when a user takes some action.

The system can include a host server, a client computer, and a user/participant computer. The client computer can set up the media available for display, one or more surveys associated with the media, and conditions for display of each survey. The host computer can display media on the user/participant computer (remotely located from the host computer and the client computer), monitor user interaction with the media, record (in a user interaction record in a database) a time stamp based on a user interaction (optionally along with the user interaction), and display (on the user computer) a survey.

BRIEF DESCRIPTION OF THE DRAWINGS

Aspects of this disclosure will become apparent upon reading the following detailed description and upon reference to the accompanying drawings, in which like references may indicate similar elements:

FIG. 15 is a Pop-up question setup display according to various embodiments of the present disclosure;

FIG. 16 is a Pop-up question report display according to various embodiments of the present disclosure;

FIG. 17 is an account setup display according to various embodiments of the present disclosure;

FIG. 18 is a survey details setup display according to various embodiments of the present disclosure;

FIG. 38 is a button for creating a new survey according to various embodiments of the present disclosure;

FIG. 39 is a survey creation menu according to various embodiments of the present disclosure;

FIG. 40 is a survey type setting selection menu according to various embodiments of the present disclosure;

FIG. 41 is a survey details menu according to various embodiments of the present disclosure;

FIG. 45 is a user criteria menu according to various embodiments of the present disclosure;

FIG. 46 is a user invitation menu according to various embodiments of the present disclosure;

FIG. 49 is a demographics filter selection menu according to various embodiments of the present disclosure;

FIG. 50 is a behavioral questions based filter selection menu according to various embodiments of the present disclosure;

FIG. 51 is a statistical question selection menu according to various embodiments of the present disclosure;

FIG. 66 is a Face-Off report according to various embodiments of the present disclosure;

FIG. 76 is a survey station and question set menu according to various embodiments of the present disclosure;

DETAILED DESCRIPTION

Figure 1:
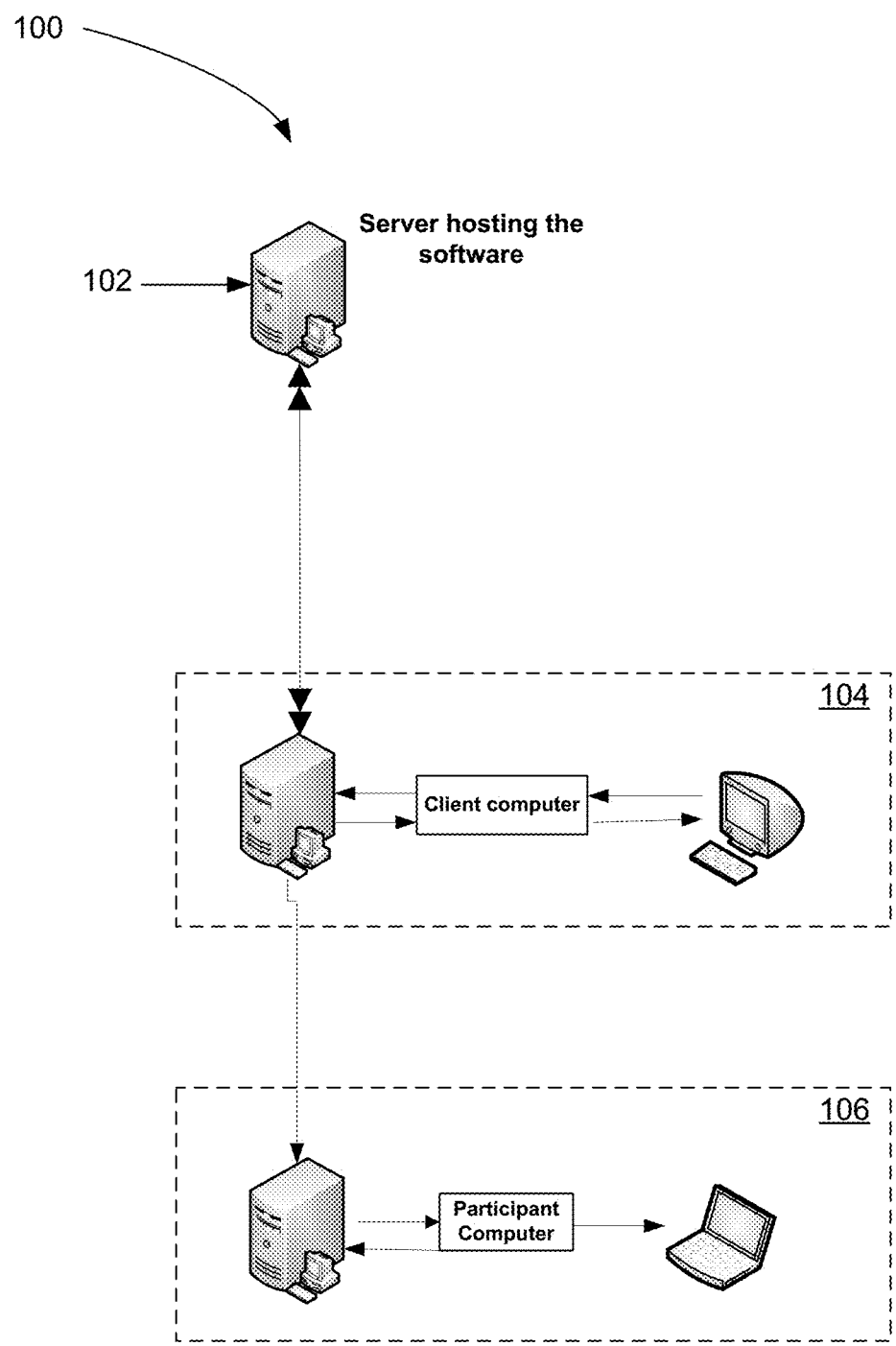
FIG. 1 is a diagram of a system according to various embodiments of the present disclosure.

The following is a detailed description of embodiments of the disclosure depicted in the accompanying drawings. The embodiments are described in such detail as to clearly communicate to one of ordinary skill how to make and use the claimed invention. However, the amount of detail offered is not intended to limit the anticipated variations of embodiments; on the contrary, the intention is to cover all modifications, equivalents, and alternatives falling within the spirit and scope of the present disclosure as defined by the appended claims.

Various embodiments of this invention can gauge the participants/consumer's feelings about the particular feature, content and related questions being presented in a survey through the use of the variety of functions and features such as Time Stamping, Pop-up question(s), and capturing of data, all of which helps clients take this information and make decisions based on this information, and make their products more appealing. As covered, these processes allow for much more in-depth ways of learning more information than currently exists through the various features and functions contained and described herein. "Reaction times" (which a participant doesn't see—it is tracked mechanically via the software), the question(s) that might be asked (at client's discretion), and the reporting of the findings for a survey, which will help the client improve their products.

This software is a multi-tiered program that allows clients to test not only music or videos or images, but it also allows them to test their websites through the use of URL's which are part of a survey. Also, the additional features such as On-Line AMT's via Streaming, (AMT stands for Auditorium Music Test in a traditional research platform) allow the client to test beyond current measures. And the streaming for the radio Face-Off (or individual station) could use Time Stamping question-asking functionality. Additionally, the software tracks How Long it takes a participant to respond, and then asks follow-up question(s) on what a client wants more feedback on. Through the use of the Radio Face-Off, clients can utilize a Real-World environment simulated feel for participants showing a car radio with station presets on them, to get better information by tracking how long a participant stays on a station, (time-stamp), but also tracks where they switch (tune out), and the station they go to (tune-in), and can also ask questions when they switch to find out Why. With other content, audio, or video being tested, we time-stamp WHEN a participant first responds to questions. We track the start, stop or first respond, and total duration for these content items. By also providing Pop-up questions within the software as described, it allows clients to dig deeper and know more. To be able to test websites, content such as audio, video, and images, and the many features and functions described herein, allows clients to make their surveys more compelling, and engaging for the participant, which keeps them more inclined to participate more often, as well as providing more feedback than before through these features and functions, allows them to get more actionable information to improve their products. Through the added use of Time Stamping, and being able to eliminate participants who don't listen a "minimum average listen" amount of time, the results can be made more reliable. Right now, no one really knows how long participants listen before responding, or whether participants even listened at all.

The system/method provided by software running on a computer and/or servers, utilizes a number of features that provide clients with more data than can be captured using traditional survey methods. Using a combination of features described herein, the software captures the time in which it takes a participant to respond to various content being presented through the use of "Time Stamping".

In some embodiments, a client sets up surveys using the software which allows for a variety of ways to measure the results. For Weblinks testing, a participant (or "user") is given a URL (website address) within the survey itself and asked to find and review either the website in its entirety, or a particular area of the URL address given. Once the user has reviewed the URL accordingly, they click a button ("I Found It"), or ("I'm Finished") or whatever name they want for the button. Once that button is clicked, the system denotes the time taken from first entering the site/URL and when the button is clicked. This "Time-Stamp" is captured. Subsequent question(s) created by the client are then asked of the participant. For other content such as audio and video, Time Stamping captures the response time for other elements of content such as songs, song-hooks, or other audio, as well as videos such as music, movies, or other media.

In some embodiments, the system enables removal of users from the reports if they don't listen for at least a certain quantity of time. The "Minimum Average Listen" functionality allows clients to weed out participants who aren't listening to content for at least a certain quantity of time. We believe that there are participants who may go through a survey quickly without really being actively engaged either for the purpose of qualifying for an Award the client is offering for completing a survey (trying to win), or they might be a competitor signing up to try and taint the results by not listening. Until now, clients couldn't really know when participants respond, how much they listen, or if they even listened at all to content on a survey.

Further, through the use of Time Stamping and reaction times, the system has a function called "Set Pop-Up Percentage", a setting that further adds value to a client. A client can set the Pop-up percentage for every item on a test, or individual pieces of content. For example, if a client has a one-minute segment of content (audio, video, stream, podcast, or other type of content being measured), and sets the Pop-up percentage at 50% (or any percentage they want between 1 and 99), the system knows to fire question(s) at any time before 30 seconds have passed (or 50% in this case). If the user listens/views for more than 30 seconds (50%), then there wouldn't be any Pop-up presented to the participant based on their "reaction time". Described herein is also the technical process with which that happens. This allows the clients to get more information than could otherwise be gathered which helps them make better decisions on the content, which helps improve their business and their product(s).

The Time Stamping and Pop-up percentage is also utilized in the Radio Face-Off feature as well as Face-Offs for Audio, Video, Image, or any type of content being faced-off. The Radio Face-Off setup allows media clients to test music, or other content which are uploaded into the survey for users, described herein. Users are asked to listen to the radio as they would in listening in a car or other device which has radio station presets. The stations are named by the client when setting up the feature. Users are asked to listen normally or based on the instructions the client provides as part of the survey. The instructions can vary depending on the client and the content being presented to users. The goal is to measure how long a user spends on a particular station and the audio being presented. The user can switch stations at any time (tune-out), and the system will keep track of this in a variety of ways described herein, such as how long the user listened before tuning out, what station the user switched to. Also the station being switched from (tune in). The system can measure the Time (Time Stamps) on the item being heard, and then track the tune-out, meaning which station the user tuned out to if the user switched stations before content had ended. Conversely, the system tracks the "tune-ins" to the station being switched to. Further, clients can create questions when a station is switched which allow the client to get even more detailed information to improve the client's products.

Questions "Pop-up" in a similar fashion to other content described herein, though it is only based on stations being switched, not their reaction time, though the system can track the reaction time as contained and explained herein. This is a client option and can be set to come up only on particular pieces of content, or all content for each station that has been uploaded in the survey setup with this feature.

With every feature described, instructions are given to instruct the user as to what the client is asking them to do. Also, the software can allow clients to "stream" audio into a survey, which is setup and defined in survey setup with various options described herein, which allows users to hear the streaming audio when they participate in a survey that includes the AMT (Stream) feature. This allows clients to test music or audio, and collect data information as described herein.

In some embodiments, the streaming portion could be incorporated into a Radio Face-Off feature which can capture data from the stream and track when users switch stations, which content was playing (being streamed) and ask one or more questions (if desired by the client) about why they switched stations. The Face-Off feature could include multiple audio streams, one for each station being tested. The manner in which this happens could use the streaming data that would allow a user listening to a radio station on a more modern radio system which displays the content being played (displayed on the user's radio) to be tied into the system so that the system or the client can know what content was playing, denote when the user switched (Time Stamping, how far into the content, or when they switched) and then be able to ask questions (if desired by the client) and report that information in results (reports).

Streaming technology, including a "direct link to the system" or the "imbed code to the player" or the like, could allow the collection of data from the streaming code of a station. The streaming/Time Stamping and ability to ask questions could also be used within the system more than just for the Radio Face-Off. This can be a valuable function with the radio industry. For example, this ability could be used with the Portable People Meter (PPM) with Arbitron, which captures real listening for respondents who agree to participate in the rating gathering methodology, by being able to utilize a larger database size and by being able to ask why participants switched, among many additional advantages that can capitalize on the radio ratings service and how ratings are derived in a growing number of radio markets.

Additionally, the software tracks "Trendsetters" by using an algorithm that compares each user's performance against their peers. The software checks the results for each piece of content being tested and compares the overall result to each user. When a user does well by being close to the Mean score (scale question), or other types of questions such as Multiple Choice-Select One or Multiple Choice-select All, the better they are as "Trendsetters". This can help clients identify those users who are better at predicting content among their peers (those who also participate in surveys), which makes their input more valuable. Clients can screen in, and out, these Trendsetters for surveys as well as reports. In addition, some embodiments of the software can show a user who gives the same score again and again (e.g. 5-5-5-5-5-5-5-5-5-5-5-, etc.), or a sequence of (e.g. 1-2-3-4-5-1-2-3-4-5, etc.), or some other type of patterned response, as the software can identify individual raters for each piece of content. Generally, such users would end up in the lower tier of Trendsetters who likely are far off the mean by utilizing some pattern. This is why having the ability to set Trendsetters by up to five levels (which are totally customizable for each level), such as Top 10%, next 10%, next 30%, next 25%, and next 25% for example, allows a client to search by the top Trendsetters, or even by the bottom. Aside from enabling a client to know who its weakest raters are, the software can be helpful when looking at results or deciding which users should be sent a survey or email or some other type of communication.

Technical Requirements of Preferred Embodiment

The software resides on a server (or client—with the proper software). It's hosted presently at Crystal Tech server, which is a dedicated server. A quad core server with mirrored SAS drives and 4 gigs of ram. (More detailed technical specs can be provided). The software is built with .Net 3.5. Microsoft SQL Server 2008 is used as the backend. The software being used to collect data is SQL. The results from the various tests are stored on the server via SQL data collection tables. The development would be 3 tier with the presentation, business logic and the data layers separate. The system is deployed on a dedicated Windows 2008 server with a professional hosting company. A separate version is available that can be sold to the station to be deployed by the stations technical team. Popup and/or Stop questions are shown via java-scripting.

Referring first to FIG. 1, some embodiments of the system are illustrated and discussed. The system 100 can include a server 102 hosting the software, which is communicatively coupled to a client computer 104, which itself is communicatively coupled to a user computer 106. In the illustrated embodiment of FIG. 1, the server 102 hosting the software is where the software resides. The server stores all the data, from the Administrator setting up to the client, questions, survey and report templates, and many other facets of the software, as well as the client and user data. In the illustrated embodiment, the Administrator sets up the system-wide functions and features for user by the client, sets up the client, and manages the system. The client can perform various actions including creating questions, uploading content, creating surveys, sending surveys to the user, viewing results as the user finishes surveys, making decisions regarding what to play, display, discuss, or making other product adjustments based on the feedback. In some embodiments, the user signs up, receives a survey invitation, and then participates in a survey.

Figure 2:
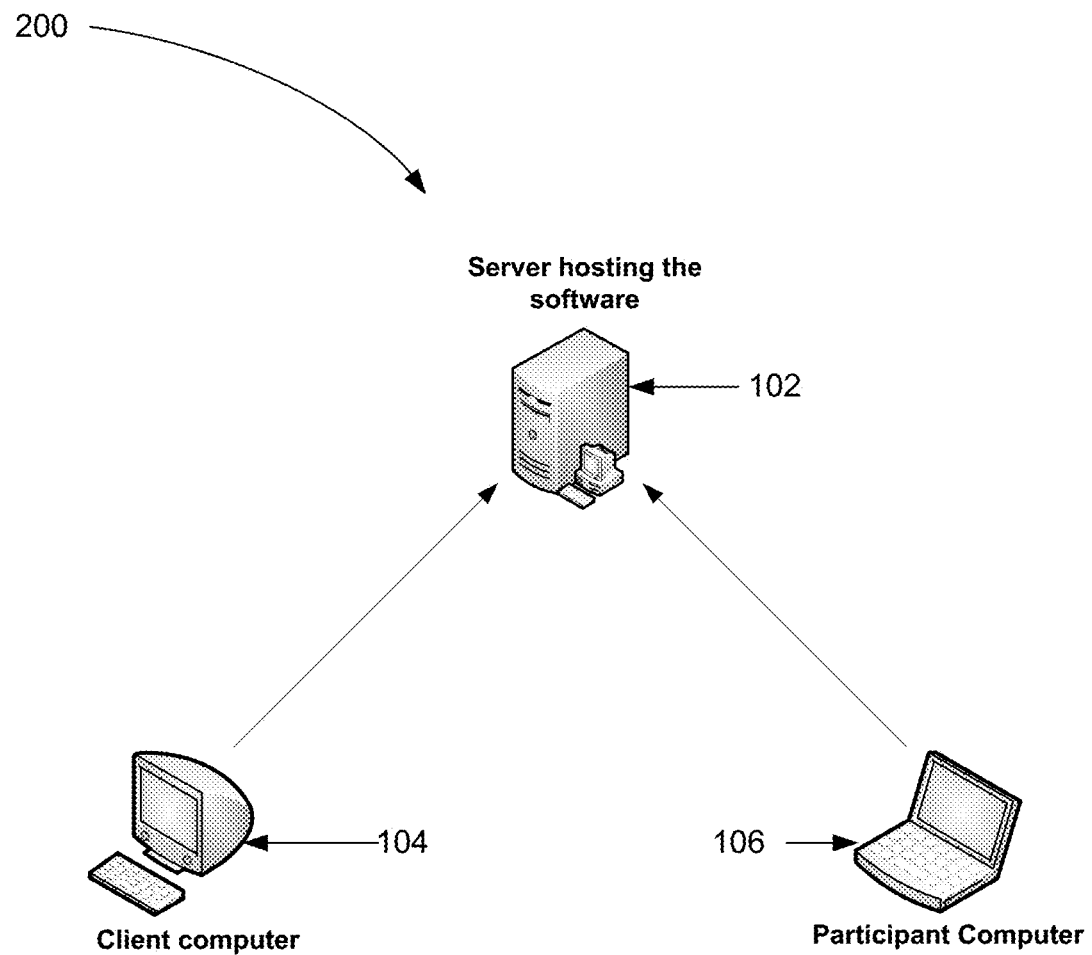
FIG. 2 is a diagram of a system according to various embodiments of the present disclosure.

Referring now to FIG. 2, some embodiments of the system are illustrated and discussed. The system 200 can include a server 102 hosting the software, which is communicatively coupled to both a client computer 104 and a user computer 106. In some embodiments, the client can perform various actions including creating questions, uploading content, creating surveys, sending surveys to the user, viewing results as the user finishes surveys, making decisions regarding what to play, display, discuss, or making other product adjustments based on the feedback. In some embodiments, the user signs up, receives a survey invitation, and then participates in a survey.

Figure 3:
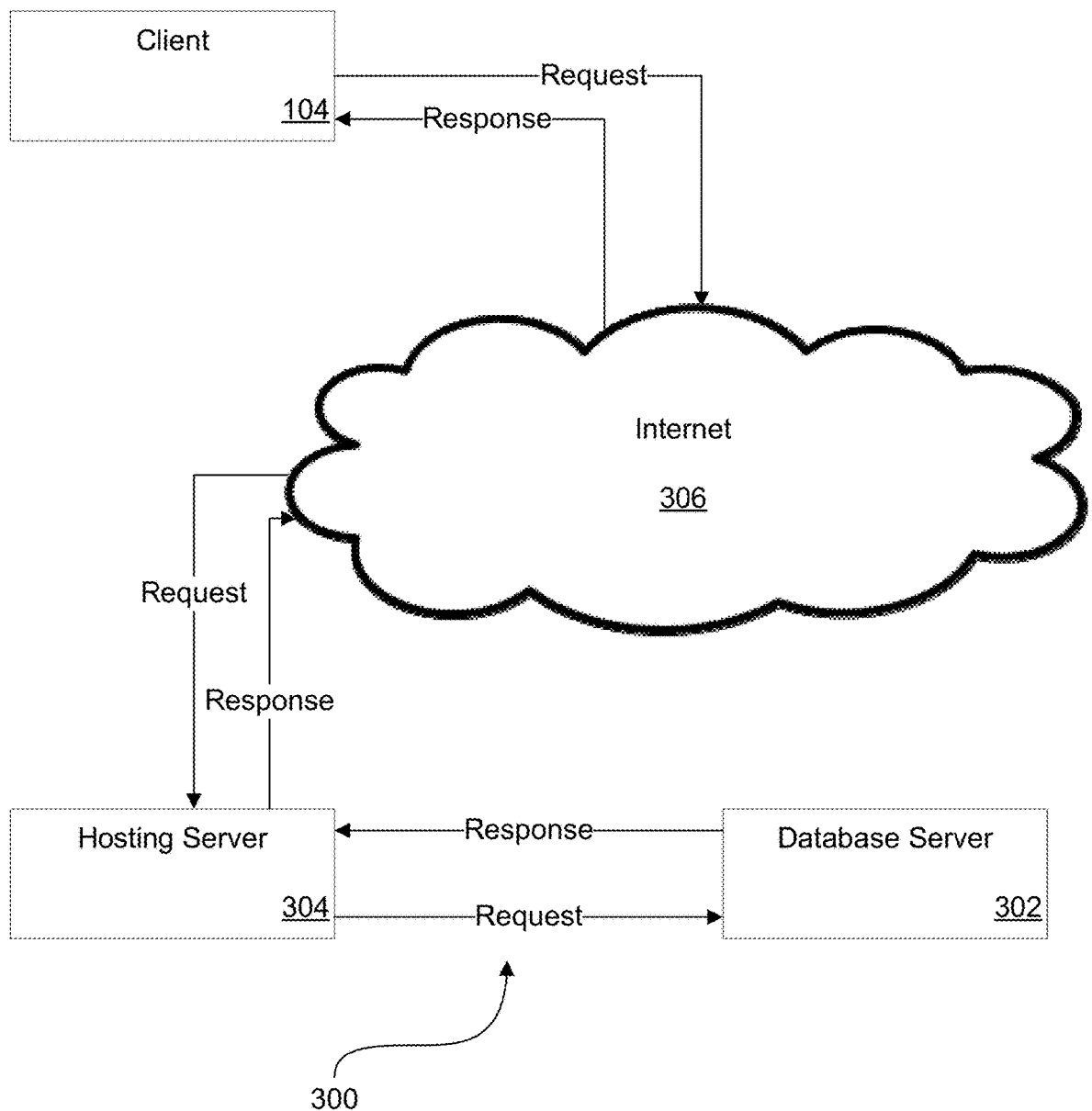
FIG. 3 is a diagram of a system according to various embodiments of the present disclosure.

Referring now to FIG. 3, some embodiments of the system 300 are illustrated and discussed. The database server 302 is communicatively coupled to the hosting server 304 and can send requests and receive responses from the hosting server 304. The hosting server 304 can communicate with a client 104 over a network 306 which can include the Internet. The hosting server 304 can send requests to the client 104 over the network 306 and receive responses from the client 104 over the network.

Figure 4:
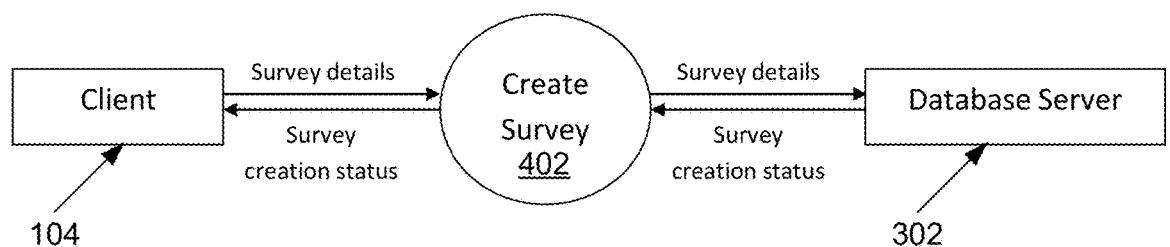
FIG. 4 is a flowchart of process data flow in the system according to various embodiments of the present disclosure.

FIG. 4 illustrates some embodiments of process data flow in the system related to the creation 402 of a survey. The client 104 provides survey details, which are communicated to the database server 302, and the database server 302 provides a creation status of the survey, which is communicated to the client 104.

Figure 5:
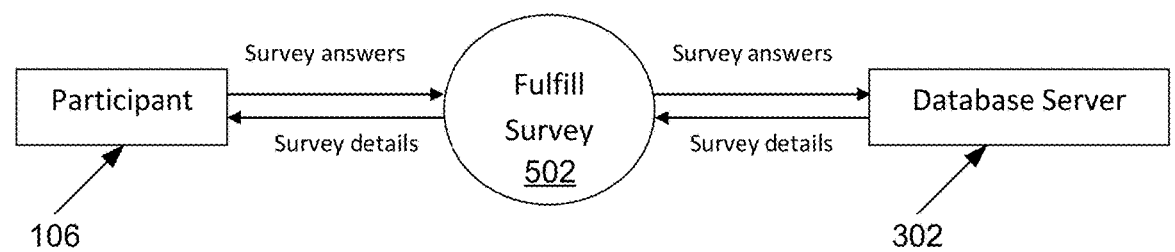
FIG. 5 is a flowchart of process data flow in the system according to various embodiments of the present disclosure.

FIG. 5 illustrates some embodiments of process data flow in the system related to a user's participation in fulfilling 502 a survey. The database server 302 provides survey details, which are communicated to the user 106, and the user 106 provides survey answers, which are communicated to the database server 302.

Figure 6:
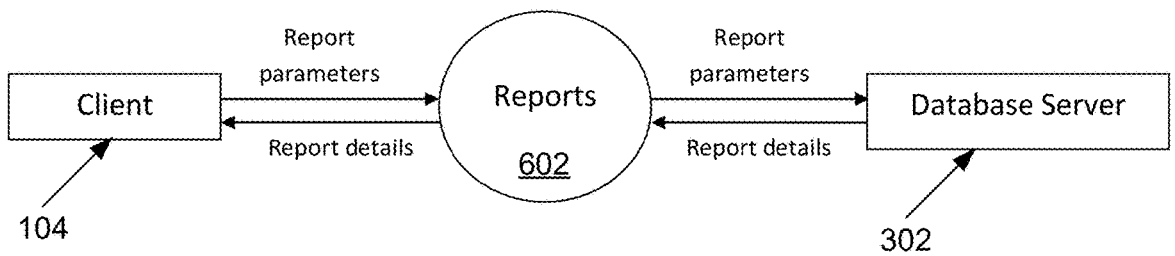
FIG. 6 is a flowchart of process data flow in the system according to various embodiments of the present disclosure.

FIG. 6 illustrates some embodiments of process data flow in the system related to the generation of reports 602. The database server 302 provides report details, which are communicated to the client 104, and the client 104 provides report parameters, which are communicated to the database server 302.

Figure 7:
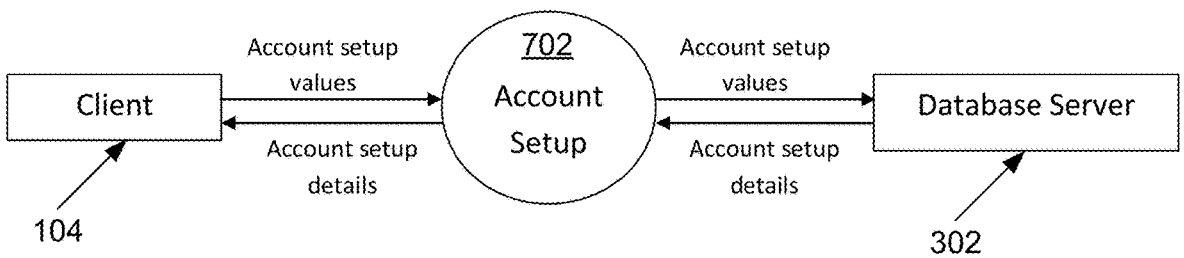
FIG. 7 is a flowchart of process data flow in the system according to various embodiments of the present disclosure.

FIG. 7 illustrates some embodiments of process data flow in the system related to a client setting up 702 an account. The database server 302 provides account setup details, which are communicated to the client 104, and the client 104 provides account setup values, which are communicated to the database server 302.

Time Stamping

The system or method typically implemented by software running on one or more general-purpose computers or servers or one or more specific purpose computers is designed to capture listener opinions about the content being presented to them in various forms. To that end, the system or method tracks Time-Stamped Reaction Times of the user, Pop-up feedback, and data collection from users. Clients can take these findings and use them to made decisions to improve their products.

Time Stamping can include tracking time elapsed between Start and Stop actions, Pausing actions, Response Actions, or the total duration of an event or content being tested. Time Stamping can be utilized in website testing, also known as "Weblinks", which involves tracking how long a user takes to find something on a client web site from the URL that they are given in a survey. Time Stamping can also include testing audio, video, and Face-Offs.

Pop-up feedback can include setting Pop-up percentages or through the use of Stop Questions.

The process of gathering this information, and presenting the results in a variety of reports and displays for clients is meant to help clients fine-tune their content, whether it's audio, video, images, streaming or websites, through the use of Time Stamping and Pop-ups (which is a JavaScript function) as well as information collected from answering questions with these functions, as well as traditional collection of data from questions. This is meant to work to analyze the results and improve client products, whether it's radio, Internet websites, Television, Newspapers or other media that would be able to use our software.

The Time Stamping process is meant to measure the time it takes a respondent (user taking the survey) takes to respond to a particular item being tested, as well as the total duration. These Time-stamping reaction times would include content such as audio, video, Website URLs, and Face-Offs. Audio content can include music, commercials, radio features, morning shows, podcasts, or any audio content that is uploadable to software. Video content can include music videos, television commercials, television shows, movie trailers, online streaming videos, or any uploadable video to software. Face-Offs can include Radio Face-Offs, audio Face-Offs, Video Face-Offs, or Image Face-Offs. Radio Face-Offs could use song hooks, live streams of radio station audio content, or other audio content.

Time Stamping information is collected by tracking 1) the start of a content item, 2) the first reaction a user has to the content item, whether or not the reaction comes within the content itself (such as a user not responding to a 30-second commercial until after the commercial has ended), and 3) the total duration of time it takes a user to finish scoring and responding to each item being auditioned. The Time Stamping information is collected on the server running the software, as per technical specifications above. SQL stores the information and the client then views the results in the various reports available in the system.

Figure 8:
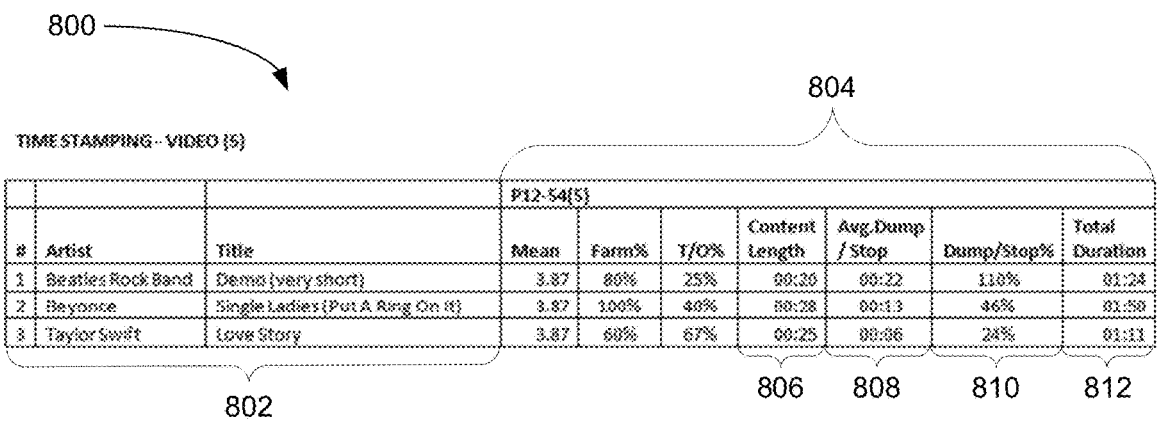
FIG. 8 is a Time Stamping report according to various embodiments of the present disclosure.

In an embodiment shown in FIG. 8, a chart 800 of Time Stamping information for several media items 802 and a single demographic 804 includes Content Length 806, Average Dump/Stop 808, the percentage 810 of the content length 806 that the Average Dump/Stop 808 represents, and the Total duration 812.

Figure 9:
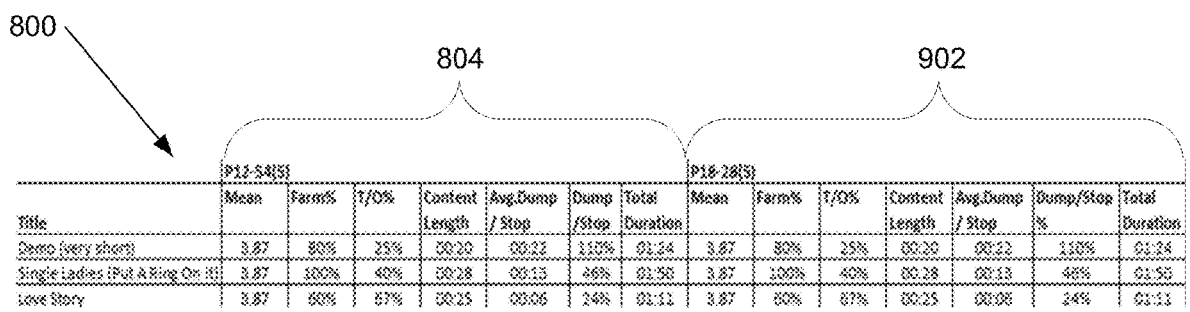
FIG. 9 is a Time Stamping report according to various embodiments of the present disclosure.

Time Stamping can be presented in different ways, depending upon what the client chooses. This is accomplished by the client selecting the demographic they want to view. For example, in the embodiment illustrated in FIG. 9, an additional demographic 902 has been selected. Demographics are selected based on the criteria filter area of the report configuration page. In the embodiment illustrated in FIG. 9, the demographics are from the beta-client. Demographics are set in two ways: 1) System administration sets demographics for user across the system for all clients, and 2) each individual client sets demographics at their discretion.

In some embodiments, reaction time between events is collected. For example, if there were five (5) questions for a song hook being listened to, the first response would be the reaction time, and each subsequent response's time is reset, and the total time of each is then added together until the "NEXT" button is hit, which is the total duration.

Figure 10:
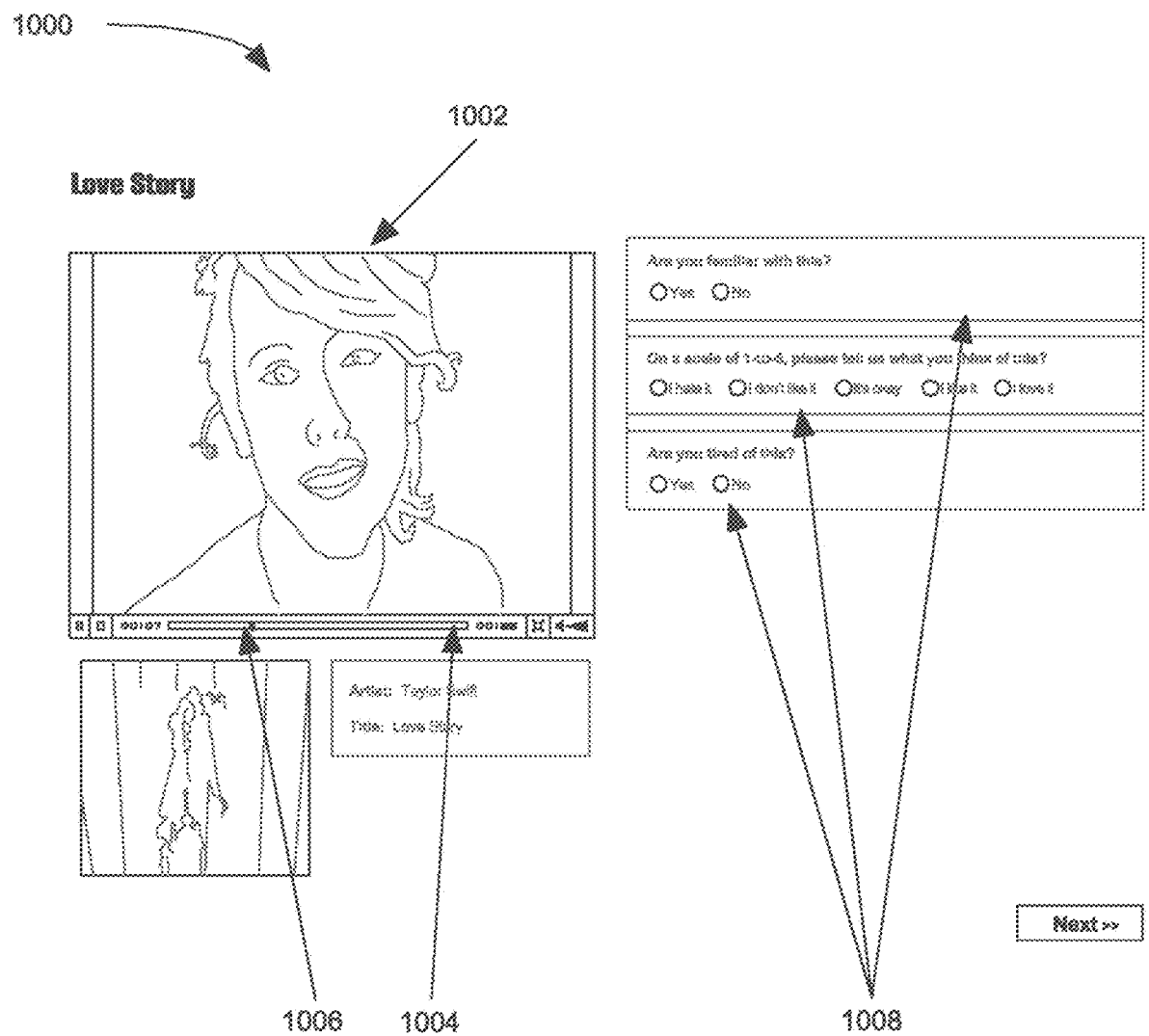
FIG. 10 is a user display according to various embodiments of the present disclosure.

Referring to FIG. 10, an embodiment of the display 1000 that a user would perceive when Time Stamping is utilized is illustrated and discussed. In some embodiments, at least some parts of Time Stamping functionality would not be visible to users, as Time Stamping information would be collected automatically by the system. In some embodiments, Pop-ups would appear if applicable for the content item, and if set by the client.

In the illustrated embodiment shown in FIG. 10, the display 1000 can include content 1002, content length 1004, progress 1006, and questions 1008. Time Stamping can be calculated from several points including the "start" of the playing of content, to a user's reaction (either by stopping or pausing, or answering any of the questions 1008, as well as the total duration of the content.

Figure 11:
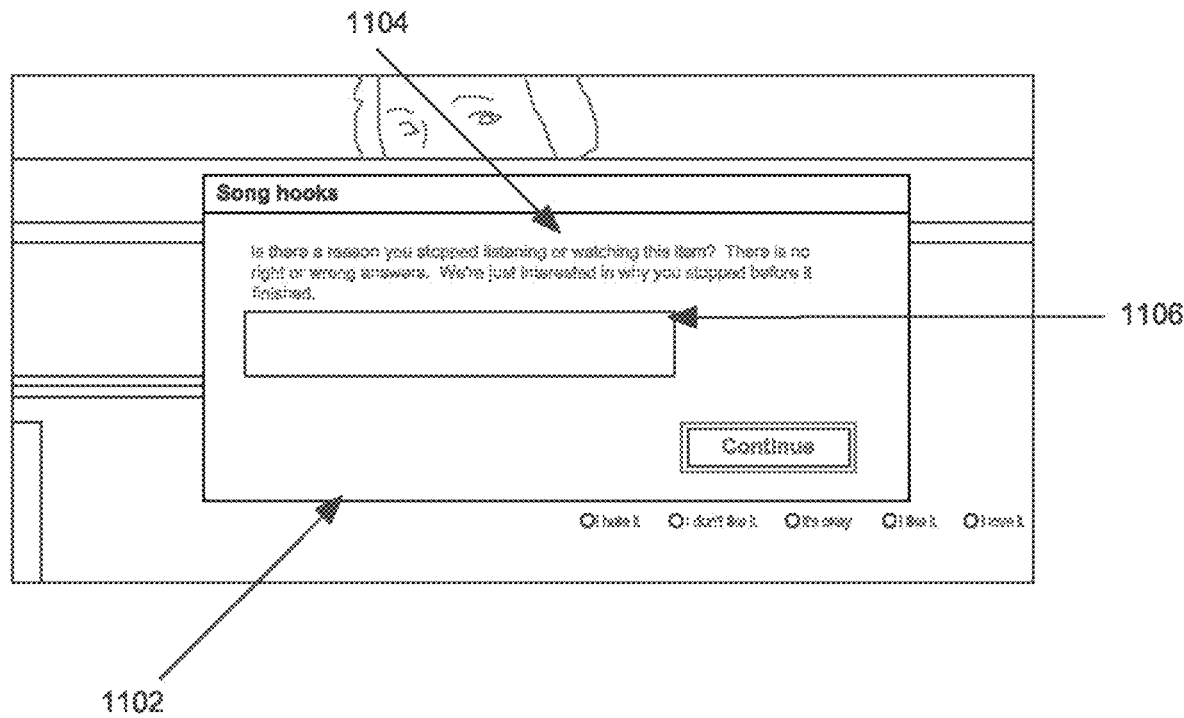
FIG. 11 is a Pop-up display according to various embodiments of the present disclosure.

In the illustrated embodiment of FIG. 11, if the client set the Pop-up percentage to be, for example, 50% on a two-minute piece of content and a participant didn't listen to at least 50% of it (or one minute), then a Pop-up 1102 would display. The Pop-up can be Java-scripted. The Pop-up can include one or more questions 1104, and can be any type of question in the system. The user can respond to a question 1104 by entering an answer in a field 1106.

Figure 12:
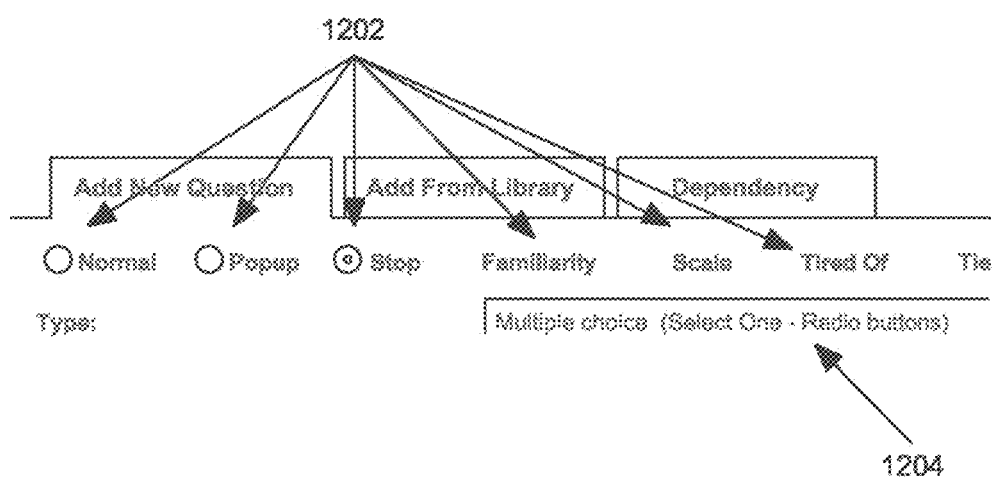
FIG. 12 is a question setup display according to various embodiments of the present disclosure.

As shown in FIG. 12, in some embodiments, a client can create Normal, Pop-up, Stop, Familiarity, Scale, Tired of, or some other type of question by selecting the type from one of the selections choices 1202 available. In addition, a client can create additional subtypes of questions including multiple choice-select one, multiple choice-select all that apply, scale, open-ended comment boxes, hot/not, or any other types of questions by interacting with a menu 1204.

A client can ask any question, or questions, they want. And the Pop-up for STOP question (if created for the survey and content being tested) would differ from what the Pop-up question would be. However, the Pop-up that is shown would be dependent on whether the user hit the stop button (thus stopping the content), or simply started answering questions. If the user stopped the content, then they would get the stop question (but only if a client set it up to be used); if they hit a question the content would continue playing.

The "popup or stop" question data is collected from user responses and stored on the server using the technical requirements. The Pop-up and stop questions can be any type of question the client wants. The "java-scripting" is simply the manner by which the questions are presented. The difference between Stop and Popups can be described as follows:

Pop-up question(s): These are tied with the "Set popup Percentage" as described in this document. A client sets the Pop-up percentage and only when those criteria are met do any Pop-up questions display using java-scripting.

Stop Question(s): These are only shown if a participant actually "Stops" the player on the content they are listening to.

And the Pop-up and/or Stop questions can be any type of question as shown.

Figure 13:
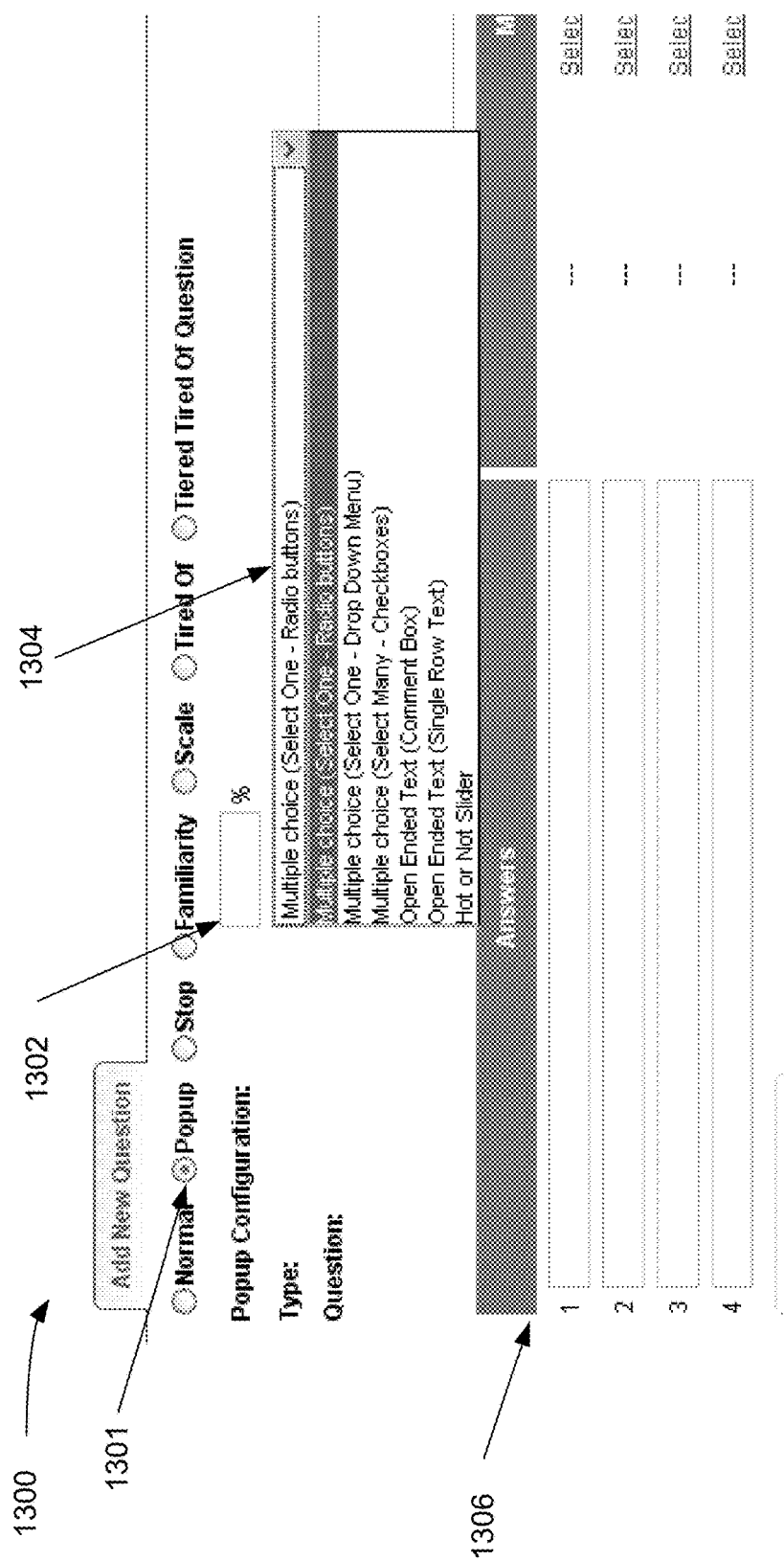
FIG. 13 is a question setup display according to various embodiments of the present disclosure.

Shown in FIG. 13 is the display 1300 for adding a new survey question, where a client has selected the Pop-up question selection 1301. In the illustrated state of the display, the Popup Configuration over-ride 1302 as well as the question type drop-down menu 1304 is present, along with a field 1306 that the client can use to enter answers that a client would use for choices. As also shown in the illustrated embodiment of FIG. 13, a client can select 1308 questions to be mandatory or optional.

Figure 14:
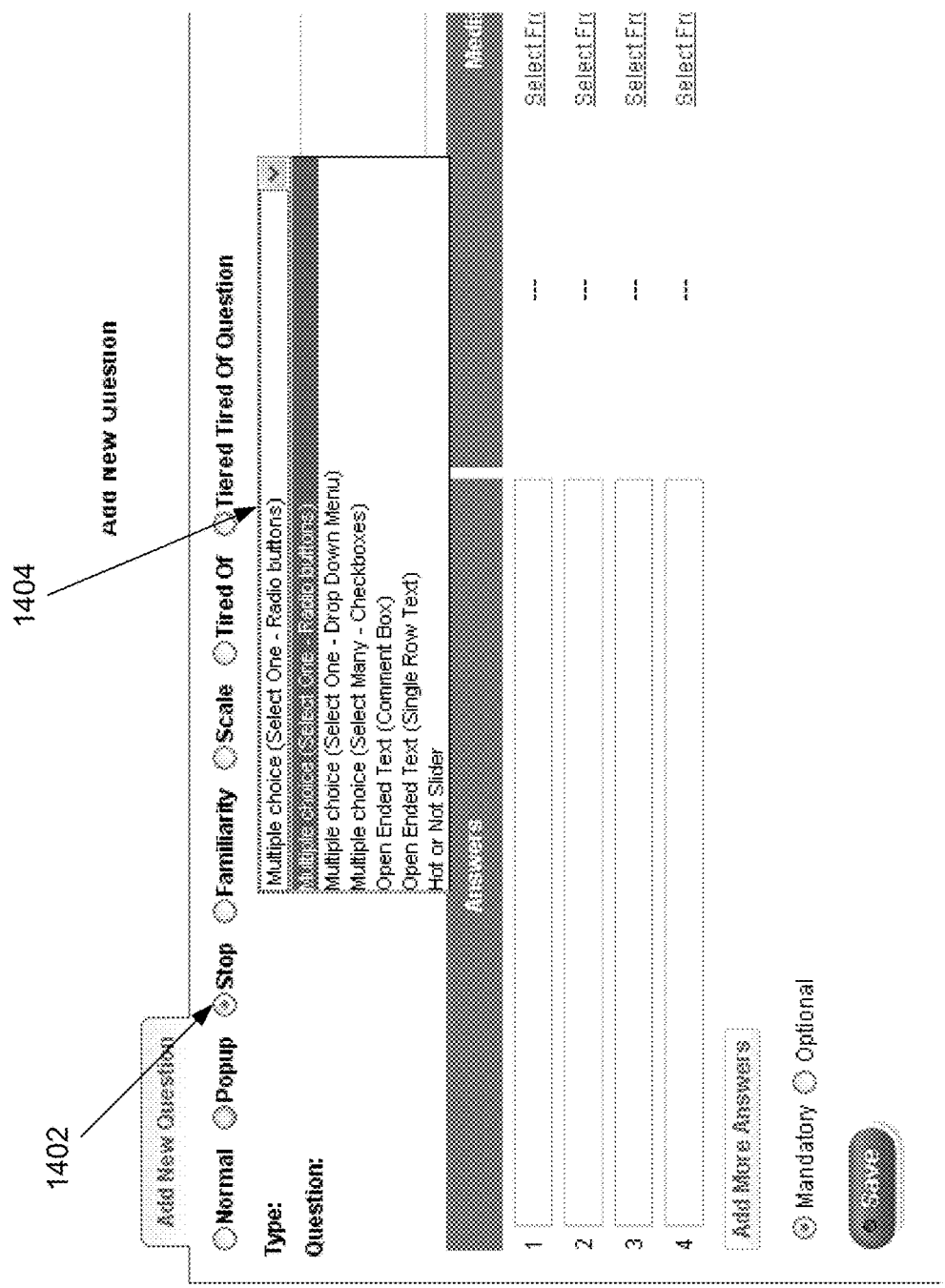
FIG. 14 is a question setup display according to various embodiments of the present disclosure.

As shown in FIG. 14, when the Stop question is selected 1402, multiple question types can be selected from a drop-down menu 1404.

Figures 15, 16:
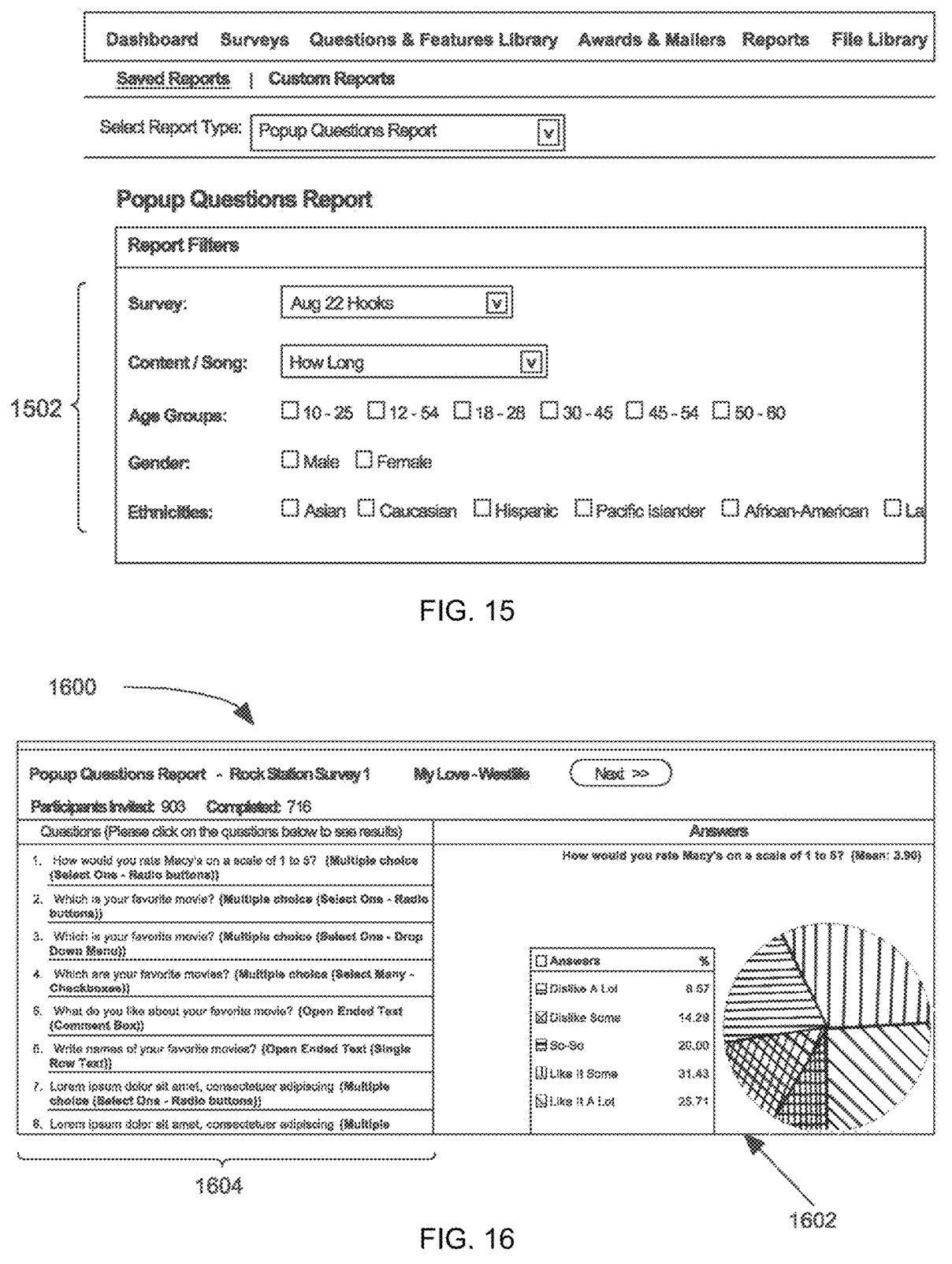

As shown in FIG. 15, an embodiment of the system collects all the user responses, which are made available in various reports in the system. In the illustrated embodiment, a client can select report filters 1502 for a Pop-up report. In some embodiments, such as the illustrated embodiment, the filters 1502 can include a specific survey, specific content, user demographics such as age groups, user genders, and user ethnicities, or other filters.

As shown in FIG. 16, the results 1600 of a selected report can be displayed and can include a list 1604 of questions that can be selected to generate a graph 1602. A Stop Report can be generated in a similar manner as the illustrated embodiments discussed above.

Time Stamping is set in the system. It is automatic as described below, and cannot be altered by the client. However, the Pop-up percentage can be set by clients. In order to use the Pop-up function, a client needs to use it, or not use it, at their discretion for a project.

FIG. 17 illustrates an embodiment of a window 1700 used by a client to set up an account. A Pop-up configuration 1702 can be set by default so that, if a client wants to always set the Pop-up to come up at a default percentage of the content being tested, it will do so.

FIG. 18 illustrates an embodiment where the Pop-up configuration 1802 can be included in a Survey Details window 1800 and set when a survey is being set up.

Figures 19, 20:
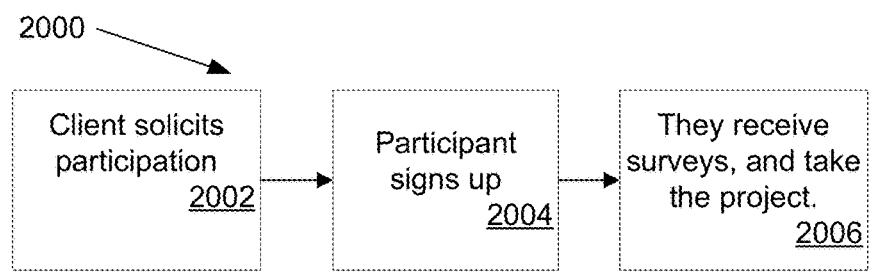
FIG. 19 is a question setup display according to various embodiments of the present disclosure.
FIG. 20 is a user participation flowchart according to various embodiments of the present disclosure.

FIG. 19 illustrates an embodiment where the Pop-up configuration 1902 can be set for an individual content item being tested. This can be done through the use of Pop-up questions which can be created on an individual piece of content.

As shown in the process 2000 illustrated in FIG. 20, once this information is set for a survey, and questions are set, then a participant will be sent the survey project 2006 upon responding to the client's solicitation 2002 for participation by signing up 2004. When a survey is sent, and participants take the survey project 2006, then various content and features are presented, depending on what the client has set up. The information for Time Stamping is stored on the server utilizing technical specifications as described above.

Showing Time Stamping

Figure 21:
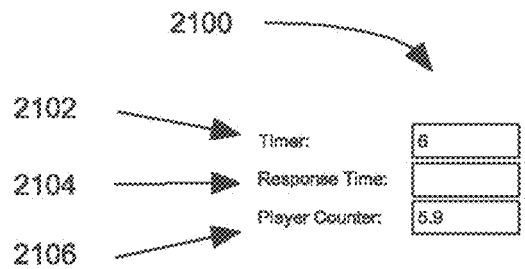
FIG. 21 is a Time Stamping screen according to various embodiments of the present disclosure.

As shown in FIG. 21, Time Stamping data can be presented in the illustrated screen 2100. The Timer 2102 tracks the elapsed time for each event, which can then be cumulatively added to reach the Total Duration. The Response Time 2104 can show at what elapsed time a user "does" something, which can include Stopping content, pausing content, or answering the first question. The Player Counter 2106 can show the duration for a particular item of content.

Figure 22:
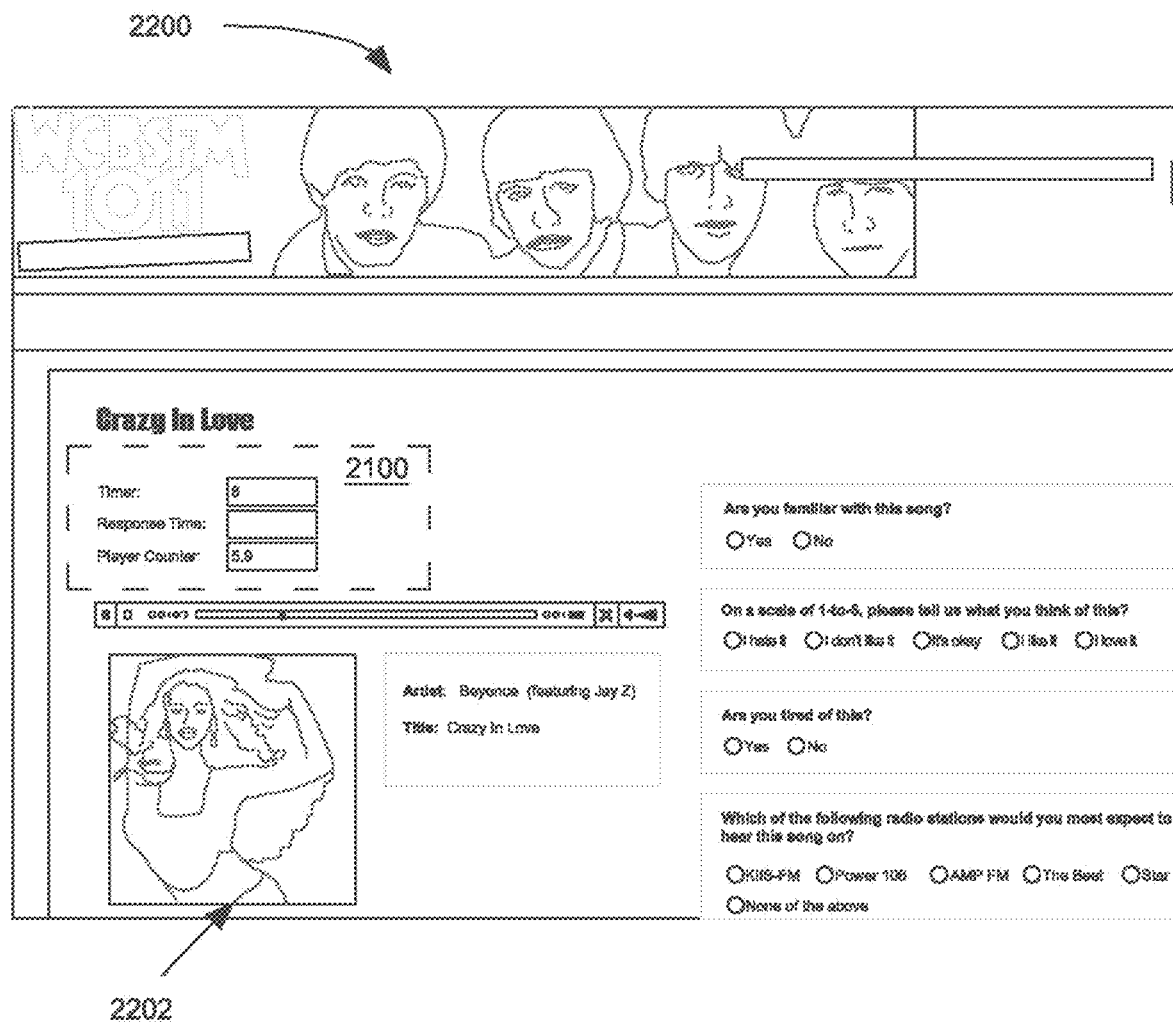
FIG. 22 is a user display according to various embodiments of the present disclosure.

In the embodiment illustrated in FIG. 22, the Time Stamping screen 2100 is turned on while a media element 2202 is playing on a display 2200. In some embodiments, the Time Stamping screen 2100 is not visible.

The system can offer Pop-ups in the form of a question a client can ask when a participant first responds. A Pop-up question can be presented when a user 1) stops listening, hitting the player stop button, 2) pauses the player, or 3) responds to any question. A Pop-up question can be presented when a user stops listening prior to the elapse of the "set Pop-up percentage" of the content duration.

Figure 23:
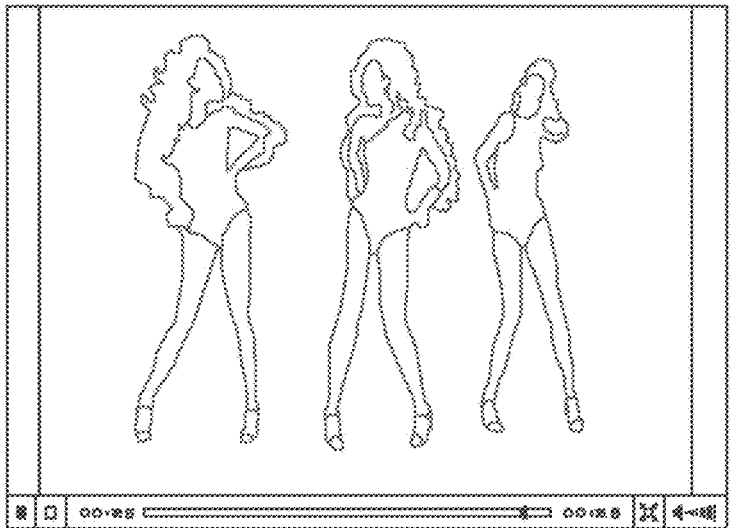
FIG. 23 is a video testing environment according to various embodiments of the present disclosure.

The embodiment in FIG. 23 illustrates the use of a Time Stamping screen 2100 to track Video content 2302 in a testing environment 2300.

Figure 24:
FIG. 24 is an audio testing environment according to various embodiments of the present disclosure.

The embodiment in FIG. 24 illustrates the use of a Time Stamping screen 2100 to track Audio content 2402 in a testing environment 2400.

Website Testing with Time Stamping

Website Links ("Weblinks") testing is a unique way to get more in-depth information from users based on the users being sent to a specific URL. Website "location/placement" of items on a website, and the attractiveness of the area, is believed to be in direct proportion to the value visitors have to that website. In other words, the client may want to know if things on the website are easy to find, are placed in good places on the website. In addition, the client may want to know if users like the area being asked about and can articulate what they would do to improve it. What might they contribute through the form of questions being asked that can help clients make their websites better?

As it relates to radio stations or other medium such as Television, when listeners/viewers are directed to a place on that client's website (e.g. "Go to 102.7 KIIS-FM and sign up for a chance at front row tickets to Britney Spears"), many times the client hasn't put them in a good position on the website, and/or is unattractive to the viewer. This impacts what they think of their product, whether subliminally, or otherwise.

The Weblinks testing can be done in one of two ways: Time Stamping a question and simply putting a URL into the project and asking questions about a website being tested. When Time Stamping during Weblink testing, the total duration is not calculated for that feature as Weblinks testing is intended to determine "When" a user finds something, although such a capability is possible and should be understood to be within the scope of the present disclosure.

Figure 25:
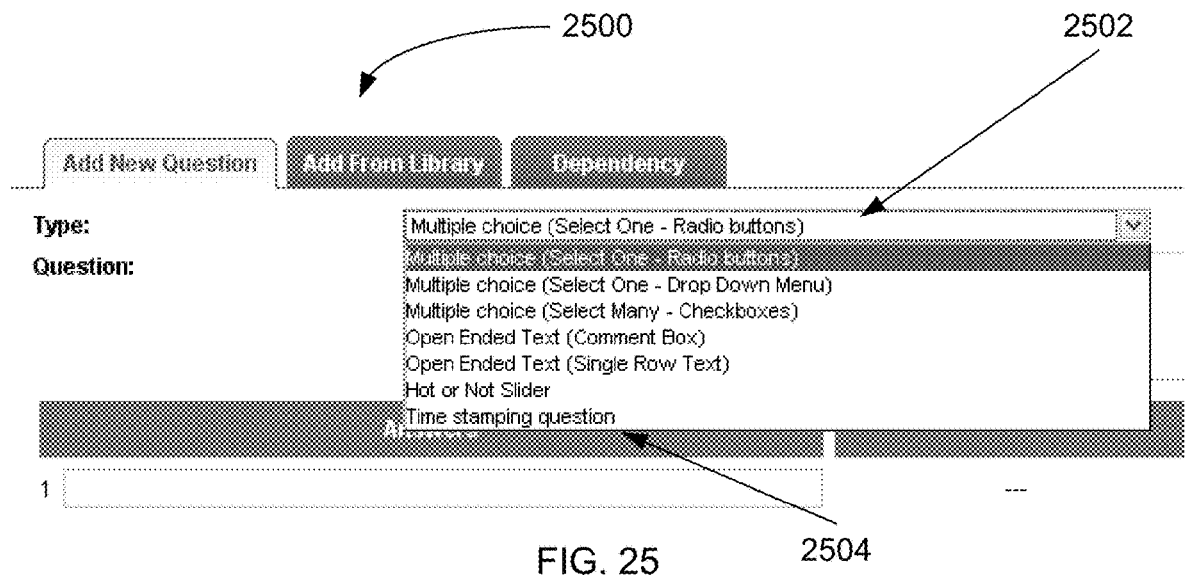
FIG. 25 is a question setup display according to various embodiments of the present disclosure.

As shown in FIG. 25, a client interacting with the "Add New Question" display 2500 can select "Time Stamping Question" 2504 when selecting a new type of question to add from a drop-down menu 2502. This is actually a question that is inserted into the feature to indicate that Weblinks is using a Time Stamping question. Most times the Time Stamping question would be used. A client may also determine to just put a URL into the project and ask questions about the web site being tested.

Figure 26:
FIG. 26 is a website display according to various embodiments of the present disclosure.

The embodiment in FIG. 26 illustrates a site 2600 with the actual Time Stamping timer 2602 being shown. A user wouldn't see the Time Stamping feature. Clients can create a survey with an actual URL, website link, such as "www-.google.com", or clients can create a survey with a more definitive URL, such as "http://www.amazon.com/gp/product/B00138KOTA/ref=sr_1_album_2_rd?ie=UTF8&child=B00138IVGI&qid=1255199639&sr=1-2". Clients can create questions for this link and make it part of the survey.

Figure 27:
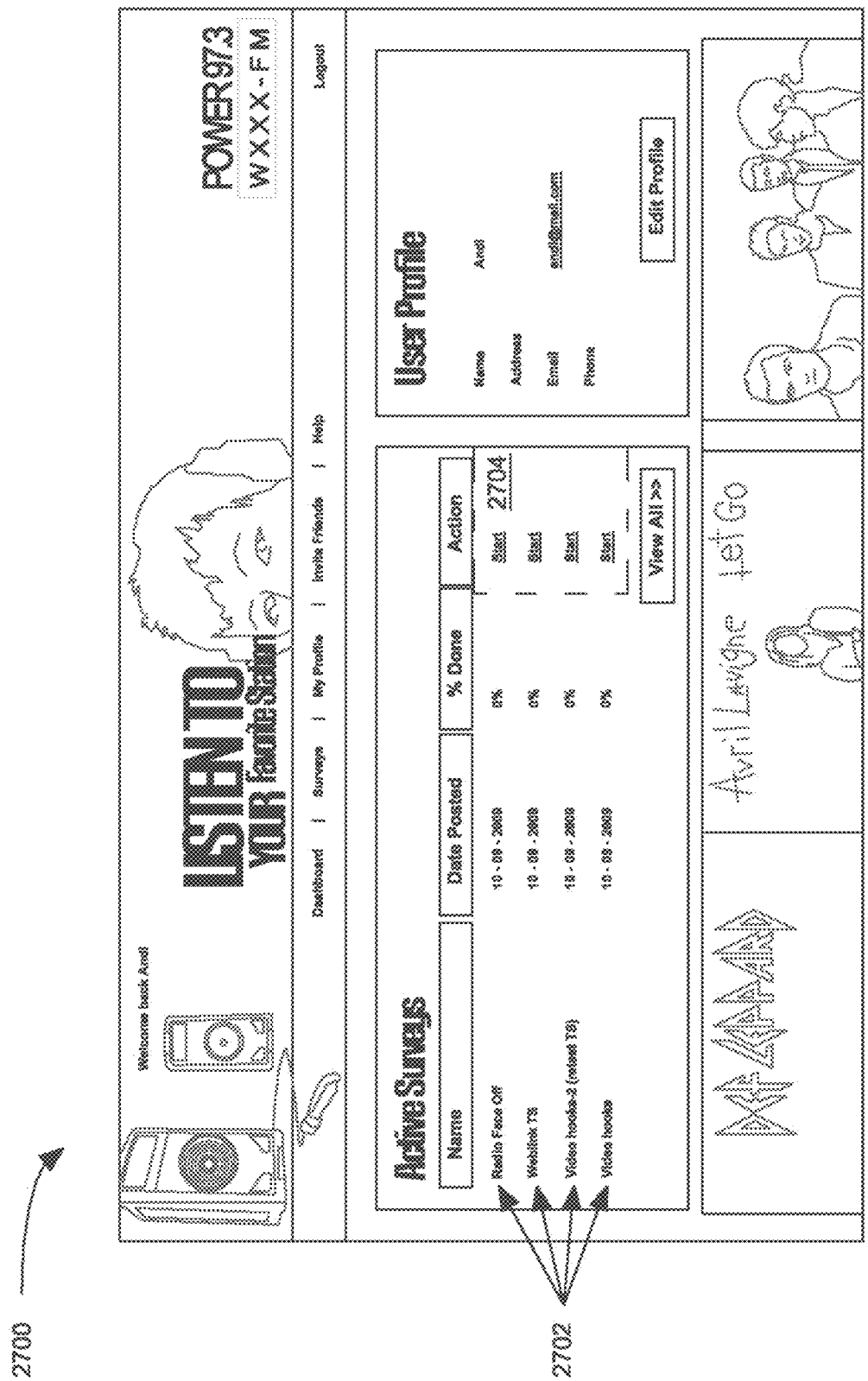
FIG. 27 is a user dashboard display according to various embodiments of the present disclosure.

FIG. 27 illustrates an embodiment of a user Dashboard 2700 through which users can be directed to a URL automatically in a survey. Once a user chooses a survey 2702, the user can click "Start" 2704 to begin the survey.

Figure 28:
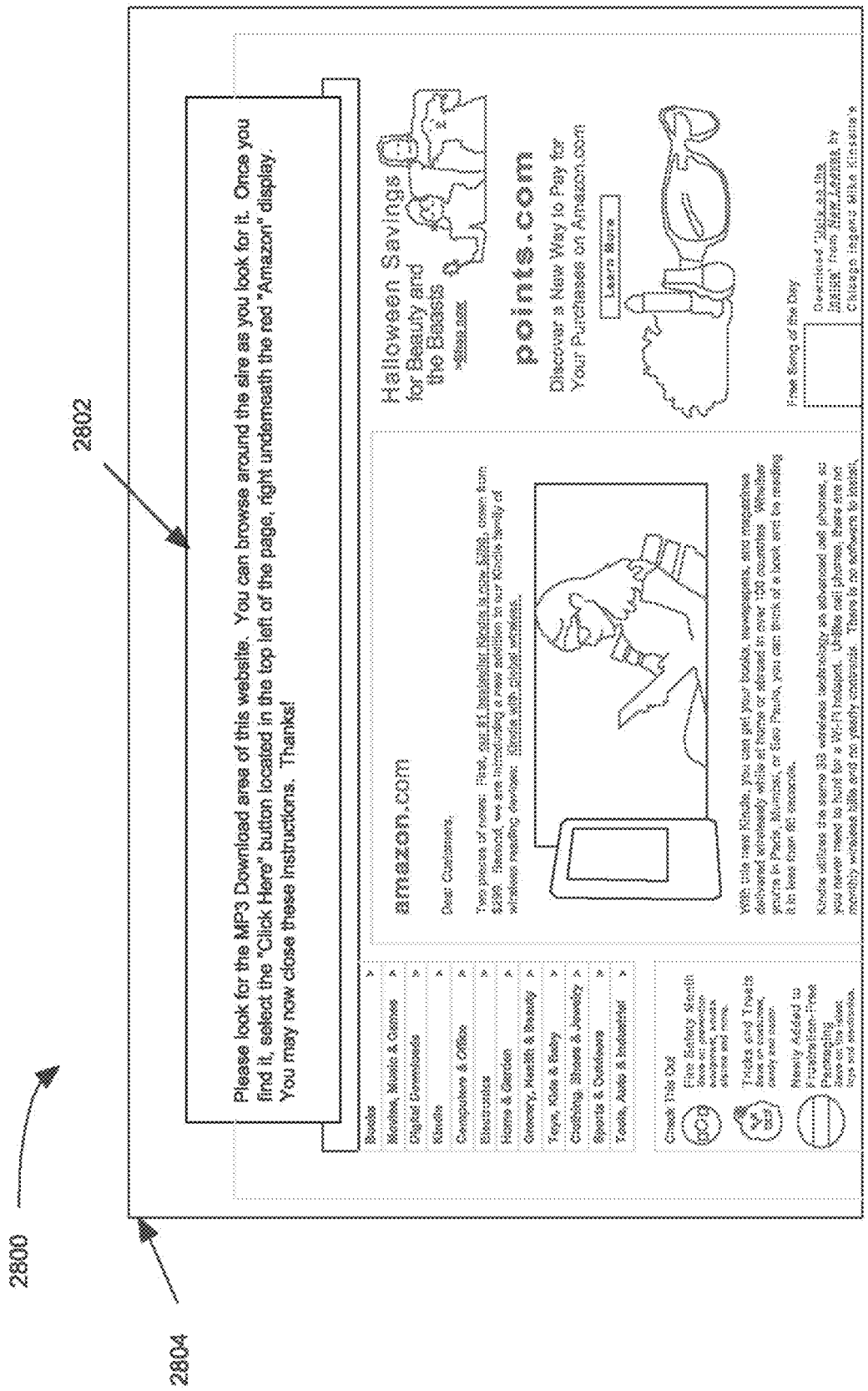
FIG. 28 is a Weblinks display according to various embodiments of the present disclosure.
Figure 29:
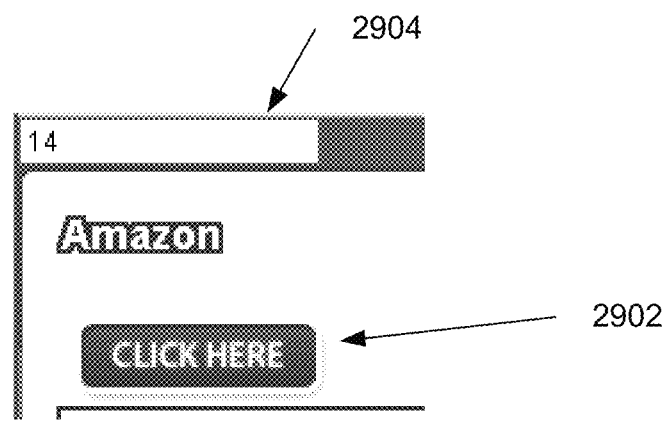
FIG. 29 is a Weblinks button display according to various embodiments of the present disclosure.

In the embodiment illustrated in FIG. 28, a user selects the "Website TS Survey" from the list of surveys displayed in the Dashboard in FIG. 27, which leads to the website link 2800 illustrated in FIG. 28. Instructions 2802 are on top of the website link 2800 in the survey. In the illustrated embodiment, a Time Stamping Timer 2804 is visible; in some embodiments, Time Stamping Timer 2804 is not visible. These instructions 2802 can be totally customizable by the client. The instructions are meant to ask users to go to a particular area of the URL being provided and then, once found, they would click a button. FIG. 29 illustrates an embodiment of such a button 2902.

Figure 30:
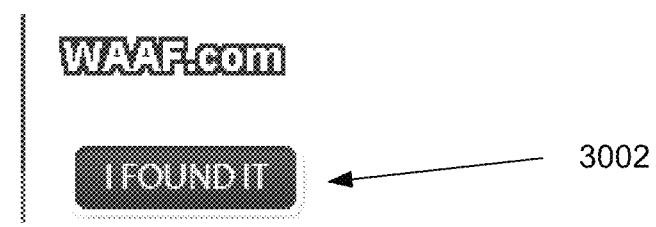
FIG. 30 is a Weblinks button display according to various embodiments of the present disclosure.

As shown in FIG. 29, one a user finds the URL, the user can click the button 2902. The button can state "Click Here"; in some other embodiments, the button can state "I Found It", as illustrated in FIG. 30 as button 3002. Once the instructions are closed, the Time Stamping is engaged, as shown by Time Stamping Timer 2904 in FIG. 29. The Time Stamping Timer tracks how much time elapses until the button is clicked. For example, in FIG. 28, at least 6 seconds on have elapsed on Time Stamping Timer 2804 before the instructions are closed. Also, in FIG. 29, at least 14 seconds have elapsed on Time Stamping Timer 2904 until the user finds the URL and clicks the button.

Figure 31:
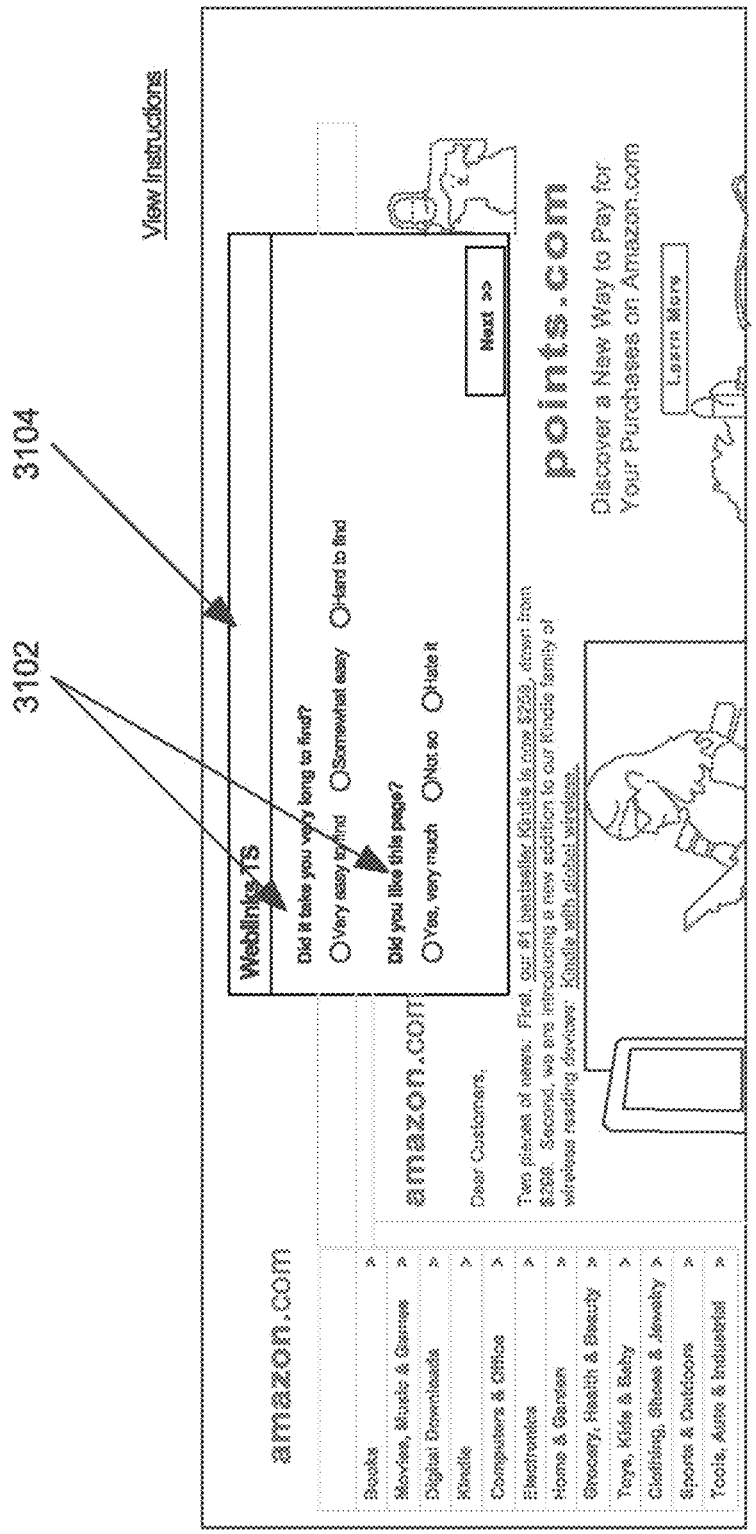
FIG. 31 is a Weblinks Pop-up display according to various embodiments of the present disclosure.

As shown in FIG. 31, once the user clicks the button, such as the button 2902 illustrated in FIG. 29, then the client-created questions 3102, which can be any number or type a client wishes to ask, are displayed 3104 to the user.

Figure 32:
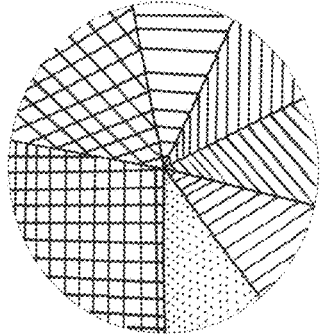
FIG. 32 is a Weblinks testing report according to various embodiments of the present disclosure
Figure 33:
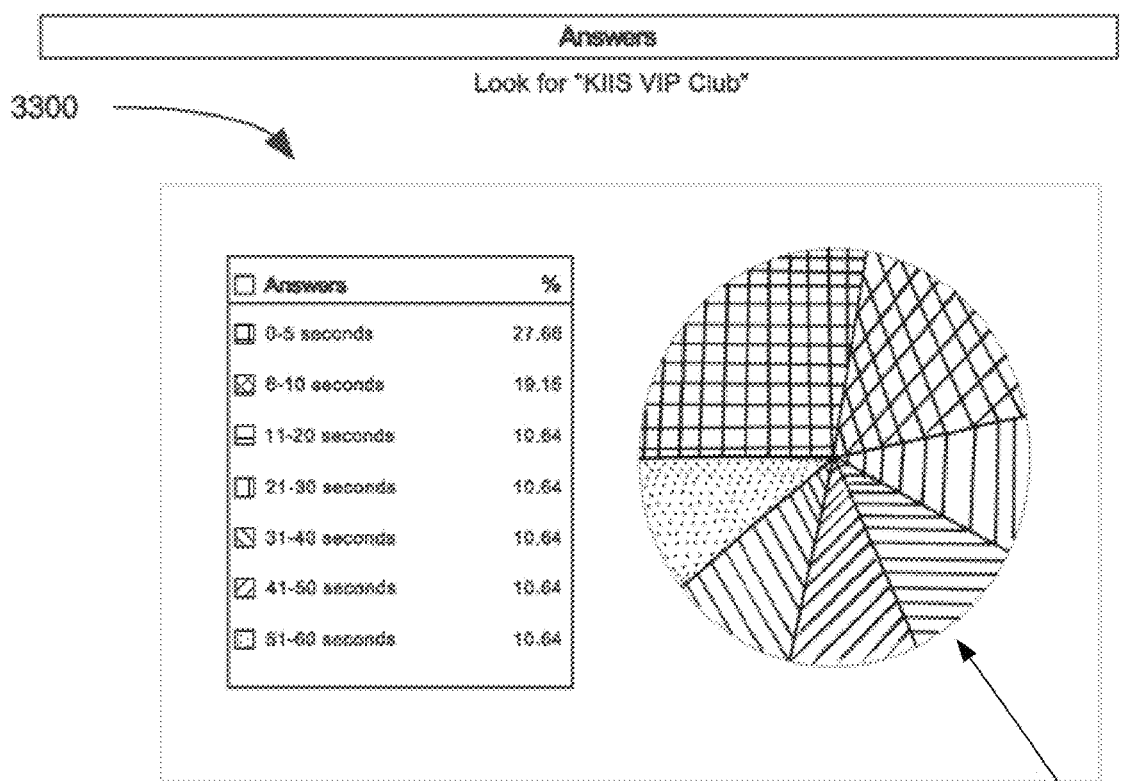
FIG. 33 is a Weblinks testing report chart according to various embodiments of the present disclosure.

The resulting report 3200 illustrated in FIG. 32 is shown in the system software. The report 3200 can include a list 3202 of questions that were presented to users, and a chart 3204 illustrating user responses to a given question. The chart report 3300 illustrated in FIG. 33 presents to the client an indication 3302 of how much time elapsed for various users while they searched for the URL.

Figure 34:
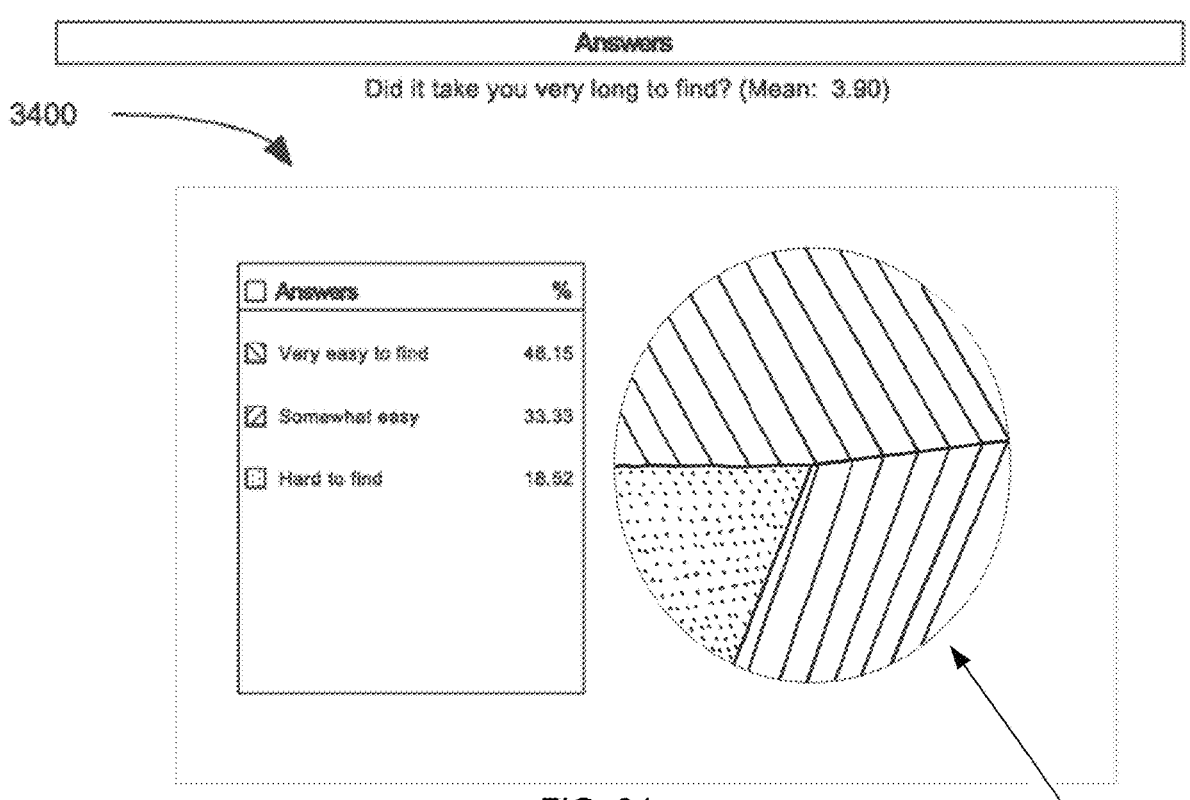
FIG. 34 is a Weblinks testing report chart according to various embodiments of the present disclosure.
Figure 35:
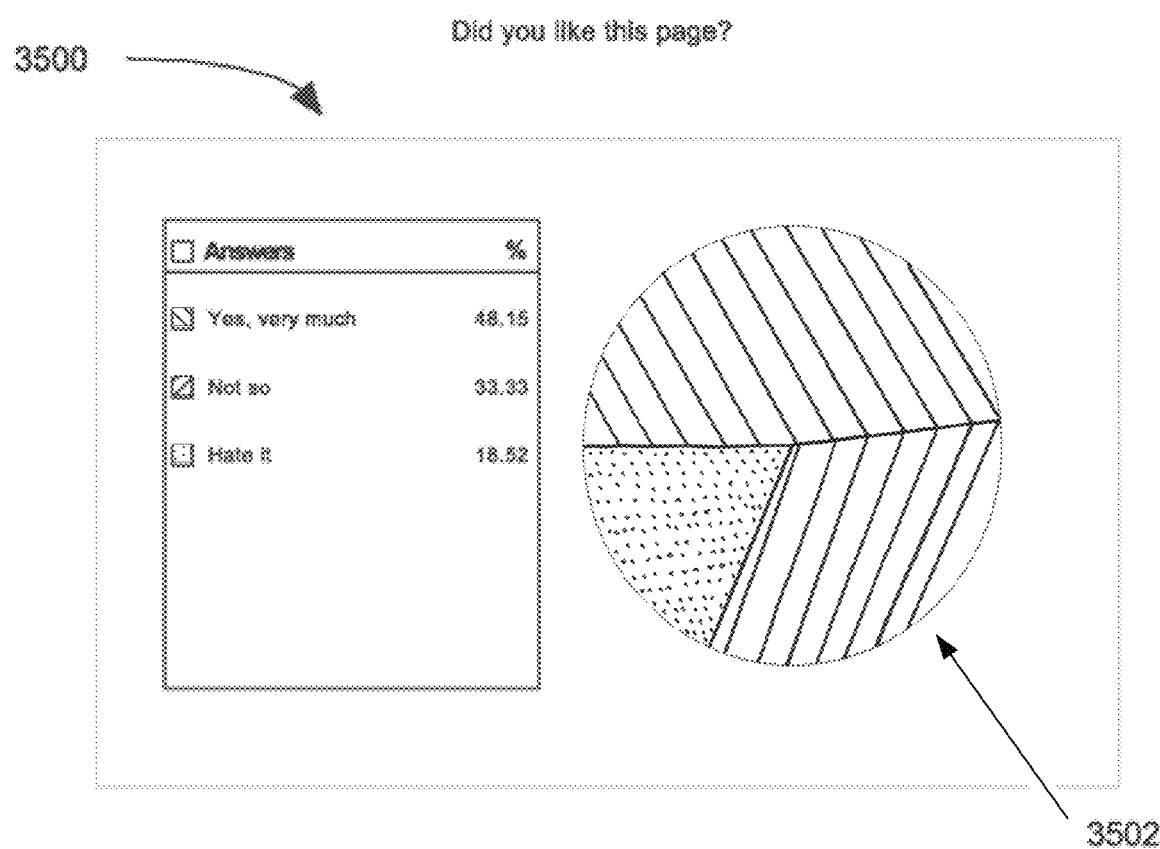
FIG. 35 is a Weblinks testing report chart according to various embodiments of the present disclosure.

The chart reports 3400 and 3500 illustrated in FIGS. 34 and 35, respectively, show indications 3402 and 3502 of how various users responded to a question presented after they found the URL. These are just example questions and responses. It's up to the client what they want to ask. The most important aspect of this is the Time Stamping—i.e., the answer to the question "How long did it take for a participant to find the item the client asked them to find?"

Weblinks Setup

Figure 36:
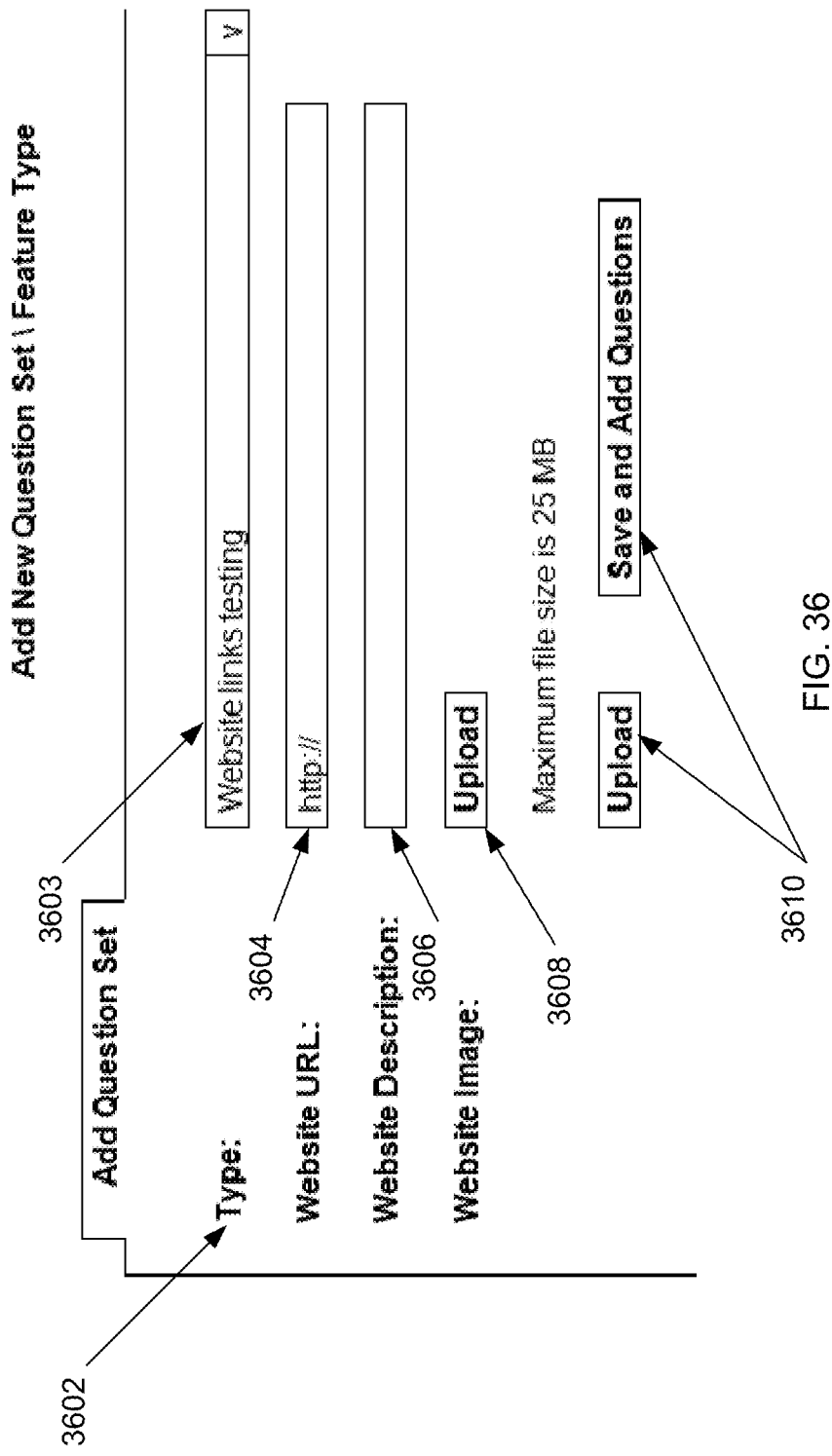
FIG. 36 is a menu display for adding a new survey question set according to various embodiments of the present disclosure.

Referring now to FIG. 36, the setup process for the Weblinks feature is illustrated and discussed. As shown in FIG. 36, clients select the feature type 3602 from a drop-down menu 3603. In the illustrated embodiment, the client has selected "Website Links Testing" from the drop-down menu 3603. The client types in the URL 3604 to which the users will go, enters the website description 3606, and, if necessary, uploads 3608 the website image of the page that the client wants shown when the page is first displayed. Then, the client can save and add questions 3610 as the client sees fit. A client can add as many website URL links as the client wishes for a particular survey.

The combination of Time Stamping and reaction times to the various elements, and how important it is to analyze and adjust that content, whether it's audio, video, image, or websites through the various functions and features presented herein, is critical to improving a client's ratings (such as Arbitron or Nielson), viewership, readership, or any business looking to utilize this tool. For example, a car dealership with a database, or through solicitation that invites participation, could ask questions about their business, cars they are intending to buy, how well their salespeople are doing, and so forth, including gathering information about their content (such as audio ads on the radio, television ads, billboard ads, or other forms of advertising). Its use is not limited to any one type of business as it has applications across multiple platforms.

Calculation of Time Stamping in Code

Figure 37:
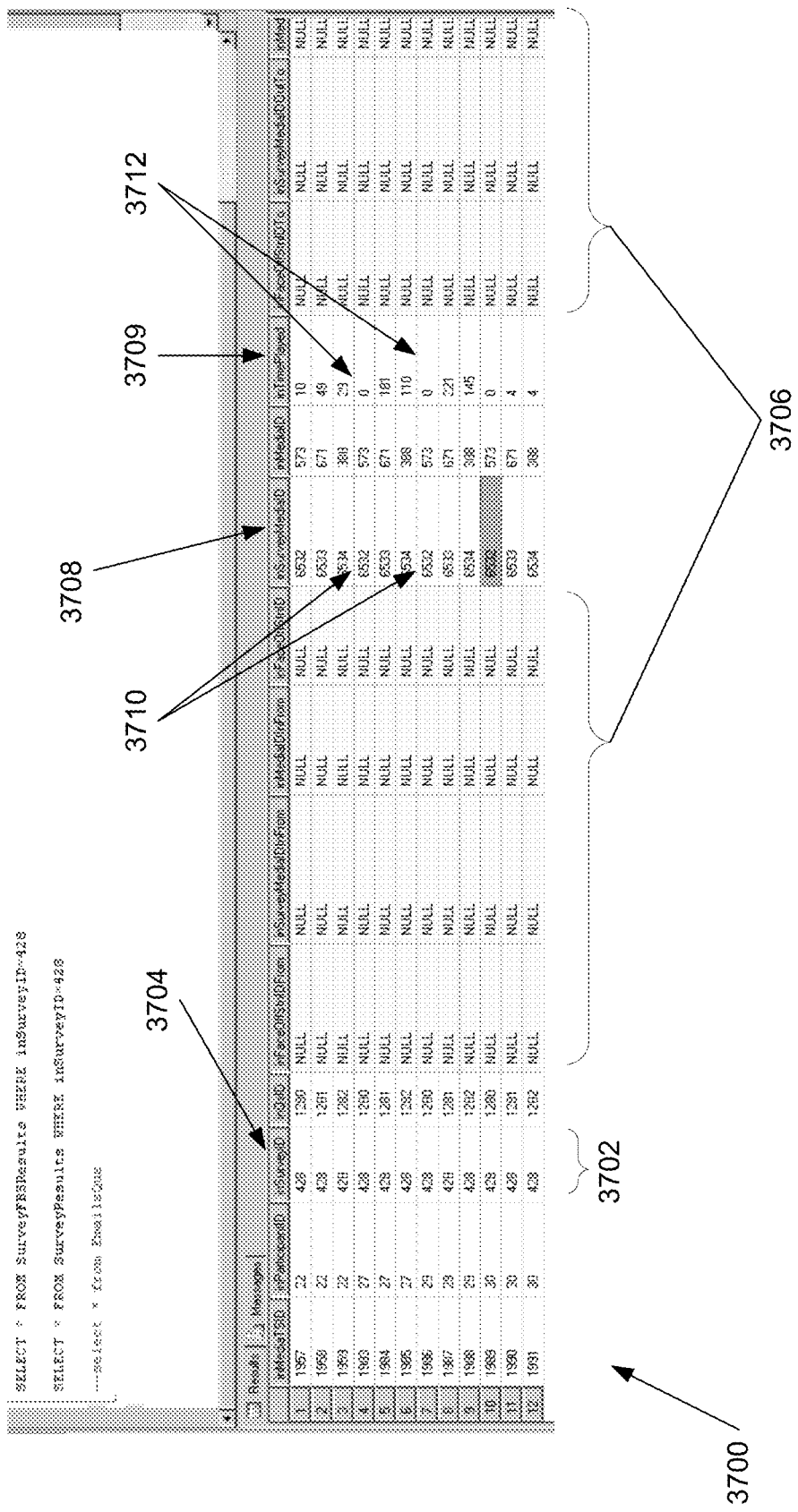
FIG. 37 is a database for capturing Time Stamping data according to various embodiments of the present disclosure.

As shown in FIG. 37, Time Stamping can be captured in various ways in an SQL database. For example, in the illustrated embodiment, Time Stamping data is captured in an SQL database 3700. The illustrated embodiment shows the results of a survey having an ID of "428" 3702 involving certain media, which are identified by "inSurveyMediaID" 3704. In the illustrated embodiment, the Time Stamping data is captured from a Face-Off; as a result, multiple columns 3706 display values of "Null". The response time of each media is saved into the column labeled "inTimePlayed" 3708. In the illustrated embodiment, a media item 3710 having an ID of "6532" is an image; as a result, the corresponding value 3712 in the "inTimePlayed" column 3709 for that media item 3710 is zero.

Survey Setup

Figure 41:
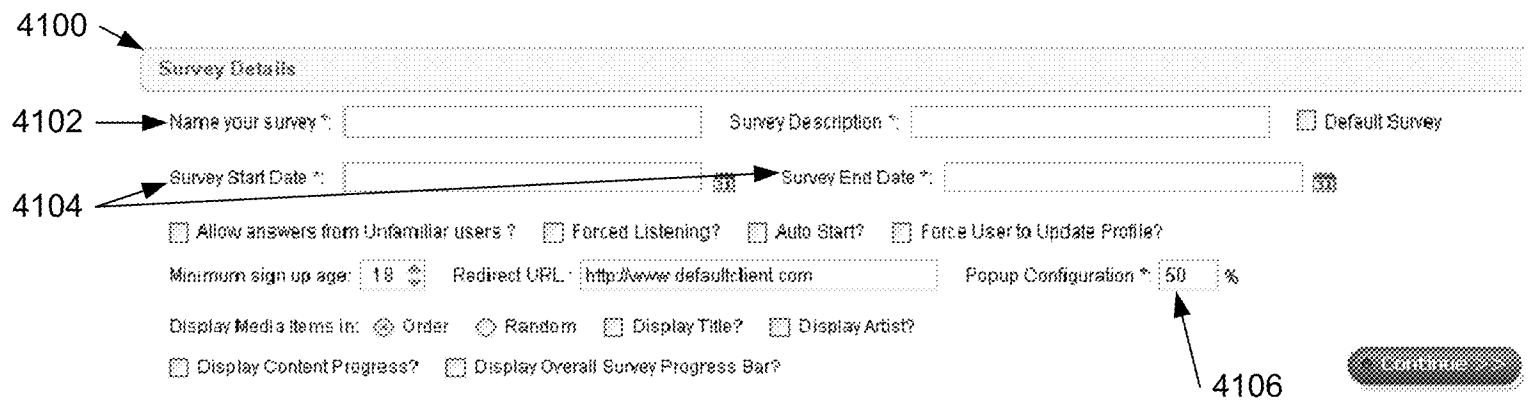
Figure 42:
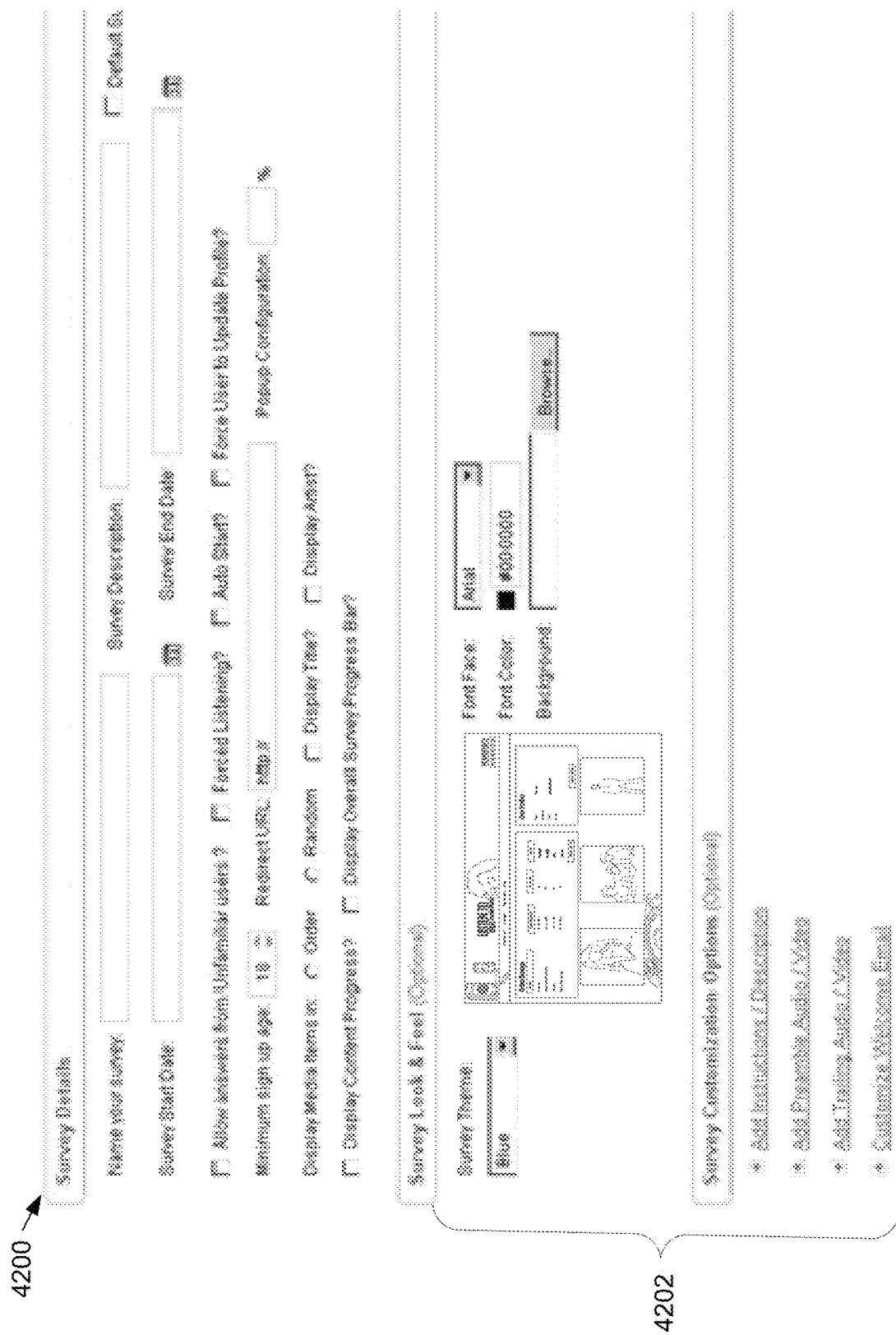
FIG. 42 is a survey details menu according to various embodiments of the present disclosure.

Referring now to FIGS. 38-42, steps in a process for creating a survey are illustrated and discussed. As shown in FIG. 38, a client can create a new survey by clicking on button 3800 in the software. As shown in FIG. 39, the client can be presented with a display 3900 that includes the options to create a new survey 3902, copy a survey template 3904, or copy an existing survey 3906. As shown in FIG. 40, should the client choose to create a new survey, the client then selects the type settings of the new survey from a display 4000, which can include Traditional Layout 4002, AMT Layout 4004, or some other Feature Type 4006, such as Weblinks, Website Drag & Drop, Radio Face-Off, or some other Face-Off. As shown in FIG. 41, the client can utilize a main survey setup page 4100 to name the survey 4102, set the start date and end date 4104, and set the Pop-up configuration 4106 related to Pop-up questions and determine other various settings. As shown in FIG. 42, additional parameters 4202 can be set up on the main survey setup page 4200. All of this information can be stored and saved on the software residing on the server containing the database.

Figure 43:
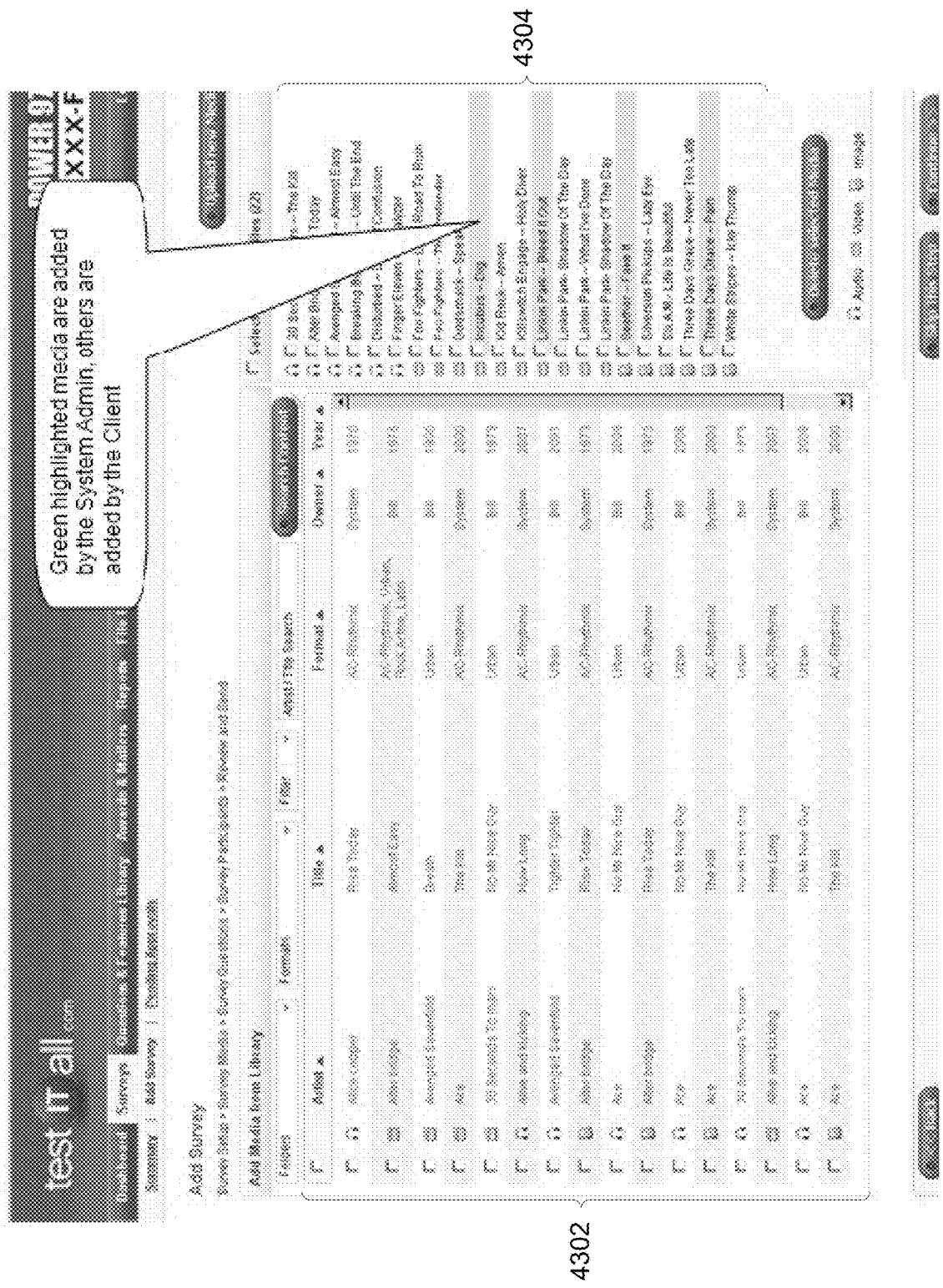
FIG. 43 is a media content selection menu according to various embodiments of the present disclosure.
Figure 44:
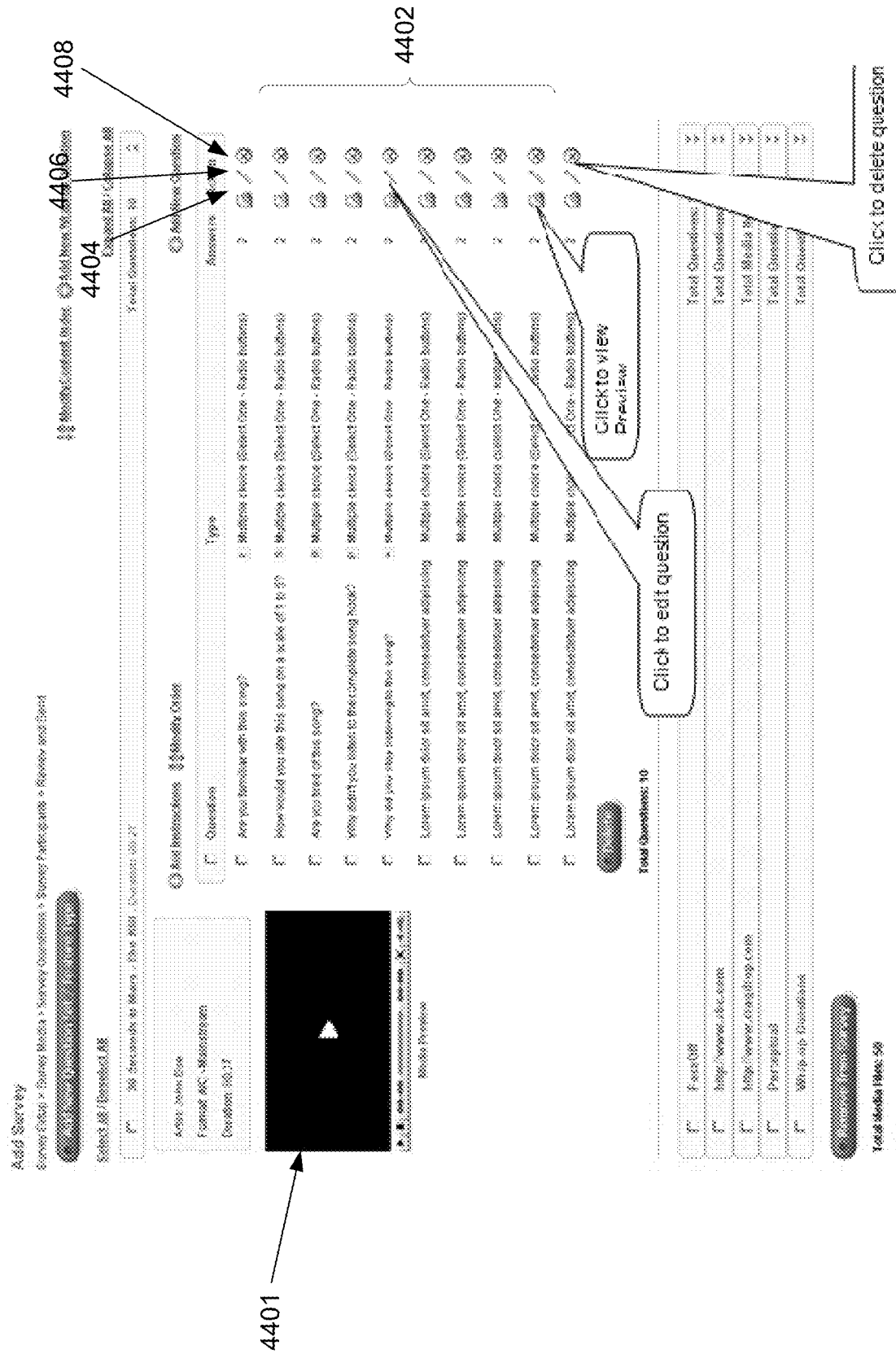
FIG. 44 is a survey question selection menu according to various embodiments of the present disclosure.

Referring now to FIGS. 43-44, additional steps in a process for creating a survey are illustrated and discussed. As shown in FIG. 43, depending on the survey type, a client can select the Media 4302. Media is classified as 1) Audio, 2) Video, and 3) Images, such as .jpegs, .tiffs, etc. The selections are stored and saved in the survey as well as in the server database. As shown in the illustrated embodiment, selected media 4304 that are highlighted are added by the system administrator; other media are added by the client. As shown in FIG. 44, questions are then created in the next step. Questions can be added to each piece of content 4401 or applied for all images. The audio, video, or image being presented 4401 to the user has the questions attached 4402 per client setup. The client can click various icons to edit 4406, preview 4404, or delete 4408 a question. All the information created is stored to the database in the server for each survey being created.

Figure 45:
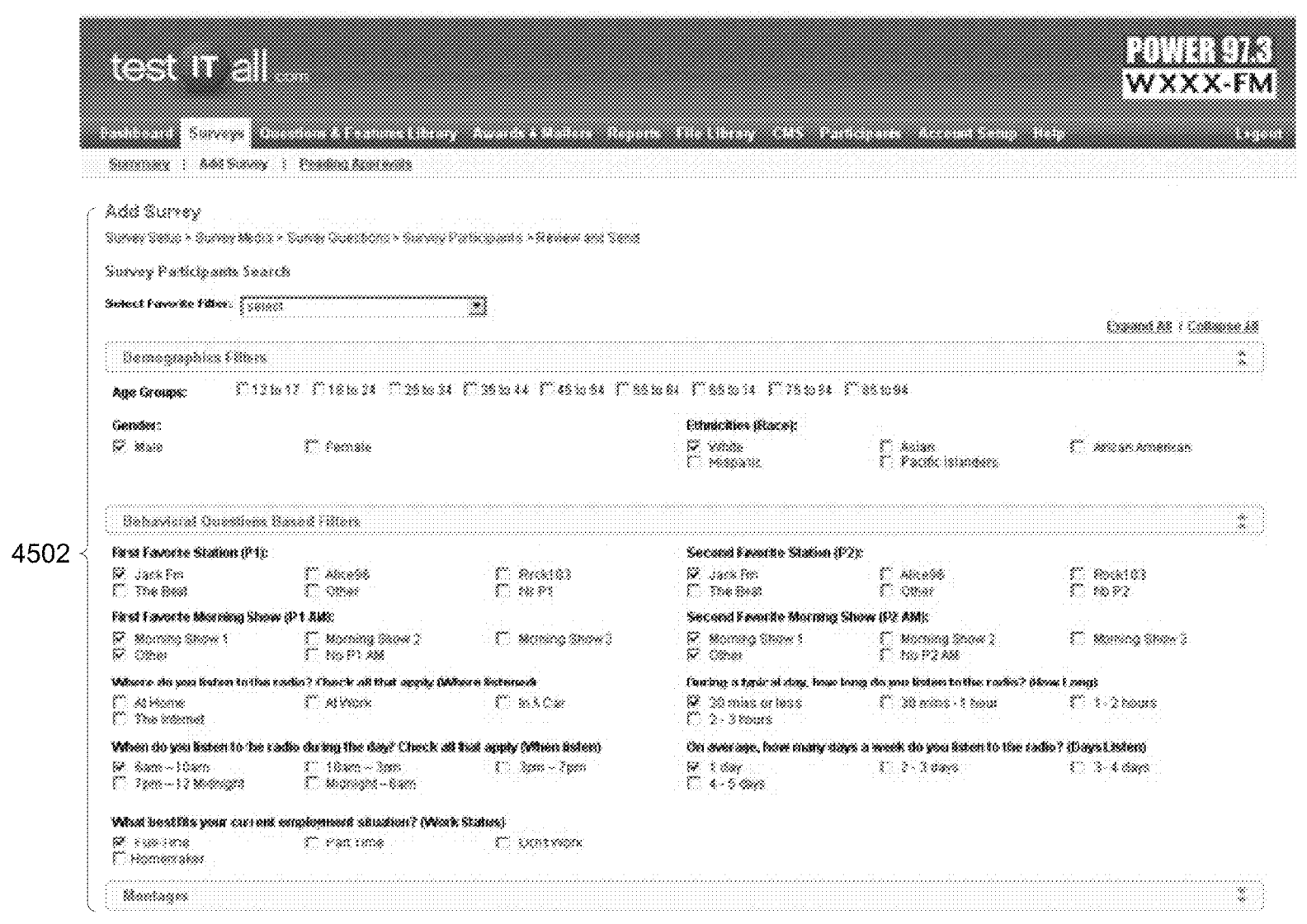
Figure 46:
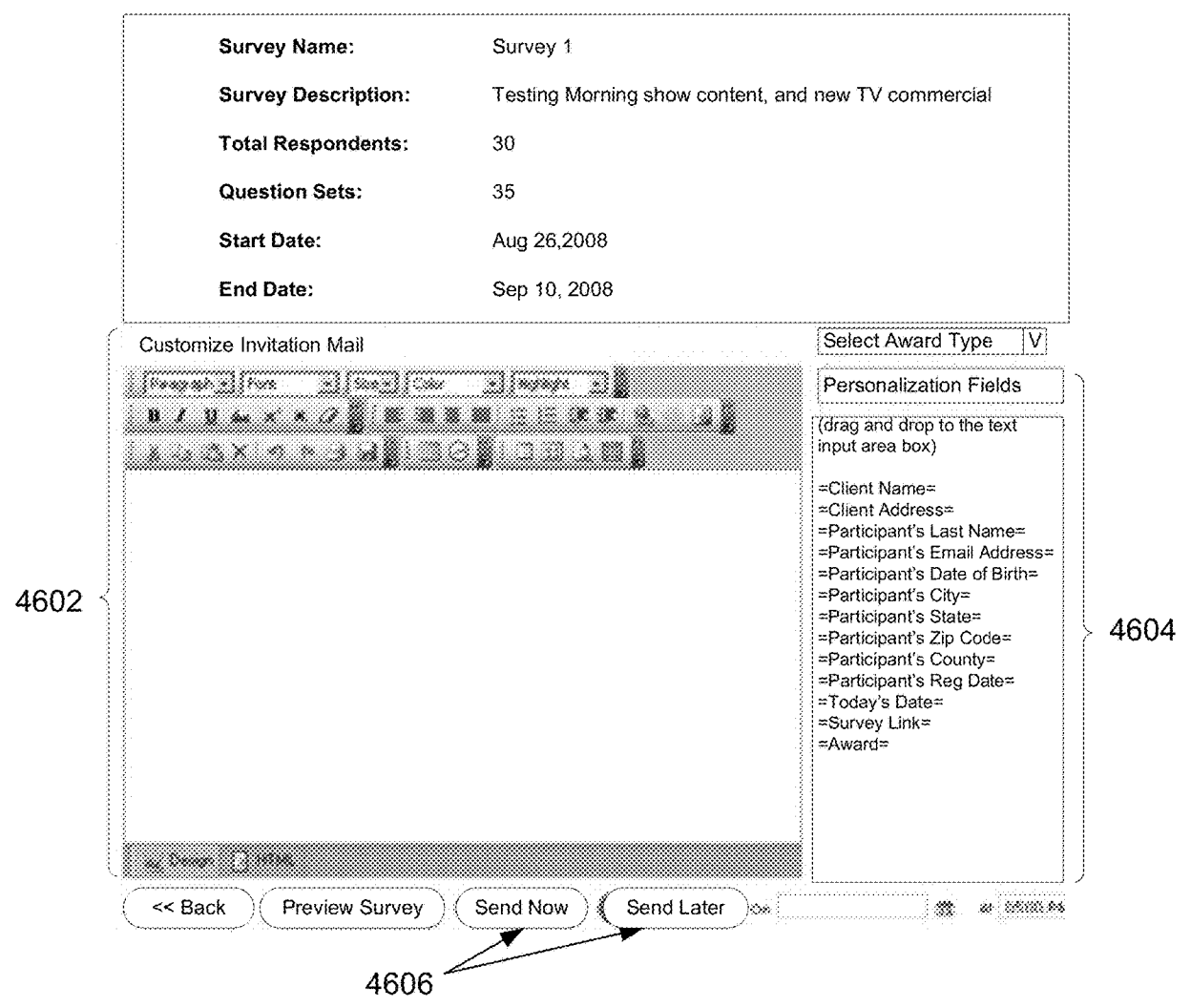

Referring now to FIGS. 45-46, additional steps in a process for creating a survey are illustrated and discussed. As shown in FIG. 45, users are selected using the criteria 4502 shown. Selections are saved and stored for the next step. As shown in FIG. 46, an invitation is displayed 4602, users are selected, personalization fields are selected 4604, and the survey can be sent (immediately or at a later time) 4606. Prior to sending the survey, the user can preview the survey.

Figure 47:
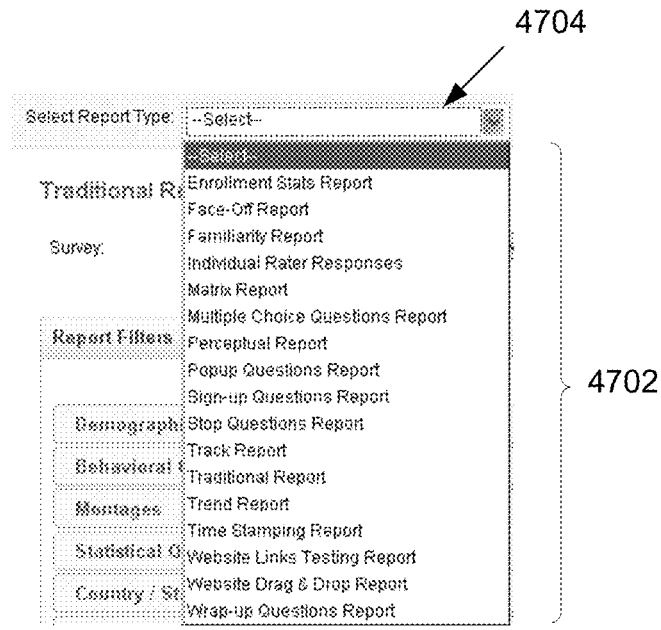
FIG. 47 is a report type selection menu according to various embodiments of the present disclosure.
Figure 48:
FIG. 48 is a report filter selection menu according to various embodiments of the present disclosure.

Referring now to FIGS. 47-48, steps in a process for accessing or generating a survey report are illustrated and discussed. As shown in FIG. 47, survey reports are available in a variety of types based on the surveys sent and the input given by each user collected and presented in the viewed report. The client can select 4704 a report from a drop-down menu 4702. As shown in FIG. 48, the client can select filters for the report, which can include previous filters or new filters, and can be searched based on available options 4802, which can include demographics filters, behavioral question filters, montages, statistical questions, location information, or other filters.

Referring now to FIGS. 49-51, various types of filters accessible to a client in a process for accessing or generating a survey report are illustrated and discussed. As shown in FIG. 49, demographics filters 4902 available to the client can include Age groups, genders, and ethnicities of the users. As shown in FIG. 50, behavioral questions based filters 5002 may be available to the client. In addition, as shown in FIG. 51, statistical questions 5102 may be selected by the client as filters in a report. The filter information can be stored on a database in the server.

AMT Stream Survey Setup

Figure 52:
FIG. 52 is a survey type settings menu according to various embodiments of the present disclosure.
Figure 53:
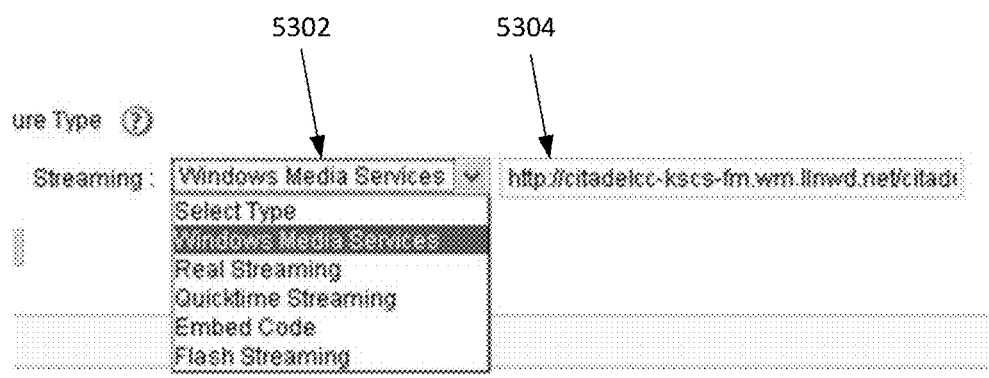
FIG. 53 is a survey type settings menu according to various embodiments of the present disclosure.
Figure 54:
FIG. 54 is a media content selection menu according to various embodiments of the present disclosure.

The system also has a feature that allows a client to conduct a music test "Live" on the air (their radio broadcast, such as 102.7 FM), and/or to stream it live on their websites. When a client signs up for the service, the central server gets their streaming information. This data is collected as shown in FIGS. 52-55. This makes it easy for a client to set up an AMT, as the streaming information is already there. All they have to do is set up the survey. They can choose up to 600 songs to be tested on each AMT survey. The selection of the songs is easy to do, as FIGS. 52-54 show.

As shown in FIG. 52, the client can access a type settings display 5202 from which the client can pick the station name 5204 and set the default question set 5206. As shown in FIG. 53, the client can also set the streaming media type 5302 and URL 5304. As shown in FIG. 54, a client can select songs by adding media from a library 5402 by searching 5404 for content to add from the library. In addition, the client can select songs by uploading new media 5406.

Figure 55:
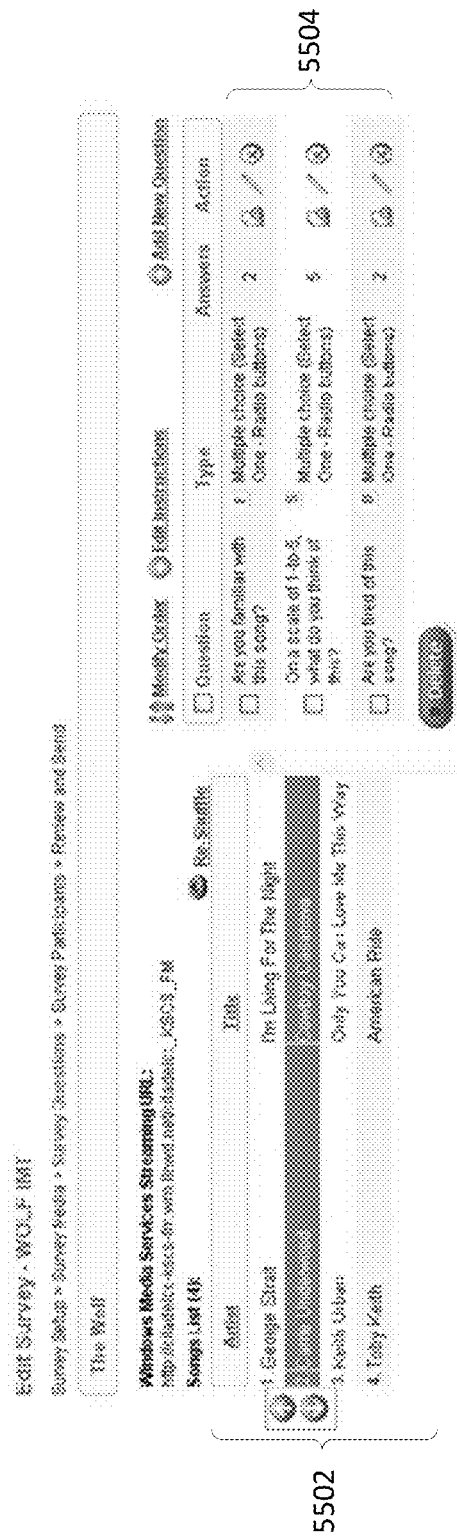
FIG. 55 is a media content and question list menu according to various embodiments of the present disclosure.

As shown in FIG. 55, clients can change the order of songs 5502 as well. The client can also select and modify the order of questions 5504 for the AMT. The client can re-shuffle the order, or move songs up or down in the order they want it to appear on the test. Then, users are selected, and surveys are sent through the same process as other surveys described herein.

Figure 56:
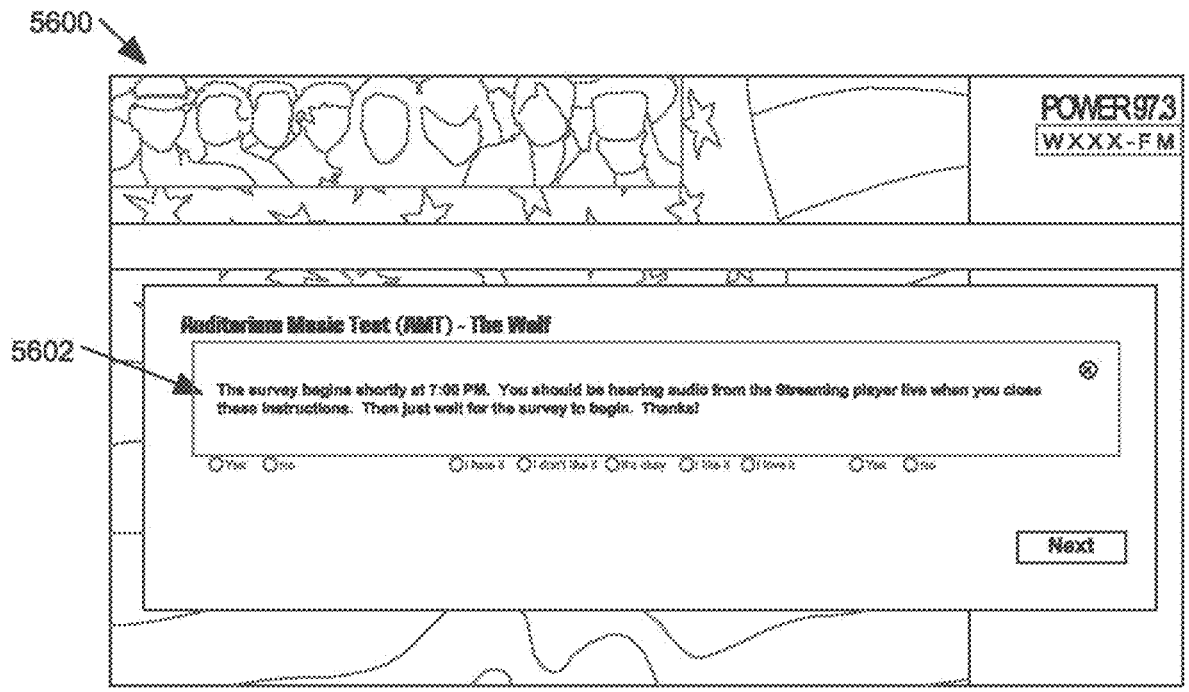
FIG. 56 is an AMT instruction display according to various embodiments of the present disclosure.
Figure 57:
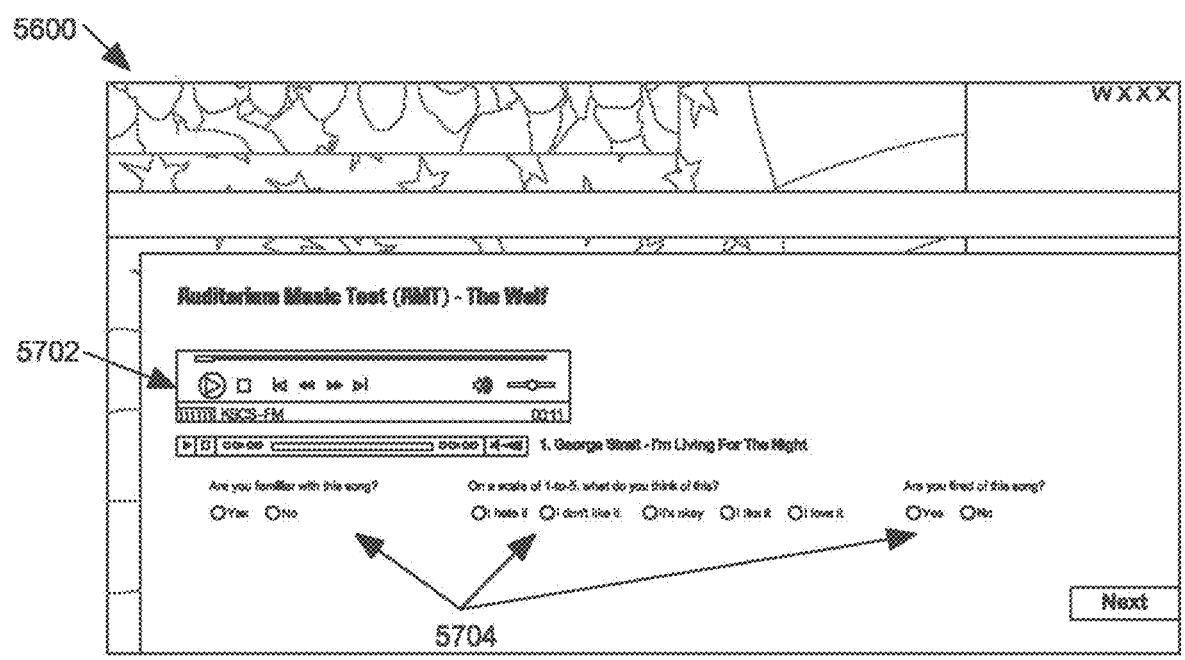
FIG. 57 is an AMT user display according to various embodiments of the present disclosure.

As shown in FIG. 56, the stream can be provided in the survey so users simply start the survey and the (completely customizable) instructions 5602 are presented in a display 5600 for the AMT for users. As shown in FIG. 57, once the instructions close, the streaming data 5702 is fed to the user through the software. As the user listens to the stream 5702, the user then follows along with hooks and answers questions 5704 presented. Collection of the data is done as with all questions in the software as described herein.

Figure 58:
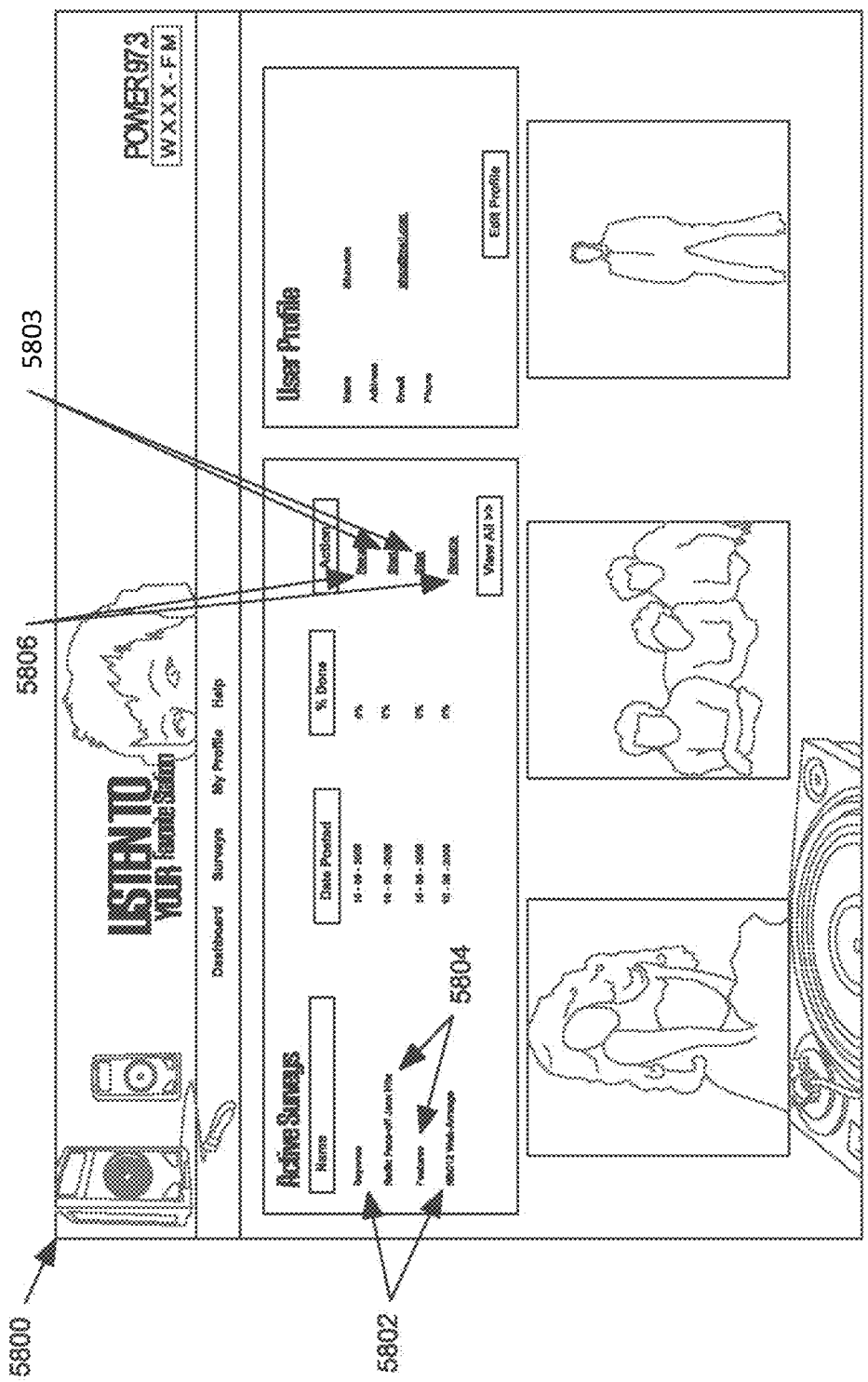
FIG. 58 is a survey selection and resumption menu according to various embodiments of the present disclosure.

FIG. 58 illustrates a display 5800 after a user has started, but not completed, one or more surveys 5802. The user can start 5803 a new survey 5804, and the user can resume 5806 the pending surveys 5802.

Average Minimum Listening

In some embodiments, a number of reports, including Individual Rater Reports, traditional Reports, Weblinks Reports, and Time Stamping Repots, can feature Average Minimum Listening.

Figure 59:
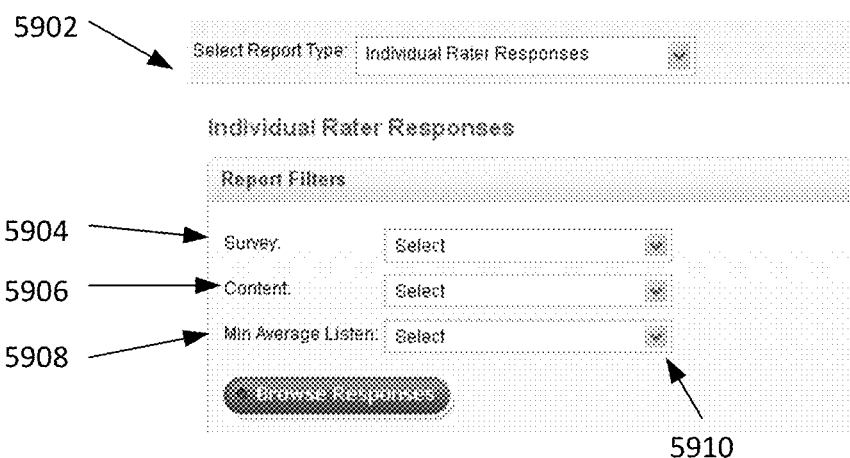
FIG. 59 is an individual rater response report filter selection menu according to various embodiments of the present disclosure.

As shown in FIG. 59, to utilize Average Minimum listening when selecting 5902 Report Filters for Individual Rater Responses, a client 1) picks the "Report Type" 5902, 2) selects the Survey under a "Filters" field 5904, 3) selects the content a user is to view first 5906, and 4) determines the minimum average listening value 5908 from a drop-down menu 5910.

Figure 60:
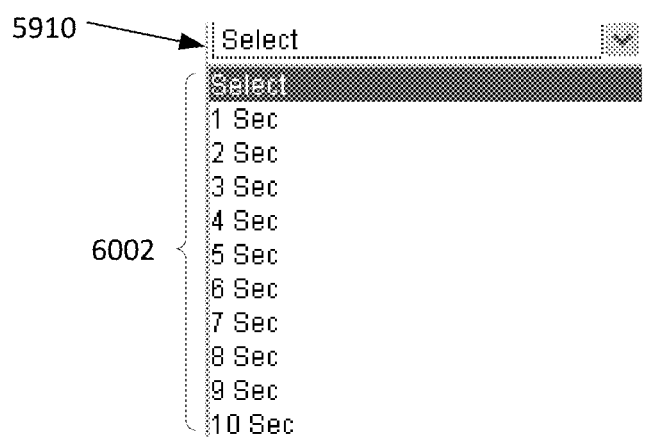
FIG. 60 is a minimum average listen selection menu according to various embodiments of the present disclosure.

In the embodiment illustrated in FIG. 60, the client selects the Minimum Average Listening time from a list 6002 of available quantities of time in the drop-down menu 5910. Selecting a given quantity as the Minimum Average Listen specifies that a user must have listened to at least the given quantity of seconds in order to be included in the selected report to be generated. In some embodiments, if a user doesn't listen to at least the Minimum Average Listen quantity of time, the user will not be included in the results in the generated report.

Figure 61:
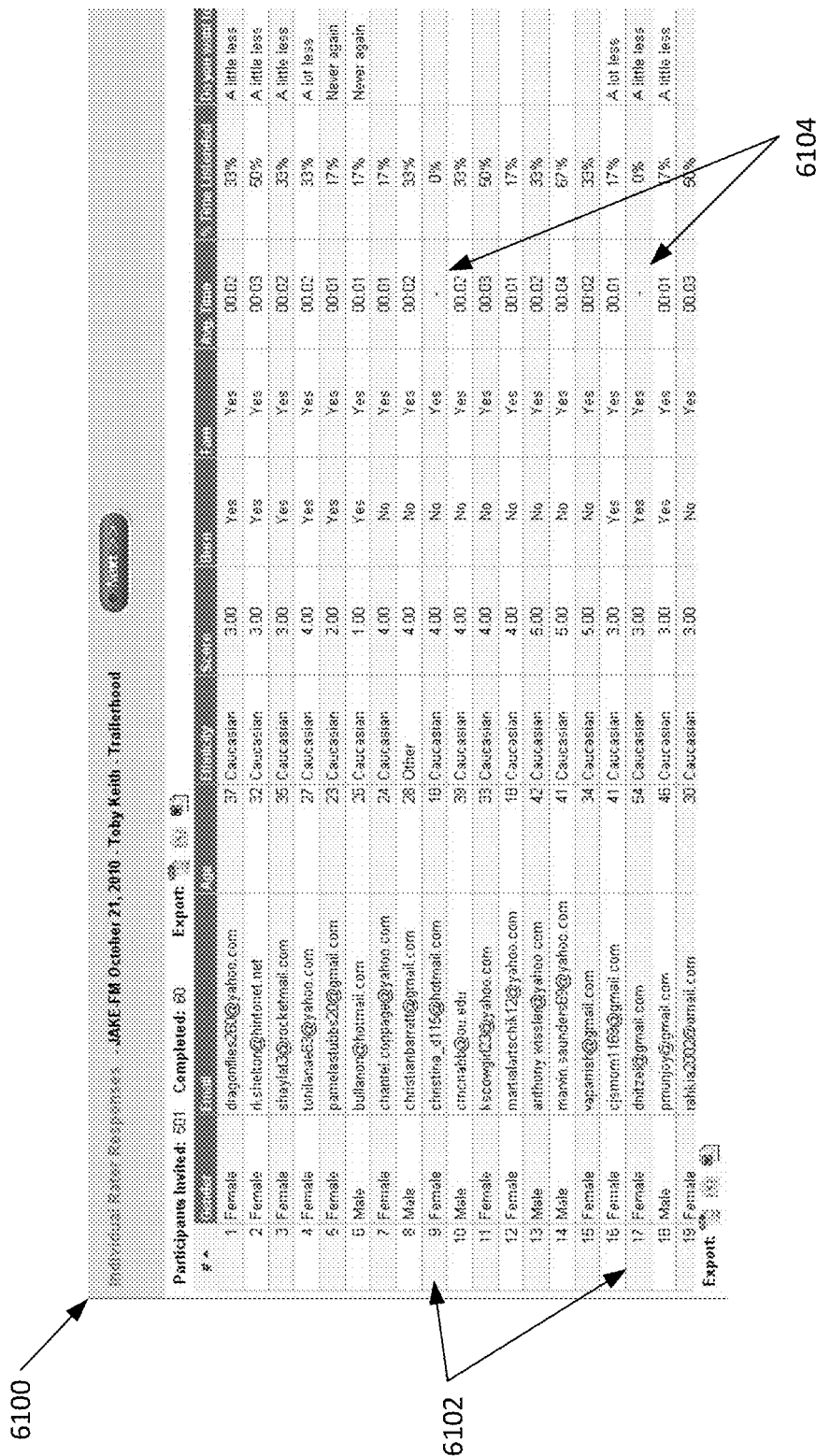
FIG. 61 is an individual rater response report according to various embodiments of the present disclosure.
Figure 62:
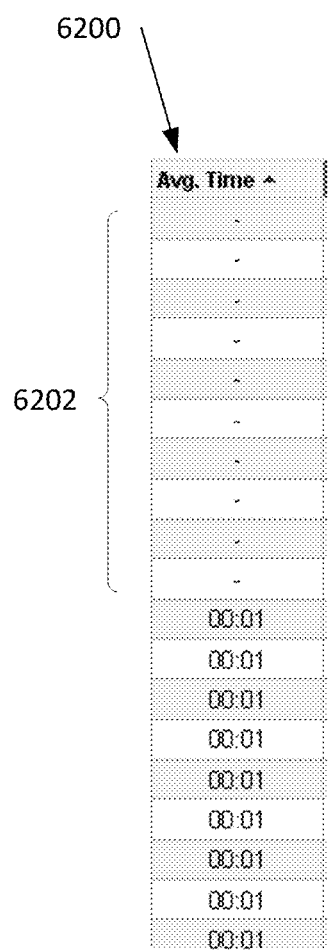
FIG. 62 is a list of user listening times from an individual rater response report according to various embodiments of the present disclosure.

As shown in FIG. 61, an Individual Rater Response Report 6100 shows that some users have either not listened at all or have only listened for a second or two. For example, at least two users 6102 have not listened at all, as shown in their corresponding "Avg. Time" cells 6104. In fact, as shown in FIG. 62, the report in FIG. 61, when users are sorted by ascending listening time 6200, illustrates that multiple users 6202 did not listen at all.

If the clients in FIG. 61 had set a minimum listening time of 5 seconds, such results would not be present in the report and would not affect the overall results. Because users that listen to a few seconds of content may not have any value in a report to a client, clients may use some embodiments of the Average Minimum Listening functionality to weed out such users from generated reports.

Figure 63:
FIG. 63 is a traditional report filter selection menu according to various embodiments of the present disclosure.
Figure 64:
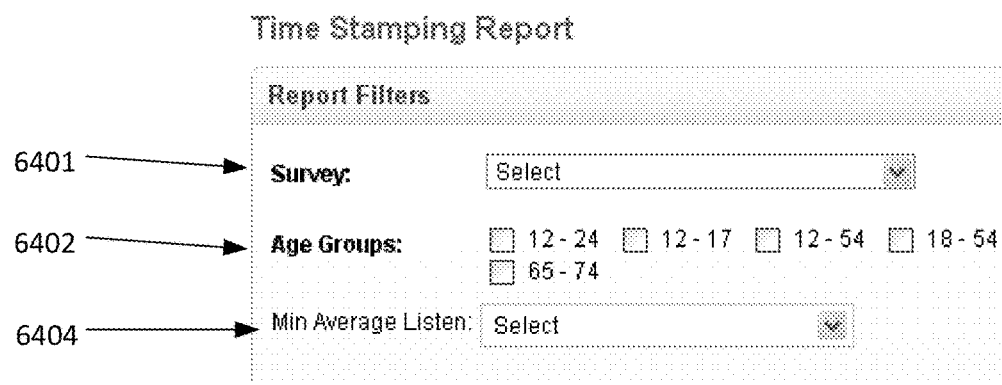
FIG. 64 is a Time Stamping report filter selection menu according to various embodiments of the present disclosure.
Figure 65:
FIG. 65 is a Weblinks testing report filter selection menu according to various embodiments of the present disclosure.

As shown in FIGS. 63-65, a client can, utilize Average Minimum listening in a Traditional Report, a Time Stamping Report, and a Website Links Testing Report, respectively. As shown in the embodiment illustrated in FIG. 63, a client who wishes to utilize Average Minimum listening in a Traditional Report selects the Survey 6302 and the Average Minimum Listen quantity 6304. As shown in the embodiment illustrated in FIG. 64, a client who wishes to utilize Average Minimum listening in a Time Stamping Report selects the Survey 6401, the Age Groups of users 6402 that the client wishes to include in the report, and the Average Minimum Listen quantity 6404. As shown in the embodiment illustrated in FIG. 65, a client who wishes to utilize Average Minimum listening in a Website Links Testing Report selects the Survey 6502, the website that the client wishes to include in the report 6504, and the Average Minimum Listen quantity 6506.

Face-Offs

Radio Face-Off

The Radio Face-Off feature tracks the following:
a) how long a user spends listening to each song on the respective station the user is listening to
b) when a user switches stations, and the subsequent Time Stamping spent listening.

The process continues until the survey ends.

In addition to Time Stamping, the Face-Off feature tracks the following:
a. "tune outs" (where a user is switching—what station)
b. "tune ins" (where a user tuned in from—which station)
c. Most tuned out song for each station (Most switched)
d. Station Most switched to
e. Average length of listening This feature could be used with live streaming of radio stations to collect Time Stamping data for respective content and ask questions. In some other embodiments, the feature can be used with uploaded content.

FIG. 66 illustrates an embodiment of a Face-Off report where at least some of the above tracked items are displayed in a report for the client.

Figure 67:
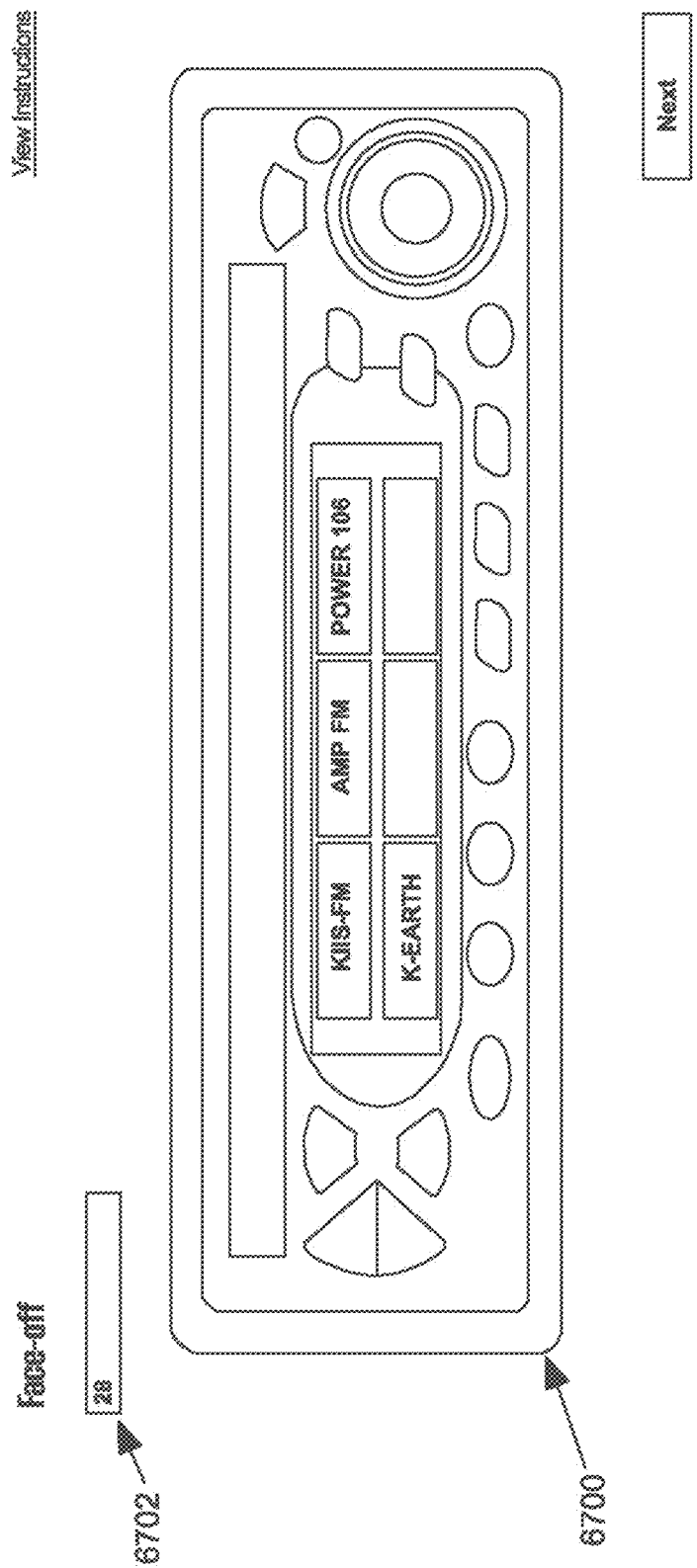
FIG. 67 is a Face-Off emulator according to various embodiments of the present disclosure.

FIG. 67 illustrates an embodiment of the PP Emulator 6700 used for the Radio Face-Off feature. The PP Emulator utilizes Reactions times, which can be displayed in a Time Stamping Timer 6702. In the illustrated embodiment, the Time Stamping Timer 6702 indicates that 28 seconds have elapsed in a Time Stamping event. In some embodiments, the Time Stamping Timer 6702 is invisible.

Figure 68:
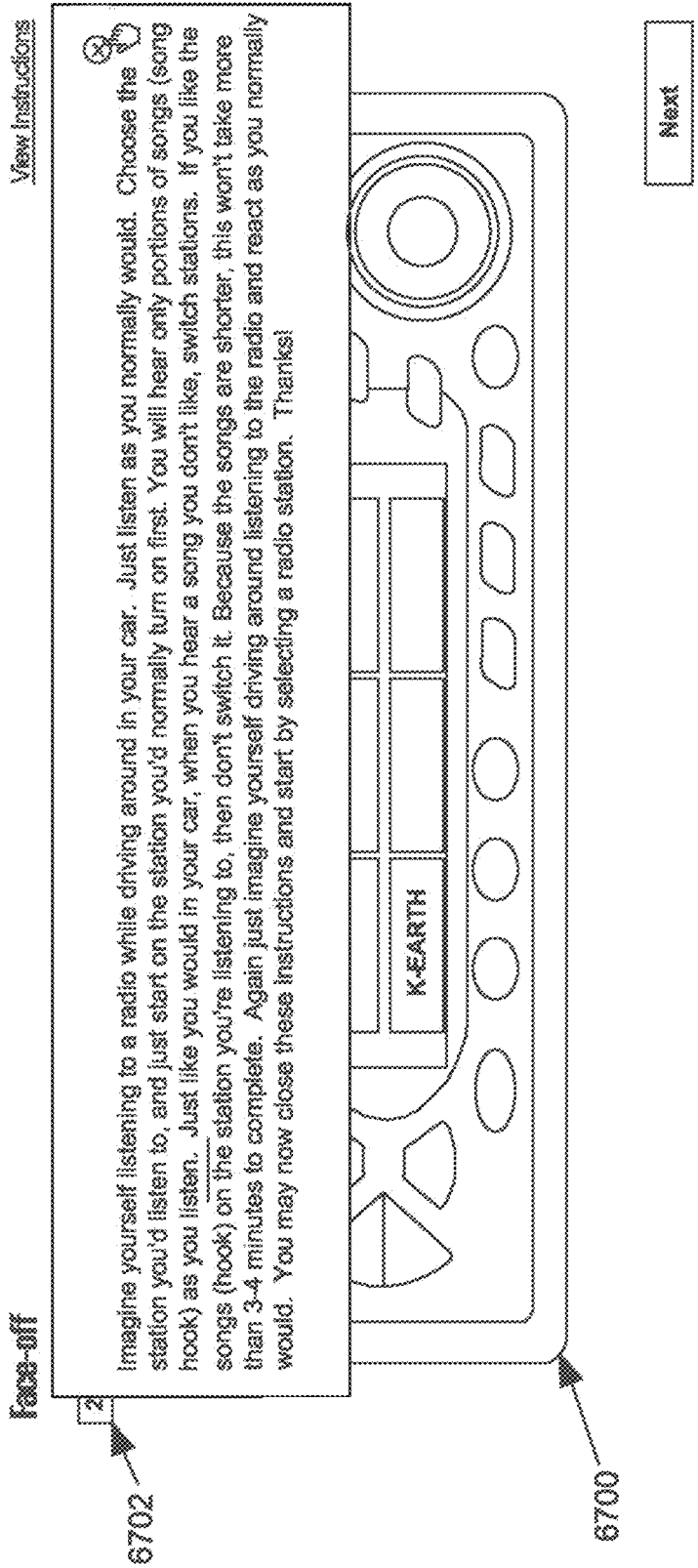
FIG. 68 is a Face-Off instruction display according to various embodiments of the present disclosure.

As shown in FIG. 68, users are asked to start listening as though they were driving in a car. The system starts tracking the time when a user sees the instructions. The Time Stamping Timer 6702 in FIG. 68 is partially hidden by the instructions.

Once these instructions are closed, then the user takes an action to start the Face-Off feature. The action taken may depend on the instructions provided. For example, the user may be prompted to start on any station to which the user would normally first listen or the user may be prompted to start on a specific station.

Figure 69:
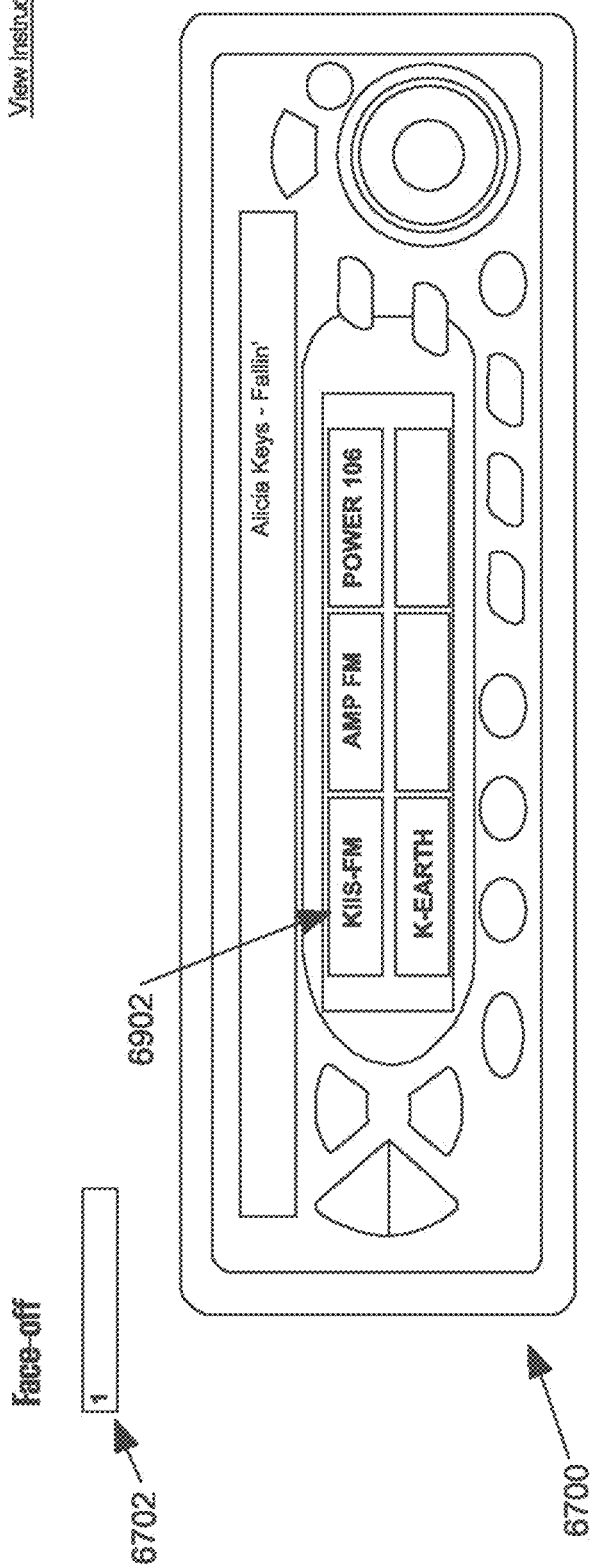
FIG. 69 is a Face-Off emulator according to various embodiments of the present disclosure.

As shown in FIG. 69, once a user begins listening to a station, the Time Stamping Timer 6702 resets to the beginning (zero). In the illustrated embodiment, the user has begun listening to a station 6902, and the Time Stamping Timer 6702 has reset and currently indicates that one second has elapsed from the reset.

The software continues to record time for the content on the station until either the song ends or the station is changed (switched) by the user. The process continues until the Face-Off feature is completed (i.e., all songs finish). Each song starts at the beginning.

Figure 70:
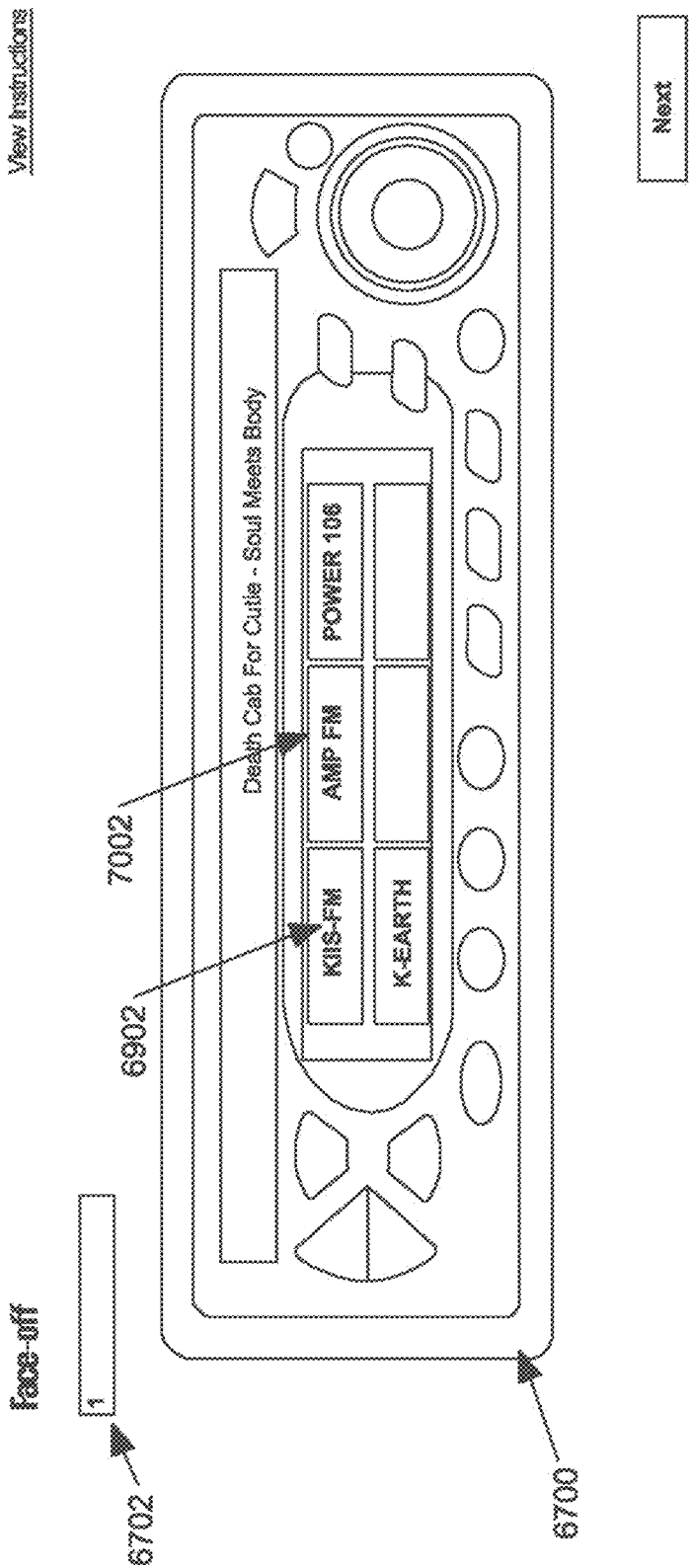
FIG. 70 is a Face-Off emulator according to various embodiments of the present disclosure.

As shown in FIG. 70, the user has switched the station from "KIIS-FM" 6902 to "AMP-FM" 7002, which has reset the Time Stamping Timer 6702.

Figure 71:
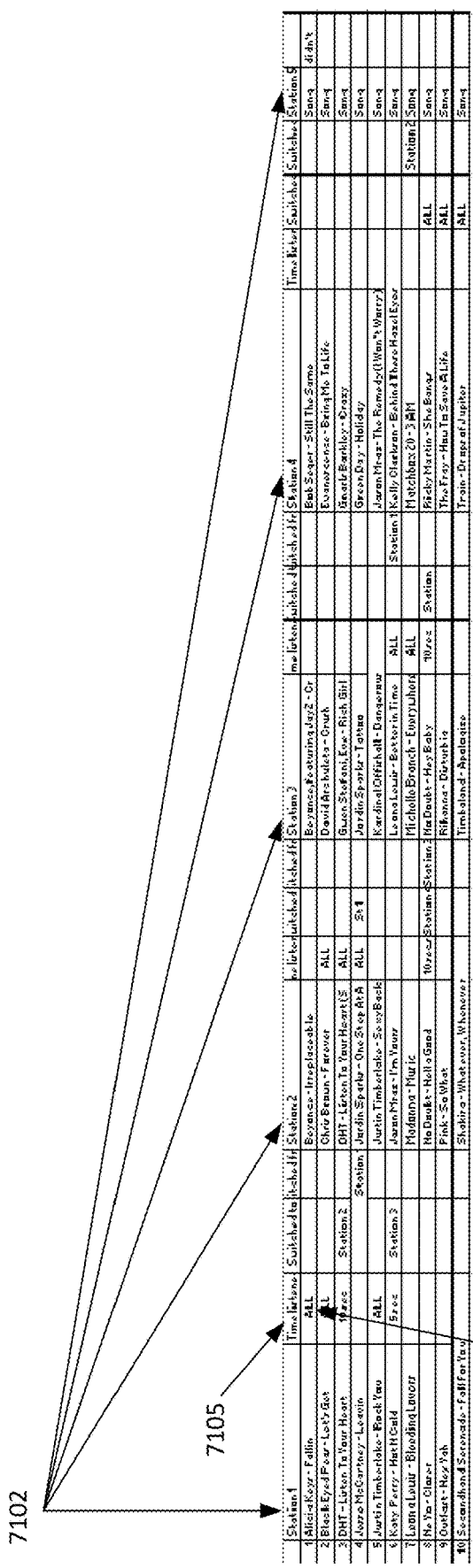
FIG. 71 is a display of Face-Off stations and playlists according to various embodiments of the present disclosure.

As shown in FIG. 71, which illustrates playlists of stations 7102 and corresponding songs played by those stations in an embodiment of the Face-Off, once the user starts on any available station 7102, all of the loaded songs start playing, although only the station selected by the user is heard audibly. For example, in the illustrated embodiment, the user listened to all of the song "Fallin'" 7104 first on Station 1, as denoted by the entry of "ALL" 7106 in the corresponding cell for the song in the column titled "Time Listened" 7105. At the same time, the first songs on Stations 2, 3, and 4 are started but are not heard audibly by the user. The Face-Off process continues until all songs have finished playing.

In this manner, the Radio Face-Off can help determine what causes users to tune out and user the information collected to make better products. Although all the songs in the illustrated embodiment were generally of the same length, which can enable a client to assess station-against-station performance, the Face-Off feature is not diluted if songs of varying lengths are uploaded per the setup described above.

Figure 72:
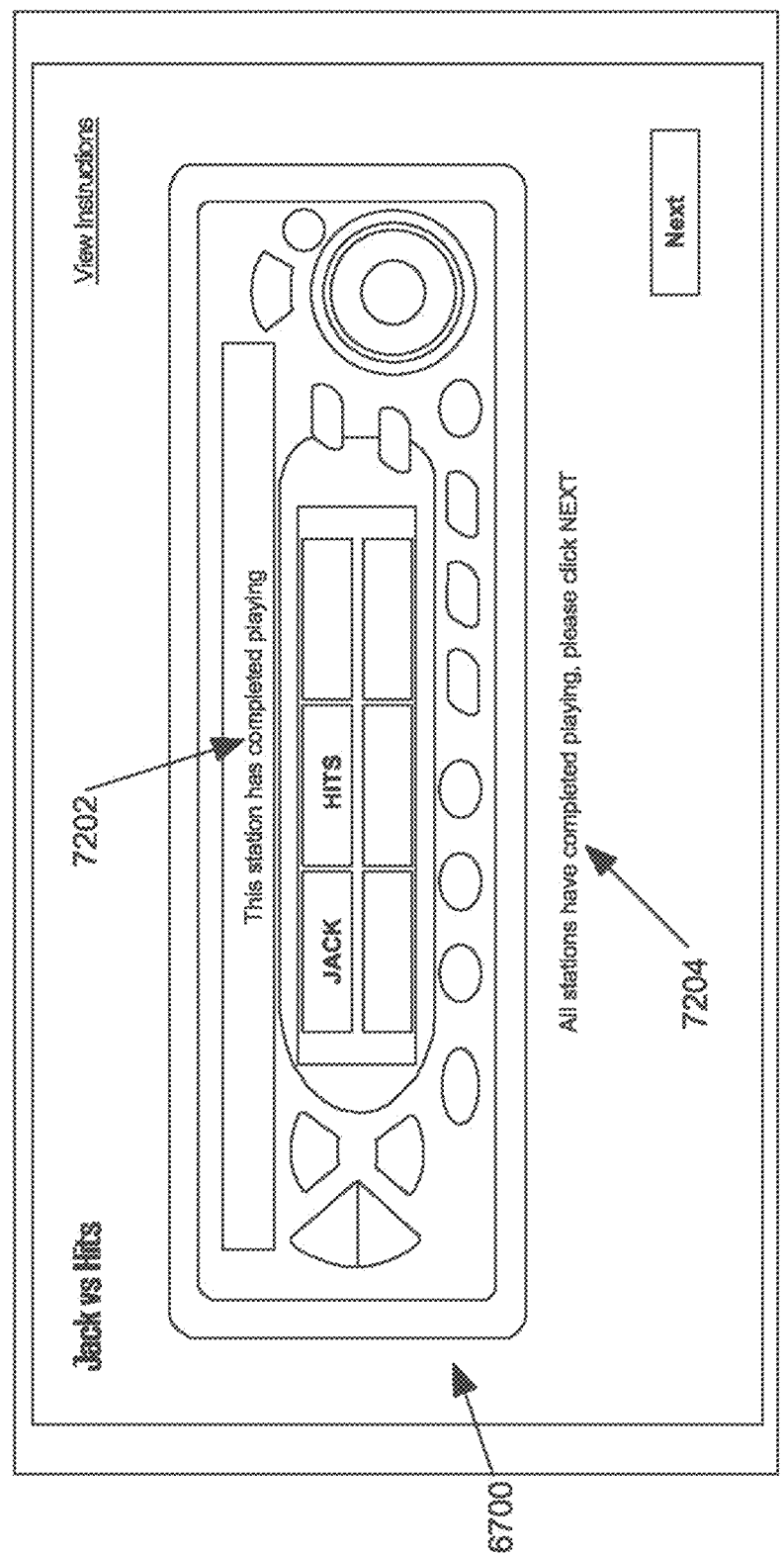
FIG. 72 is a Face-Off emulator according to various embodiments of the present disclosure.

As shown in FIG. 72, the system will display a message in 7202 or adjacent to 7204 the emulator 6700 when the Face-Off process has completed.

Figure 73:
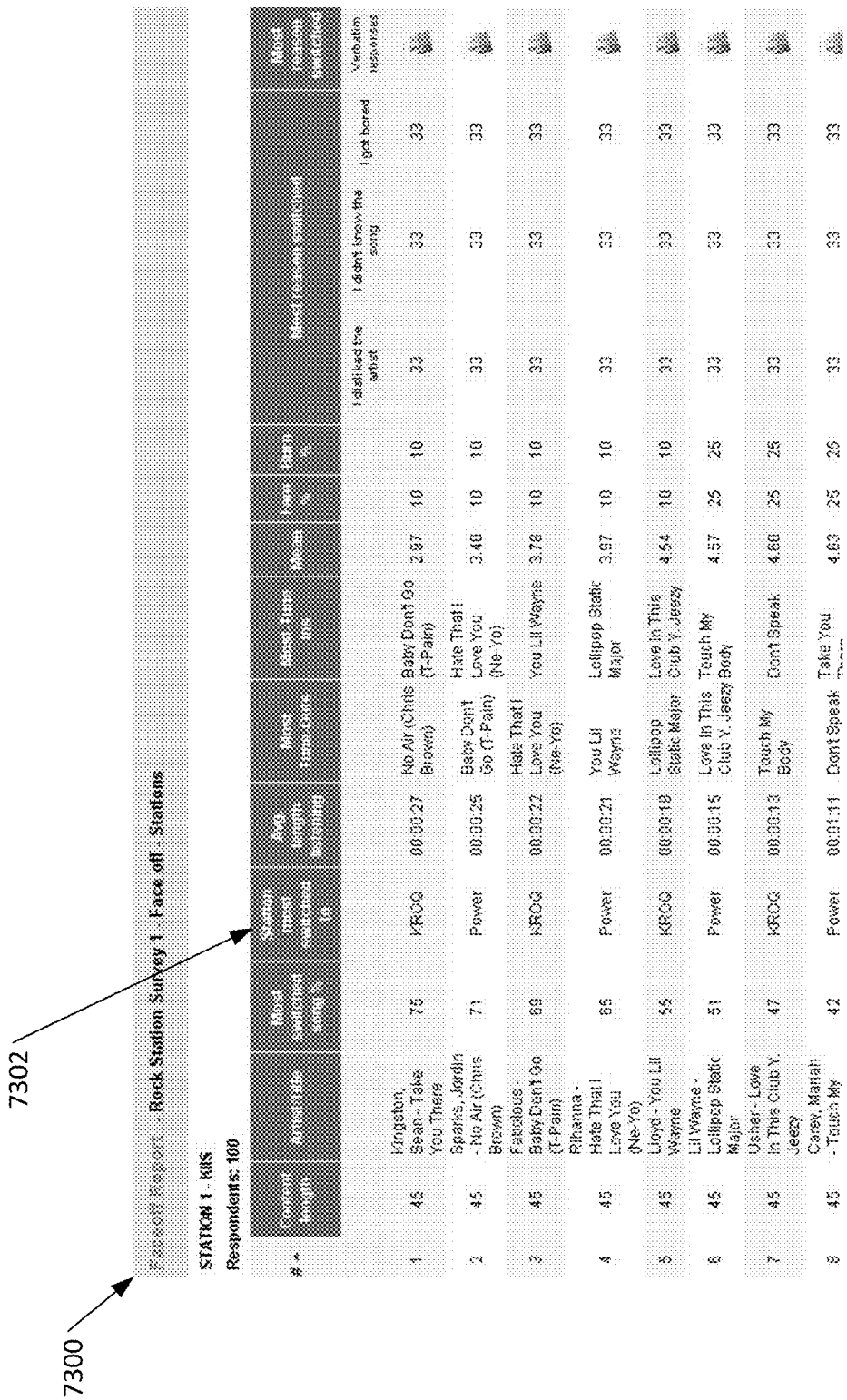
FIG. 73 is a Face-Off report according to various embodiments of the present disclosure.

As shown in FIG. 73, a Face-Off report 7300 shows the Face-Off feature being utilized to track multiple stations 7302, with the multiple utilizations being merged into the illustrated report 7300 that displays stations 7302 to which users have switched while the Face-Off feature is being utilized.

Figure 74:
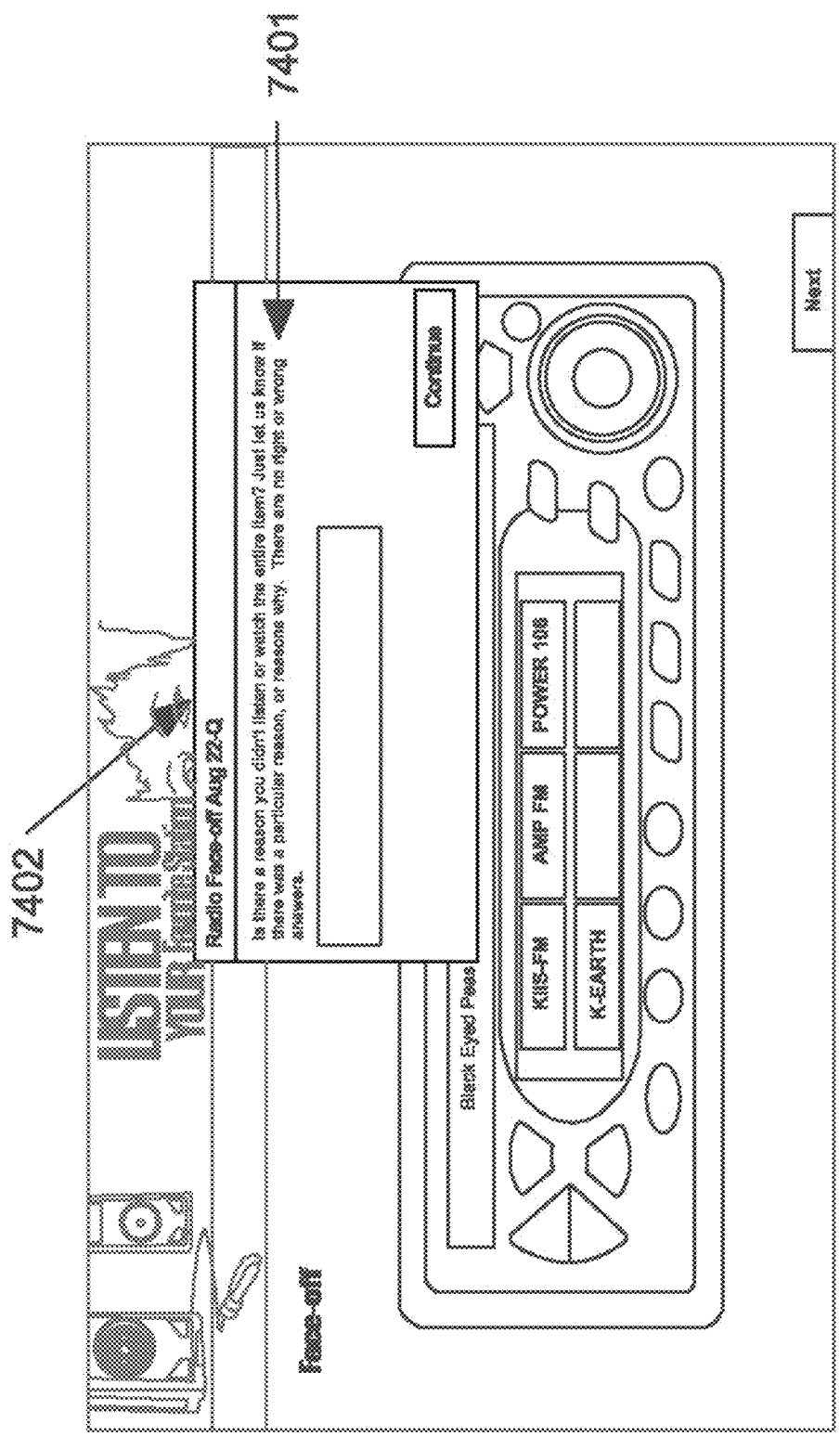
FIG. 74 is a Pop-up question display according to various embodiments of the present disclosure.

As shown in FIG. 74, a client can, at its discretion, also ask Pop-up questions 7401 in a Pop-up display 7402 when a user switches the radio station. This allows even more information to be gathered. In addition to all the information described above, clients can dig deeper, which helps them fine-tune their content. If a user never switches stations, they might not be presented with questions.

Figure 75:
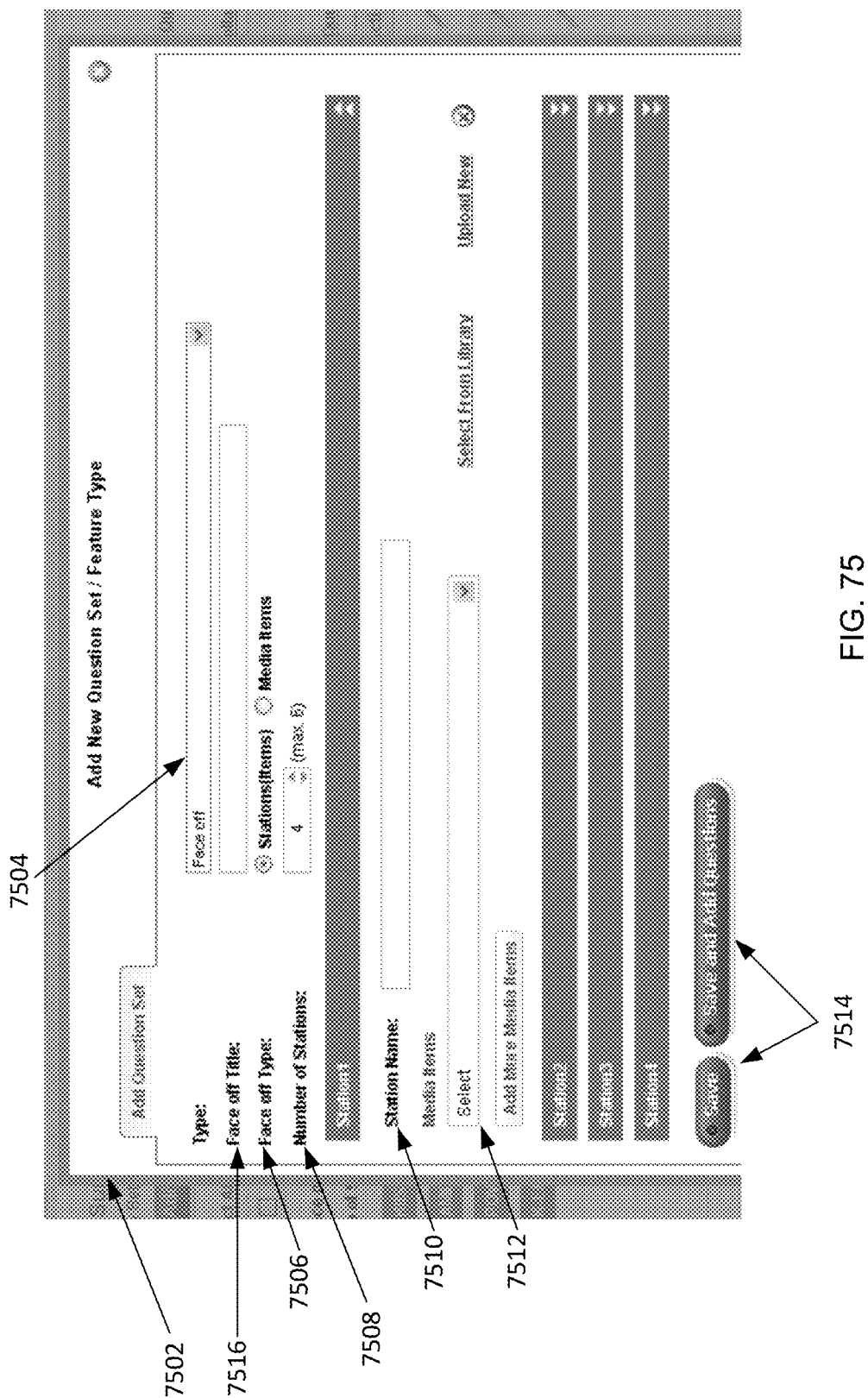
FIG. 75 is a Question Set menu according to various embodiments of the present disclosure.

As illustrated by an embodiment in FIG. 75, the Radio Face-Off feature can be set up by a client in a menu display 7502. The client can select the Face-Off feature from a drop-down Type menu 7504 and can select "stations" as the type 7506 of Face-Off. The client decides, in some embodiments, how many stations 7508 the client wishes to create. The client can name 7510 the stations that they wish to create and select 7512 the content for the station to utilize. Content can include song hooks, full versions of a song, commercial breaks, jock content (i.e., announcers), jingles, or other content that would represent an actual period of radio broadcasting. Song hooks can include portions of a song that can be any length. Songs can be selected from a drop-down menu, a library, or they can be uploaded. The client can save the question set and additionally add new questions 7514. In addition, the client can name 7516 the Face-Off Title. After selecting the media content for a station, the client can create questions to be asked when a user switches stations.

Figure 76:
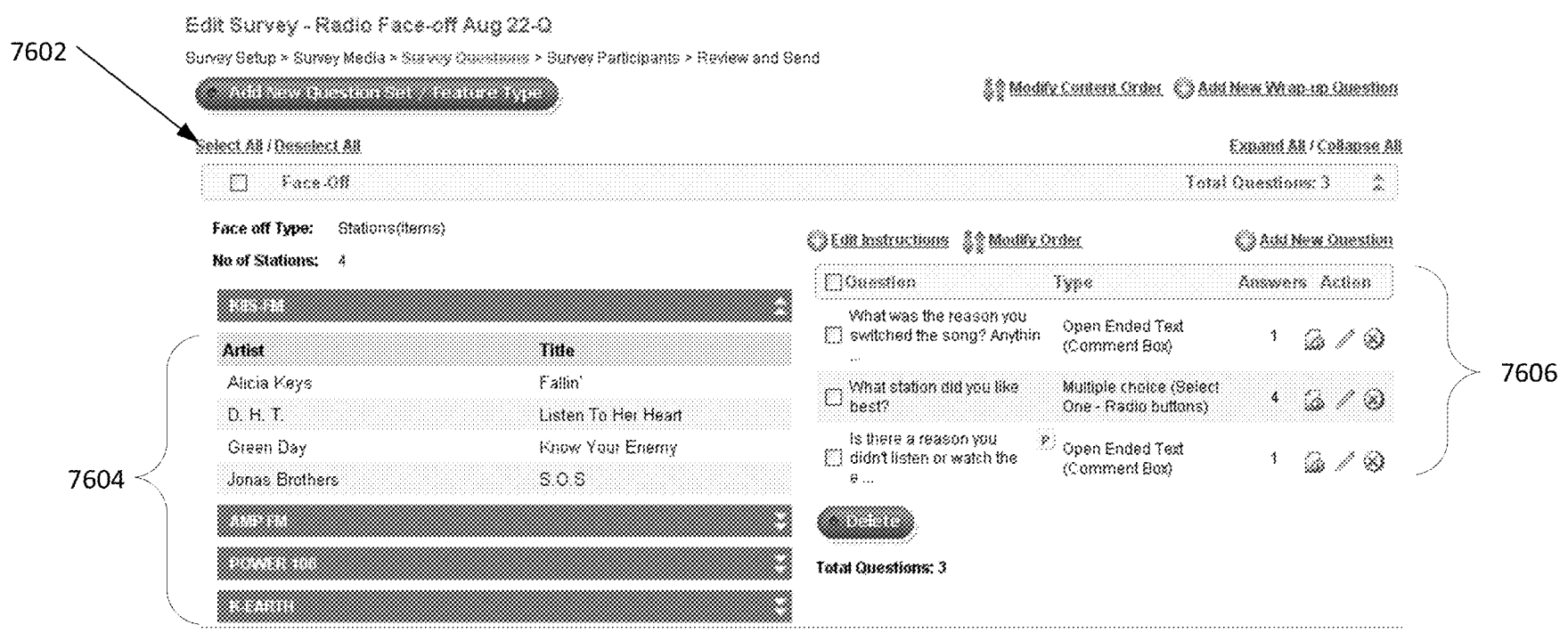

As illustrated in FIG. 76, a client can access a Survey Questions area 7602 of the system after setting up the Face-Off feature. The client can view a list 7604 of stations created as well as a list 7606 of survey questions. The client can expand each station displayed in the list 7604 to ensure that the list 7604 is correct.

Audio Face-Off

Audio Face-Off can utilize the same Time Stamping feature as Radio Face-Off, whether it's audio or video, no matter which type of media a client is testing. The feature captures the start time, the stop time, the pause time, and the total duration of time spent to answer all the questions before a user continues onto the next item on a survey.

Questions can be asked of the user in between listening to each item as well. The use of Popup or Stop questions can be implemented at client discretion.

Figure 77:
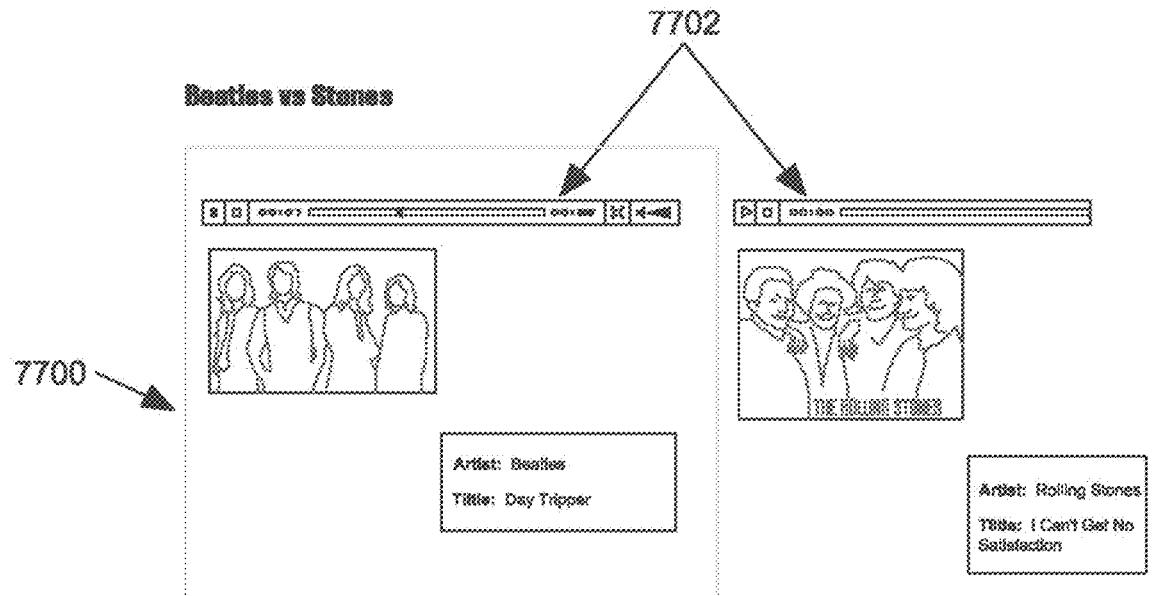
FIG. 77 is an Audio Face-Off display according to various embodiments of the present disclosure.
Figure 78:
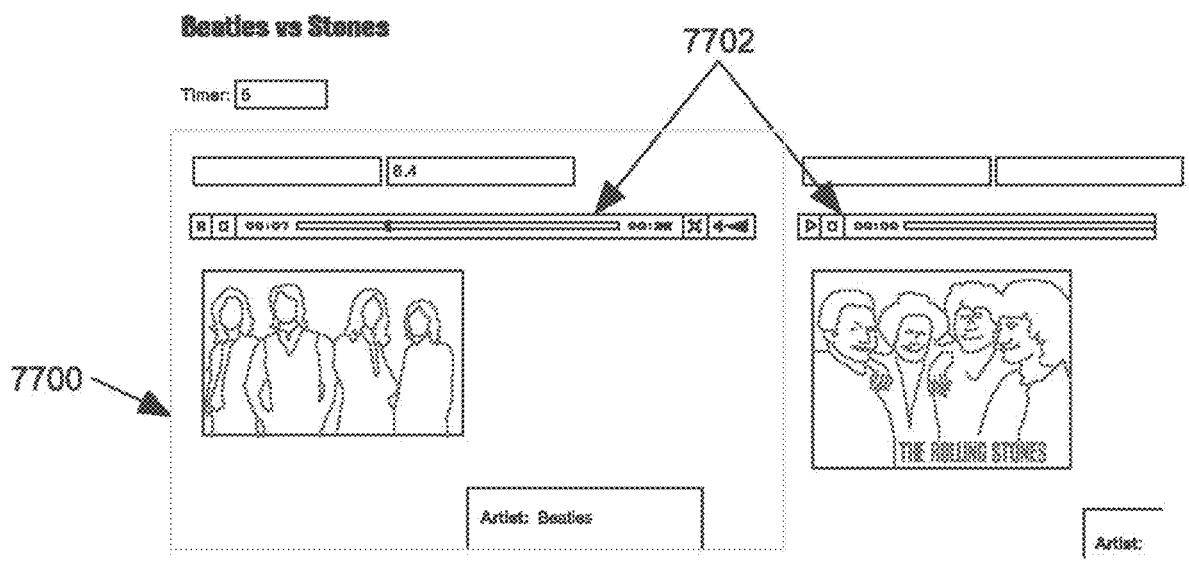
FIG. 78 is an Audio Face-Off display according to various embodiments of the present disclosure.

FIG. 77 illustrates an embodiment of the Audio Face-Off feature where audio content 7702, such as songs, are presented to the user in a display 7700. In the illustrated embodiment, the Face-Off feature tracks a user's listening to either songs by the Beatles or songs by the Rolling Stones. As shown in FIG. 78, Time Stamping functionality is utilized, as illustrated by the Time Stamping Timer 7802, to track the user's listening to the presented audio content 7702 in display 7700.

Video Face-Off

Figure 79:
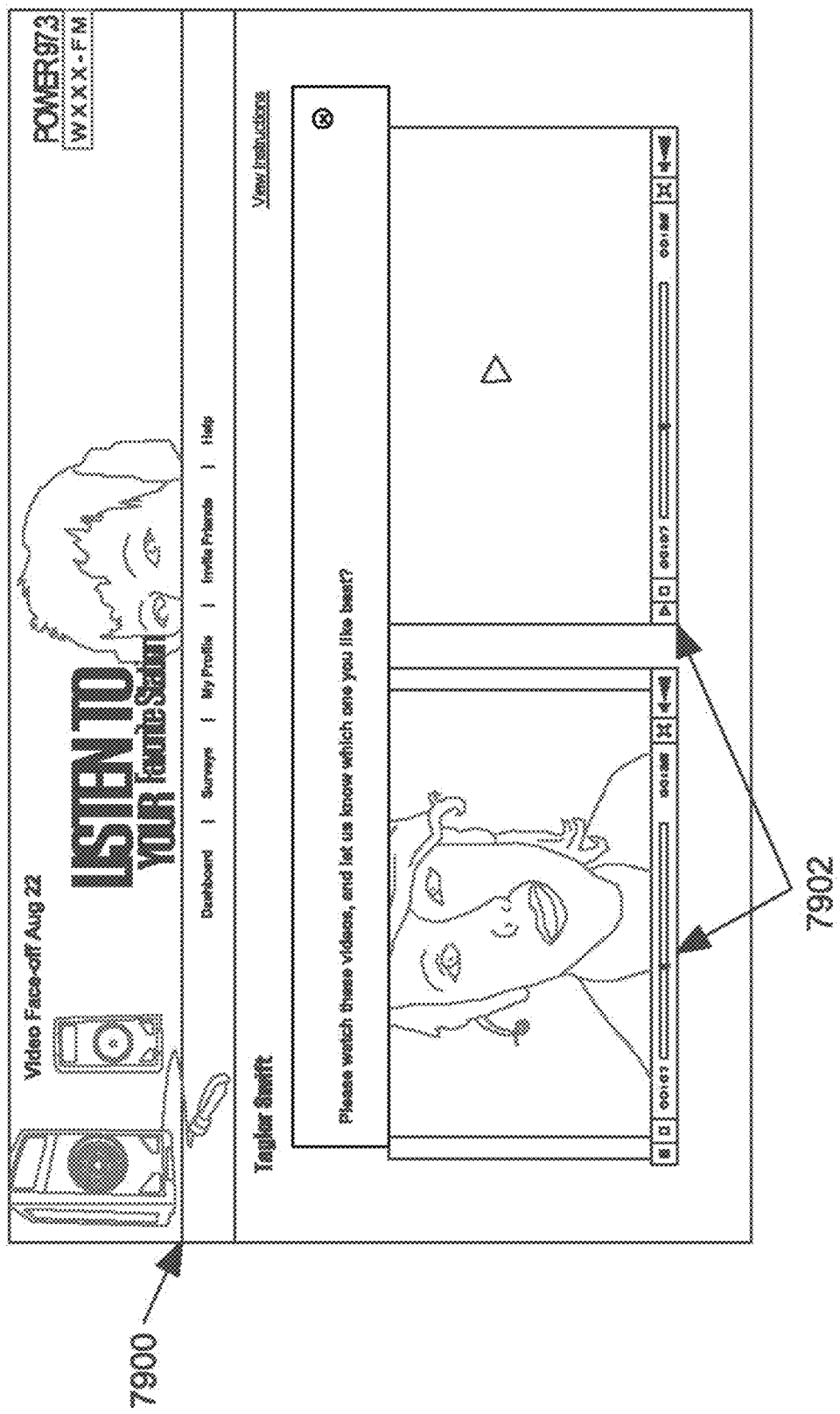
FIG. 79 is a Video Face-Off display according to various embodiments of the present disclosure.
Figures 80, 81:
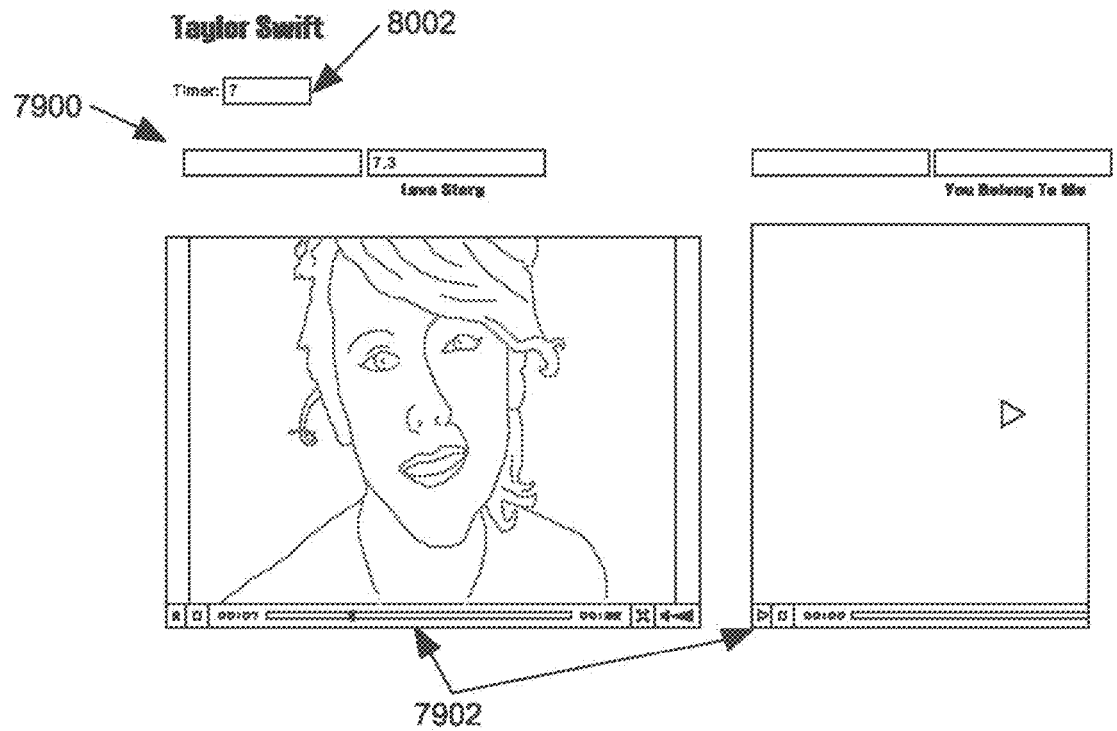
FIG. 80 is a Video Face-Off display according to various embodiments of the present disclosure.
FIG. 81 is a Face-Off report according to various embodiments of the present disclosure.

Referring now to FIG. 79, an embodiment of the Video Face-Off is illustrated and discussed. Similar to the Audio Face-Off, the user is presented with a display 7900 that includes one or more videos 7902, and the user's viewing of the presenting videos is tracked. As shown in FIG. 80, Time Stamping functionality is utilized with a Time Stamping Timer 8002 to track the user's listening to the video content 7902 presented in display 7900.

As shown in FIG. 81, Face-Off reports 8100 for Videos can be accessed by the client and can display so or all of the same types of information available in reports for Radio Face-Offs discussed above. In addition, as shown in FIG. 82, Time Stamping reports 8200 can be generated for the Video Face-Off and viewed by the client.

Ultimately, the Face-Off functionality is designed to dig deeper into why users feel as they do about content. So not only do clients learn the scores (results, e.g. "Mean score, Familiarity, etc.), but clients can also know when users respond, and why users respond.

Figures 82, 83:
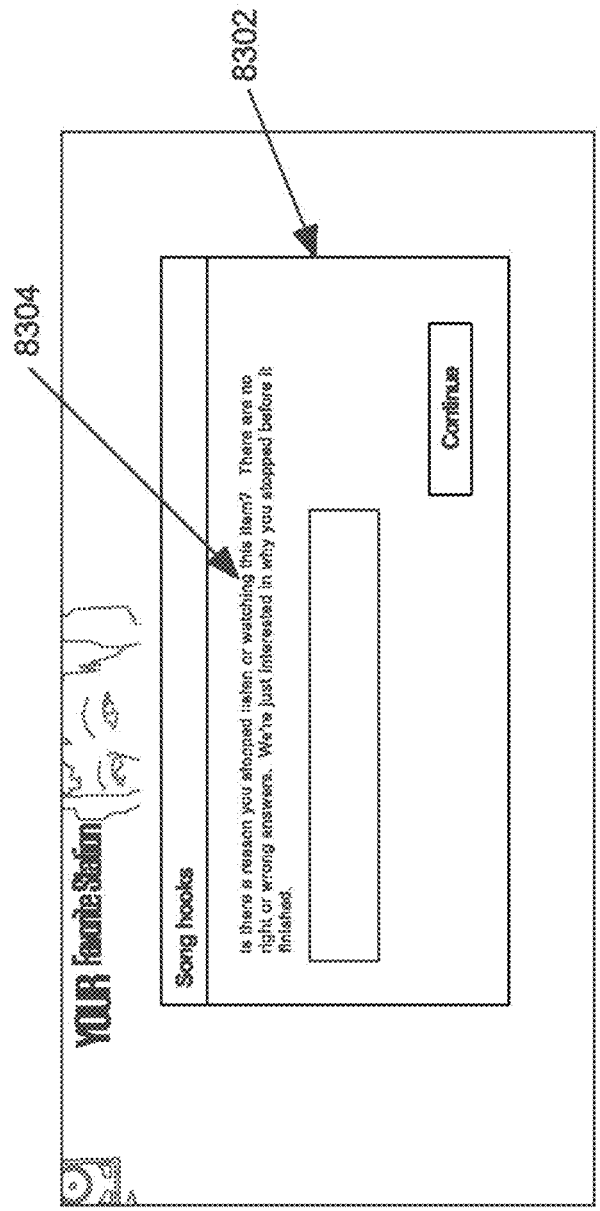
FIG. 82 is a Time Stamping report according to various embodiments of the present disclosure.
FIG. 83 is a Pop-up question display according to various embodiments of the present disclosure.

In the embodiment illustrated in FIG. 83, a Pop-up question 8304 presented in a Pop-up display 8302 queries a user who has stopped listening to a media item presented in a Face-Off feature. In this manner, the user can provide feedback indicating why the use stopped listening or viewing the content.

Figure 84:
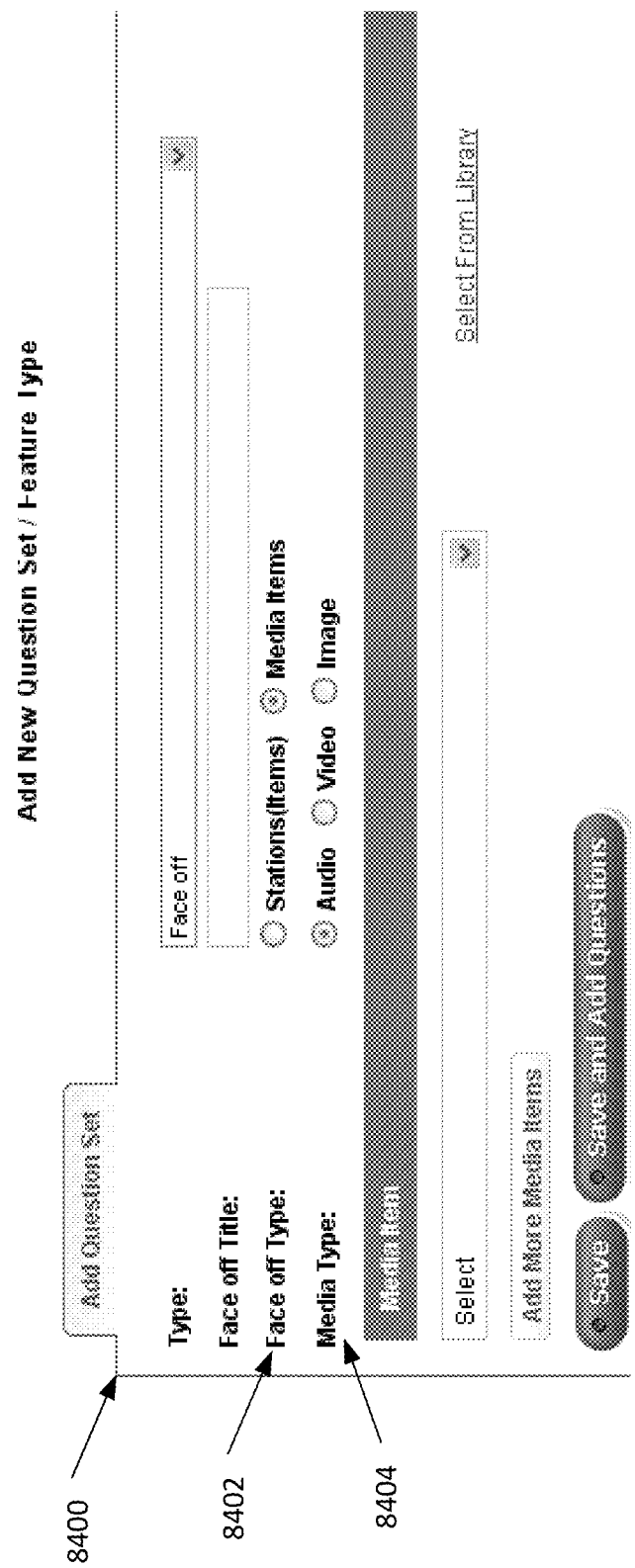
FIG. 84 is a question set addition menu according to various embodiments of the present disclosure.

The process for loading Image, Video or Audio Face-Offs, as shown in FIG. 84, is the same as the Radio Face-Off loading process described above, although Image Face-Off does not utilize Time Stamping. As shown in the illustrated embodiment of an Add Question Set menu 8400, instead of selecting "Stations" as the Face-Off Type 8402, a client can select "Media Items". The client can select between Audio, Video, or Image as the Media Type 8404. In the illustrated embodiment, the client has selected the Audio Media Type 8404.

Trendsetters

Trendsetters refers to how a user performs against his or her peers, which refers to the user's proficiency in scoring content presented to the user.

Trendsetters is an algorithm in a system which takes data collected from each individual user and applies calculations to determine the user's scoring proficiency against that of other users. The information provided by Trendsetters can be customized by the client and can also be available in the filtering criteria.

Figure 85:
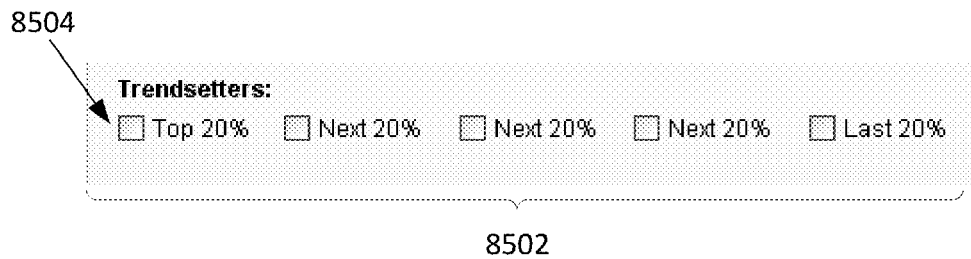
FIG. 85 is a trendsetters group selection menu according to various embodiments of the present disclosure.

Referring to FIG. 85, a client can customize trendsetters to present users who are calculated to have a certain range 8502 of scoring proficiency. For example, a client can select Trendsetters to display users whose calculated proficiency is in the top 20th percentile 8504.

Figure 86:
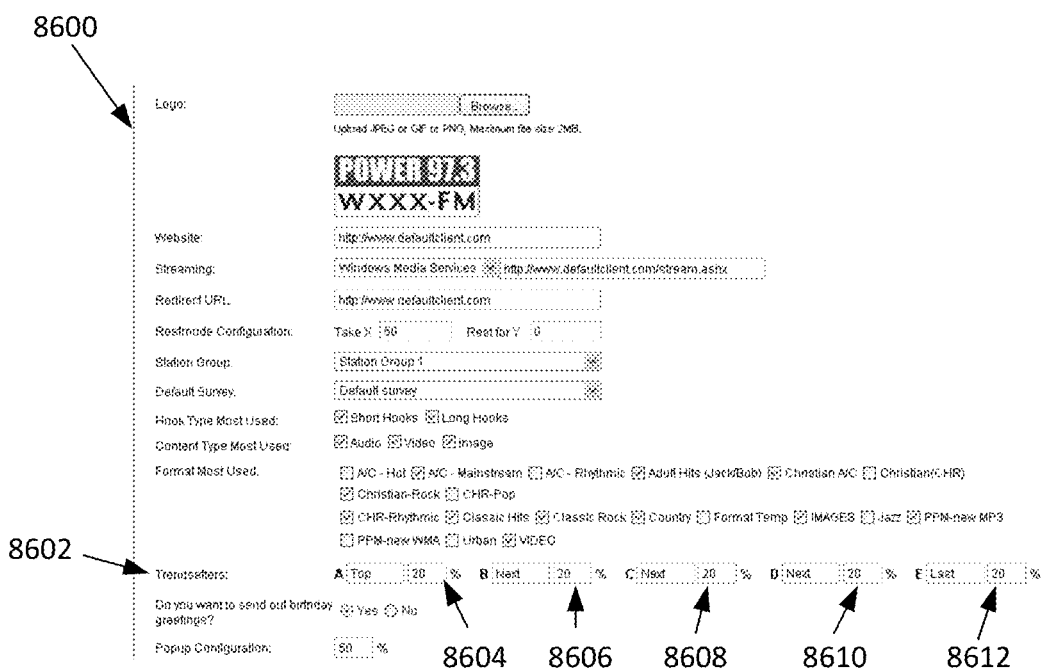
FIG. 86 is a client display according to various embodiments of the present disclosure.

In another embodiment, illustrated in FIG. 86, the user can utilize a menu display 8600 to customize the Trendsetters settings to provide one or more sets 8602 of users based on scoring proficiency. For example, the client can set group A 8604 to be users with a scoring proficiency in the top 20th percentile, while group B 8606 can be set as users with a scoring proficiency in the next 20th percentile, and so forth for group C 8608, group D 8610, and group E 8612.

A user's scoring proficiency is determined as how close the user's individual scores of content are to the mean of all listener's scores. The closer a user's scores are to the mean score, the more proficient a scorer the user is.

Figures 87, 88:
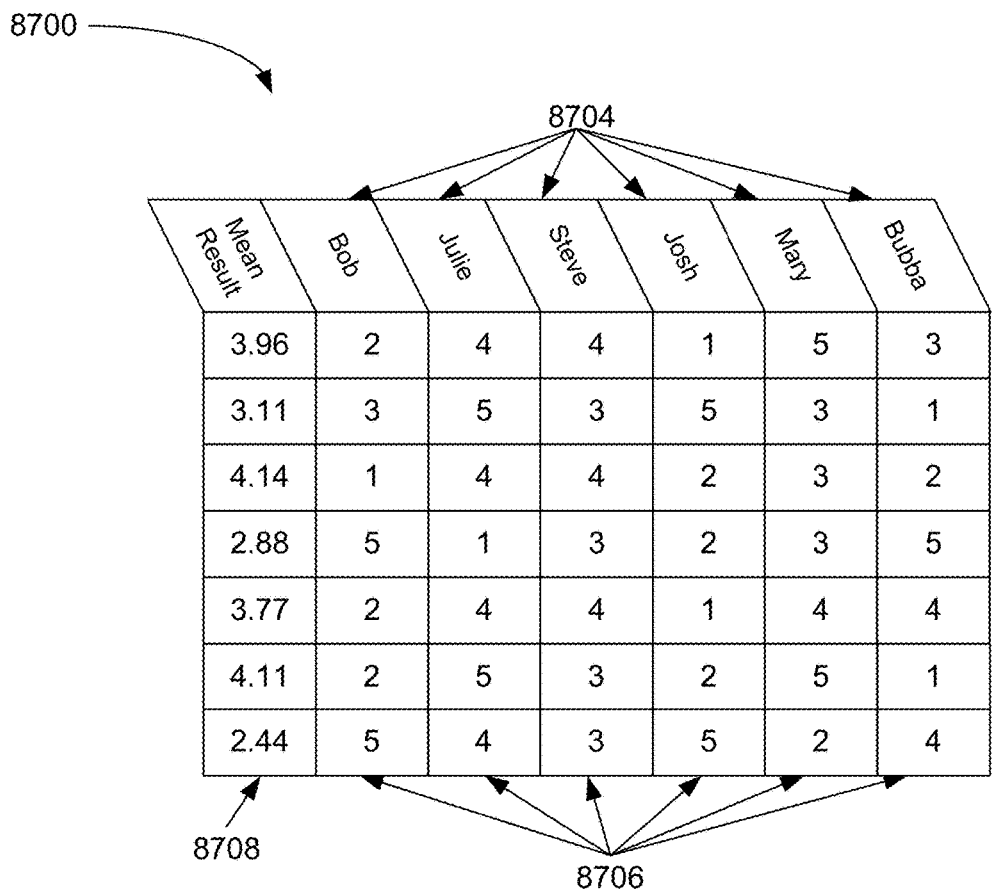
FIG. 87 is a trendsetters data table according to various embodiments of the present disclosure.
FIG. 88 is a trendsetters data table according to various embodiments of the present disclosure.

Referring next to FIG. 87, calculations of individual and overall performance to identify Trendsetters are illustrated and discussed. Trendsetter ratings are calculated based on both individual and overall performance. For example, in the illustrated table 8700, the scores for all users 8704 are listed, with the individual scores of each user for each media item displayed in columns 8706. The mean score of all users for each media item is displayed in column 8708.

As illustrated in FIG. 88, once the individual scores 8802 are known for each user, the deviation of each user for a given media item can be calculated in Table 8800. In some embodiments, the formula for the deviation of each user for a given media item is as follows:

Individual Deviation=Absolute (User Score 8802−Mean Score 8804)

Next, the total deviations for each user is calculated as:

Total Deviation 8803=Sum (All Individual Deviations for a User)

For example, in the illustrated embodiment in FIG. 88, user Steve has a Total Deviation 8803 of 2.31, as shown in cell 8805. Under the Trendsetters algorithm, the users with the greatest scoring proficiency will have the smallest total deviation and can be ranked from greatest to least scoring proficiency. For example, Steve has the highest scoring proficiency 8806 because he has the lowest Total Deviation 8803, as illustrated in cell 8805.

Figure 89:
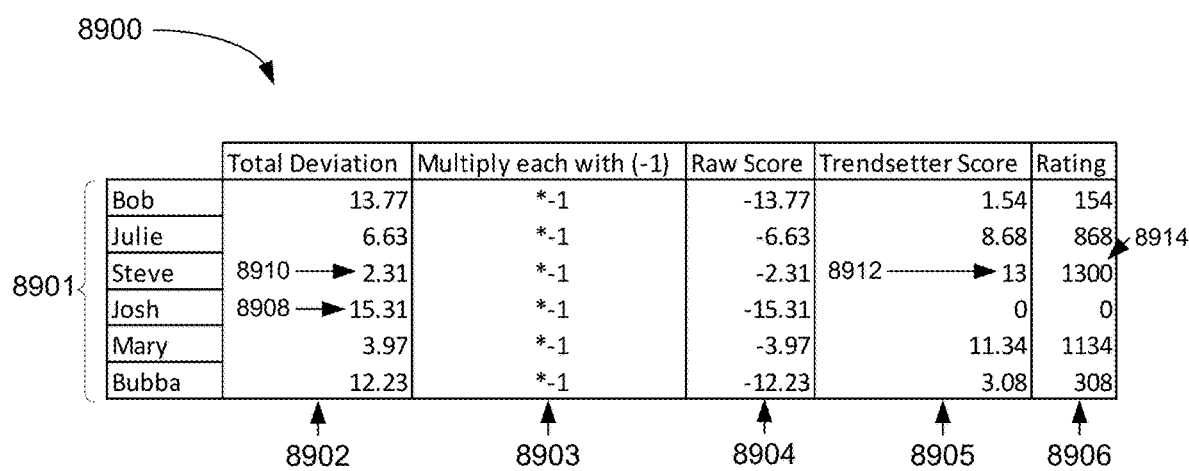
FIG. 89 is a trendsetters data table according to various embodiments of the present disclosure.

As shown in FIG. 89, each user's 8901 scoring proficiency rating 8806 in FIG. 88 is determined by submitting each user's Total Deviation 8902 to a series of manipulations in table 8900. First, each user's Total Deviation 8902 is multiplied by "−1" 8903 to give the user's Raw Score 8904. Next, the largest Total Deviation 8902 is added to each of the Raw Scores 8904 to give each user's Trendsetter Score 8905. For example, in the illustrated embodiment, Josh has the largest Total Deviation of 15.31, as shown in cell 8908, which is added to each user's Raw Score 8904 to give each user's Trendsetter Score 8905. Each user's Trendsetter score 8905 is then multiplied by 100 to give each user's scoring proficiency rating 8906. For example, in the illustrated embodiment, Steve's Total Deviation 8910 of 2.31 is multiplied by −1 and Josh's largest Total Deviation 8908 of 15.31 to get a Trendsetter Score 8912 of 13, which is multiplied by 100 to give Steve a scoring proficiency rating 8914 of 1300.

In this way, the user with the highest scoring proficiency receives the highest rating. For example, in the illustrated embodiment, Steve has the lowest Total Deviation 8910 at 2.31, indicating that he had the greatest scoring proficiency, as illustrated 8806 in FIG. 88.

Survey Processes

Figure 90:
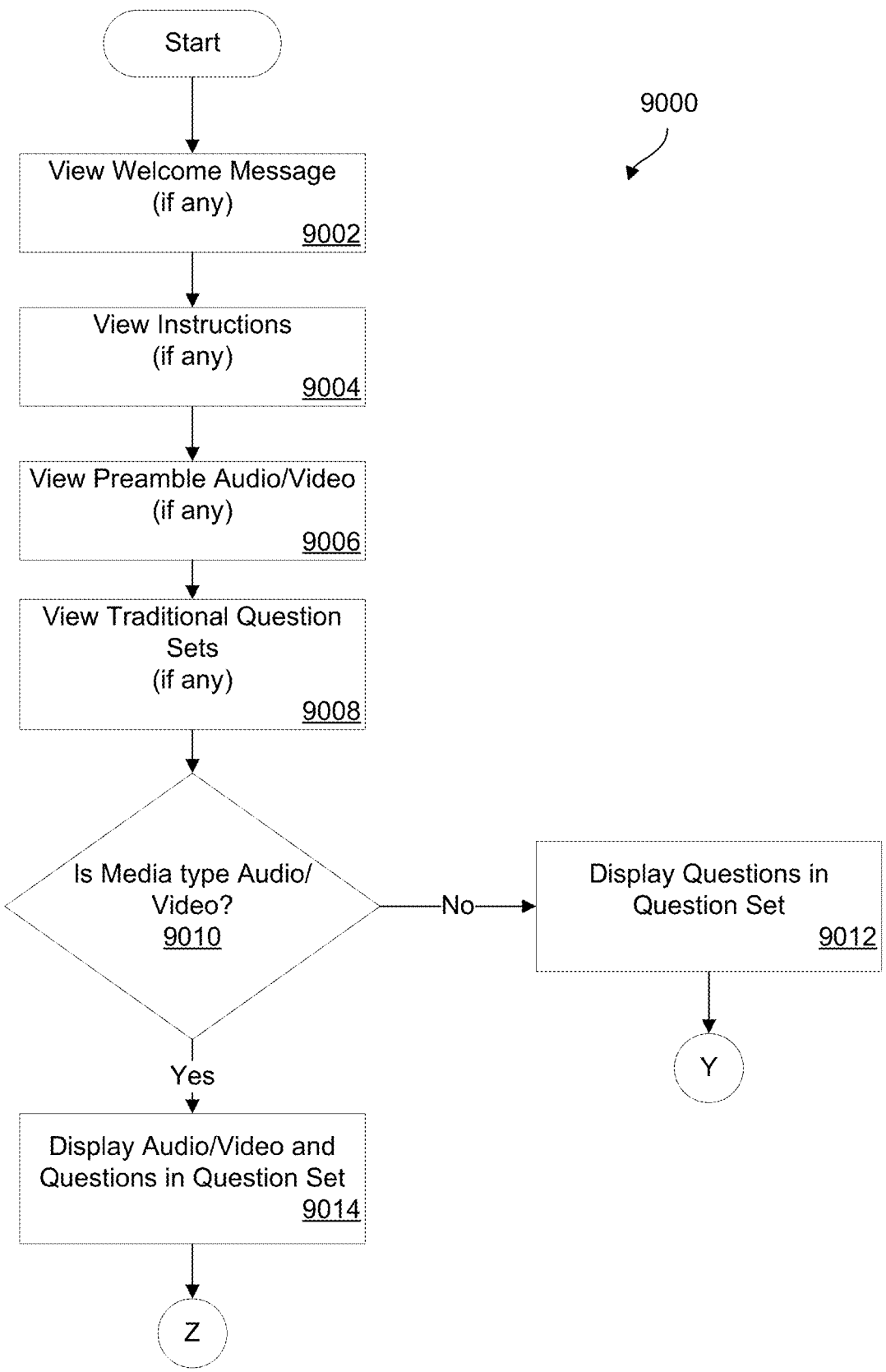
FIGS. 90-119 are flowcharts according to various embodiments of the present disclosure

Referring now to FIG. 90, a process 9000 by which a user can be allowed to participate in a Traditional Survey is illustrated and discussed. As shown in block 9002, a user can be presented with a welcome message, if any. As shown in block 9004, the user can be presented with instructions, if there are any. As shown in block 9006, the user can be presented with Preamble Audio/Video, if there is any.

As shown in block 9008, the user can be presented with Traditional Survey Question Sets. As shown in Blocks 9010 and 9012, if the media type involved in the survey is not Audio or Video, then questions will be displayed in a question set, and the process will proceed to point Y. As shown in blocks 9010 and 9014, if the media type involved in the survey is Audio or Video, the Audio or Video will be displayed to the user, along with questions in a question set, and the process will proceed to point Z.

Figure 91:
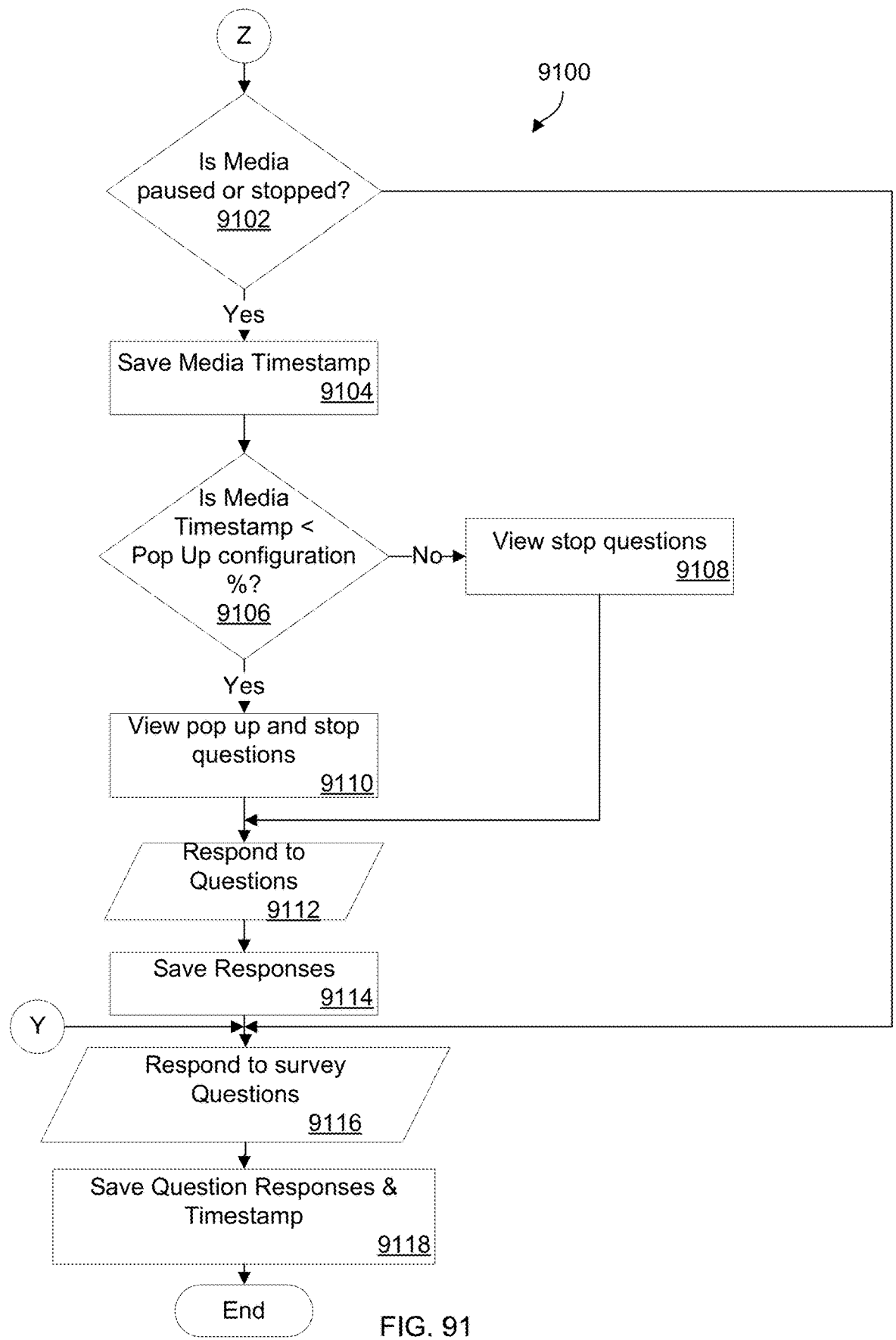

Referring now to FIG. 91, a process 9100, continued from FIG. 90, by which a user can be allowed to participate in a Traditional Survey is illustrated and discussed. As shown in block 9102, a process proceeding from point Z will determine if media is paused or stopped. As shown in blocks 9116 and 9118, if the media is not paused or stopped, or if the process is proceeding from point Y, the user will be allowed to respond to survey questions, the responses to which are saved, along with a timestamp, and the process ends. As shown in block 9104, if media is paused or stopped, a Media Timestamp is saved. As shown in block 9106, a determination is made as to whether the Media Timestamp is less than a Pop-up configuration percentage. As shown in block 9110, if the media Timestamp is less than a Pop-up configuration percentage, the user is presented with Pop-up and Stop questions, if there are any. As shown in block 9108, if the Media Timestamp is not less than a Pop-up configuration percentage, the user is presented with Stop questions, if there are any. As shown in block 9112, the user responds to questions presented. As shown in block 9114, user responses are saved.

Figure 92:
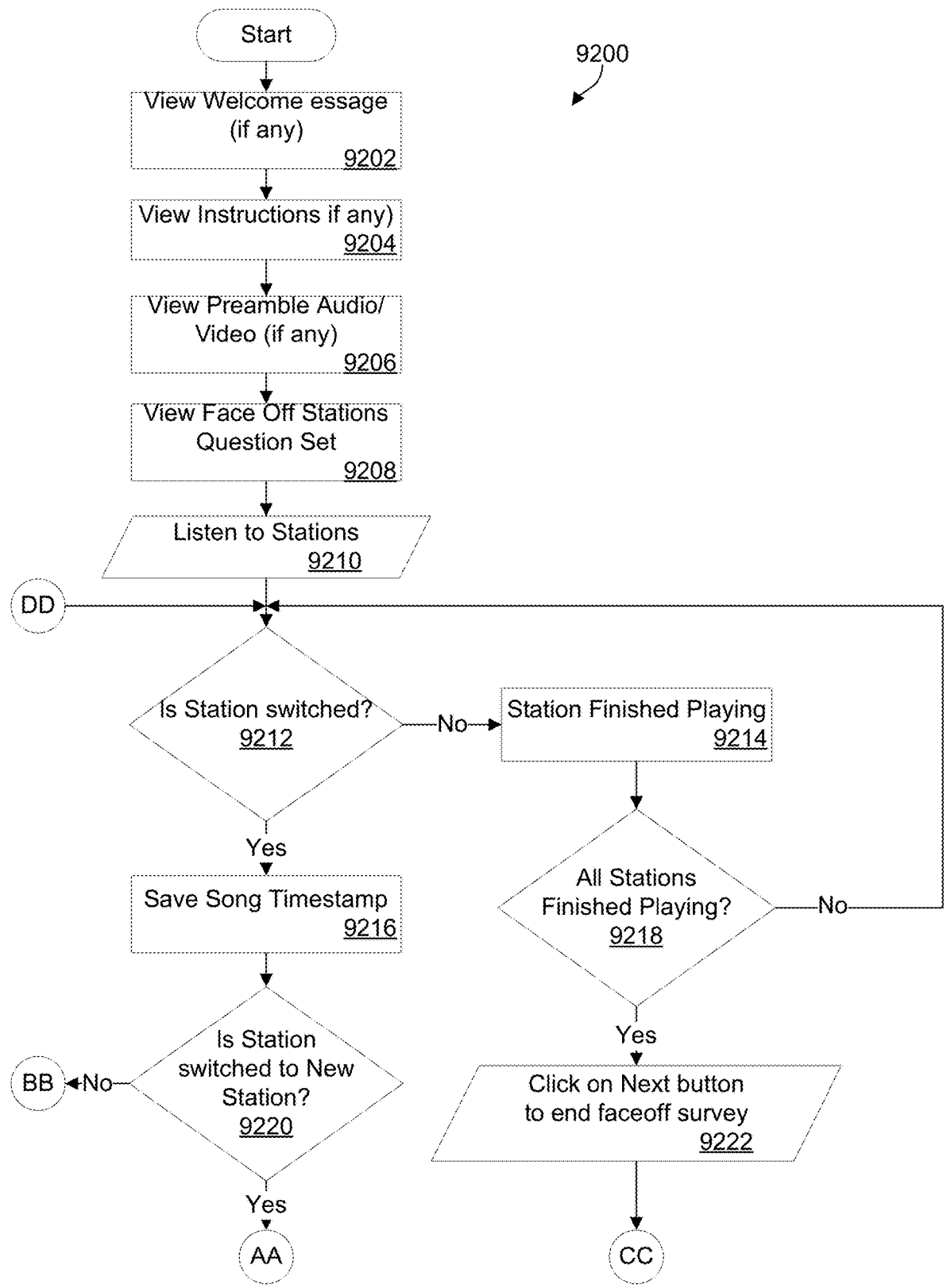

Referring now to FIG. 92, a process 9200 by which a user can participate in a Face-Off Survey is illustrated and discussed. As shown in block 9202, a user is presented with a welcome message, if there is any. As shown in block 9204, the user is presented with instructions, if there are any. As shown in block 9206, the user is presented with Preamble Audio/Video, if there is any. As shown in block 9208, the user is presented with a Face-Off Question Set. As shown in block 9210, the user is presented with stations, to which the user listens. As shown in block 9212, a determination is made, after a user has begun listening to stations, after the process has proceeded from point DD, or after all stations have been determined in block 9218 to have not finished playing, as to whether a station has been switched. As shown in block 9214, 9218, and 9222, if a station is determined to have not been switched, then the station finishes playing, at which a determination is made in block 9218 as to whether all stations have finished playing. If they have, then the user must, in block 9222, block on a Next button to end the Face-Off Survey and allow the process to proceed to point CC. As shown in block 9216, if a station has been switched, then a Song Timestamp is saved. As shown in block 9220, a determination is made as to whether a station has been switched to a new station. If it has not, the process proceeds to point BB; if it has, then the process proceeds to point AA.

Figure 93:
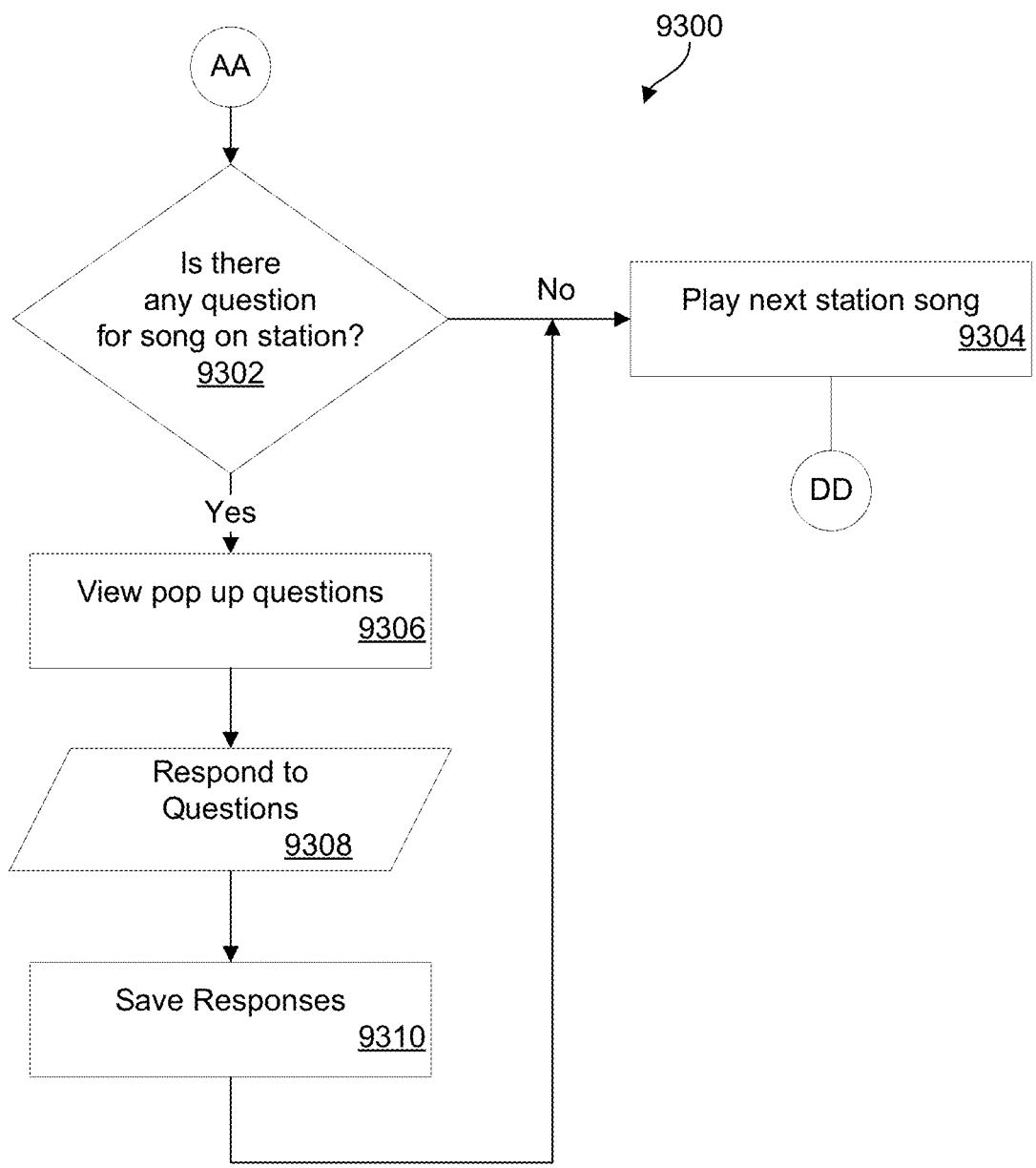

Referring now to FIG. 93, a process 9300, proceeding from point AA in FIG. 92 by which a user can participate in a Face-Off Survey is illustrated and discussed. As shown in block 9302, a determination is made whether there is any question for a song of a station. If there is no question to the song on the station, as shown in block 9304, the next station song is played, and the process proceeds to point DD. As shown in block 9306, if there is a question for the song on the station, the user is presented with Pop-up questions, if there are any. As shown in block 9308, the user responds to the questions. As shown in block 9310, the responses are saved, and the process proceeds to block 9304.

Figure 94:
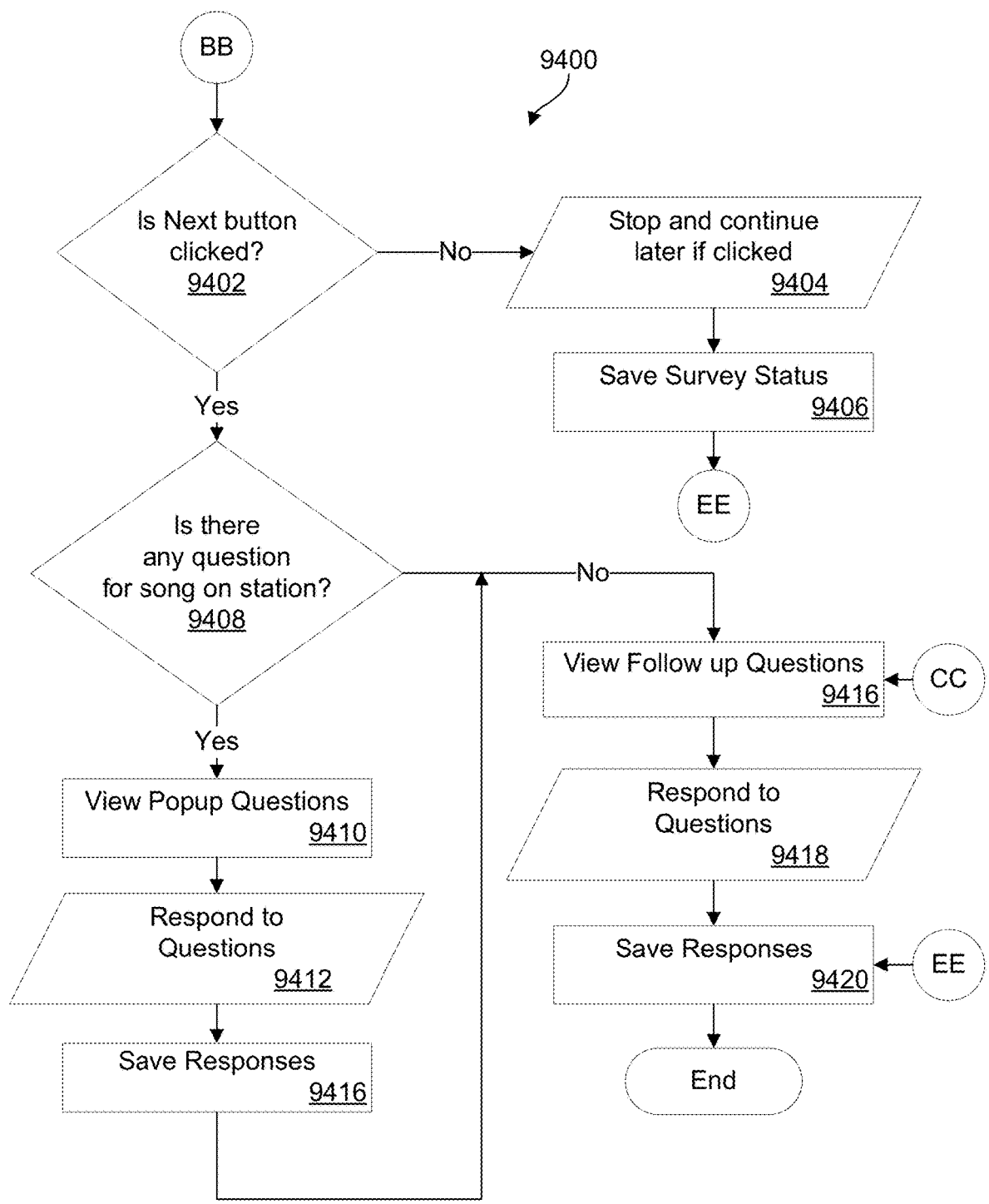

Referring now to FIG. 94, a process 9400, proceeding from point BB in FIG. 92 by which a user can participate in a Face-Off Survey is illustrated and discussed. As shown in block 9402, a determination is made whether a Next button is clicked. If not, as shown in blocks 9404 and 9406, the process stops and continues later if the Next button is clicked, the Survey Status is saved, and the process proceeds to point EE. It the Next button is block, as shown in block 9408, a determination is made whether there are any questions for the song on the station. As shown in blocks 9410, 9412, and 9414, if there is a question for the song on the station, the user can be allowed to view Pop-up questions, if there are any, respond to the questions with responses that are saved. As shown in block 9416, the user can be allowed to view follow-up questions. As shown in block 9418, the user can be allowed to respond to questions. As shown in block 9420, the responses are saved.

Figure 95:
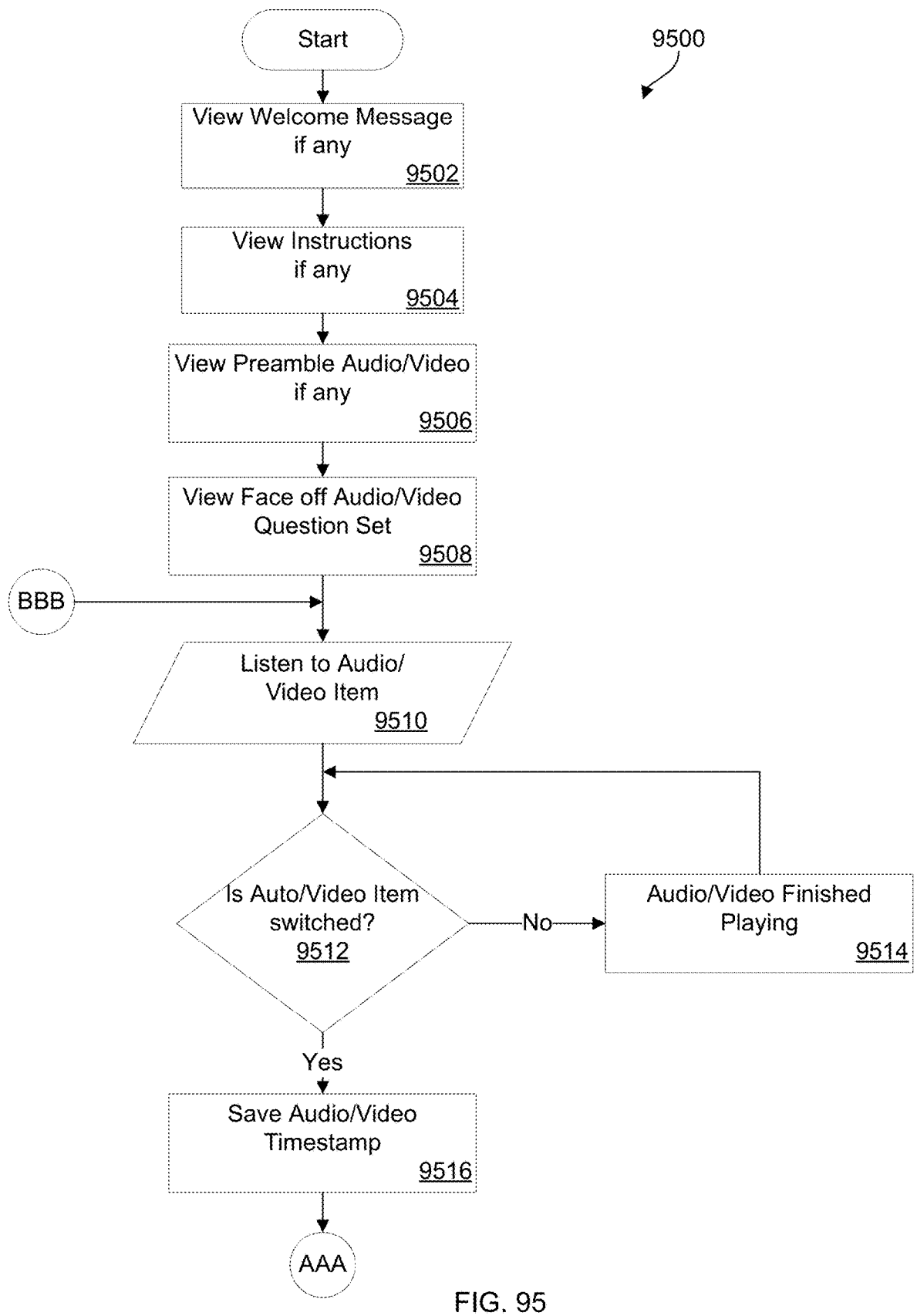

Referring now to FIG. 95, a process 9500, proceeding to point AAA by which a user can participate in a Face-Off Survey is illustrated and discussed. As shown in block 9502, a user is presented with a welcome message, if there is any. As shown in block 9504, the user is presented with instructions, if there are any. As shown in block 9506, the user is presented with Preamble Audio/Video, if there is any. As shown in block 9508, the user is presented with a Face-Off Question Set. As shown in block 9510, the user can be allowed to listen to an Audio/Video item. As shown in block 9512, a determination is made whether the Audio/Video is switched. If not, as shown in block 9514, the Audio/Video continues to finish playing. If the Audio/Video is switched, as shown in block 9516, an Audio/Video Timestamp is saved, and the process proceeds to point AAA.

Figure 96:
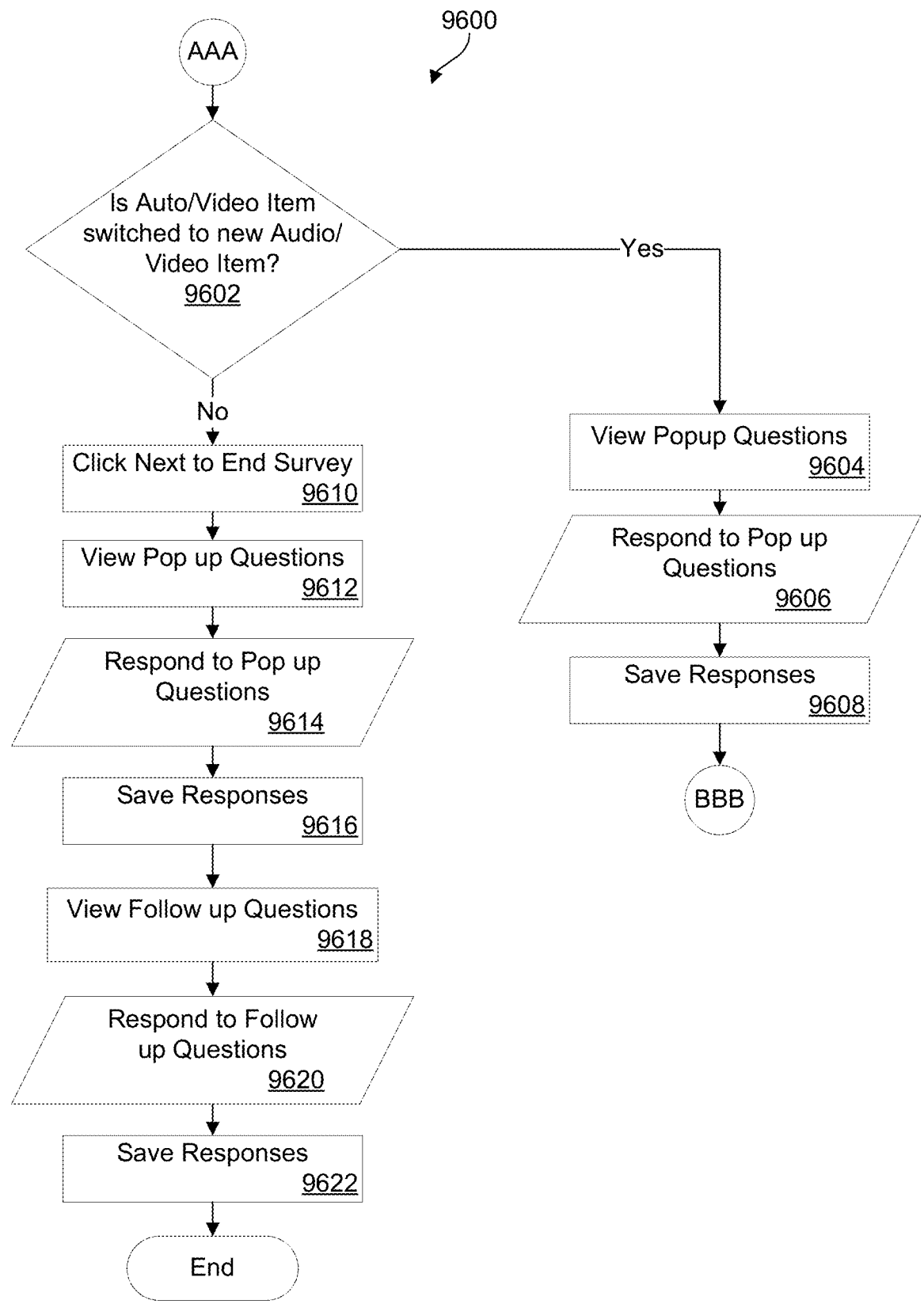

Referring now to FIG. 96, a process 9600, proceeding from point AAA by which a user can participate in a Face-Off Survey is illustrated and discussed. As shown in block 9602, a determination is made whether an Audio/Video item is switched to a new Audio/Video item. If an Audio/Video item is switched to a new Audio/Video item, as shown in blocks 9604 and 9606, the user can be allowed to view Pop-up questions and respond to the Pop-up questions. As shown in block 9608, the responses are saved, and the process proceeds to point BBB. As shown in block 9610, if an Audio/Video item is not switched to a new Audio/Video item, then the user can be allowed to click Next to end the Face-Off survey. As shown in blocks 9612 and 9614, the user can be allowed to view Pop-up questions and respond to the Pop-up questions. As shown in block 9616, the responses are saved. As shown in blocks 9618 and 9620, the user can be allowed to view follow-up questions and respond to the follow-up questions. As shown in block 9622, the responses are saved.

Figure 97:
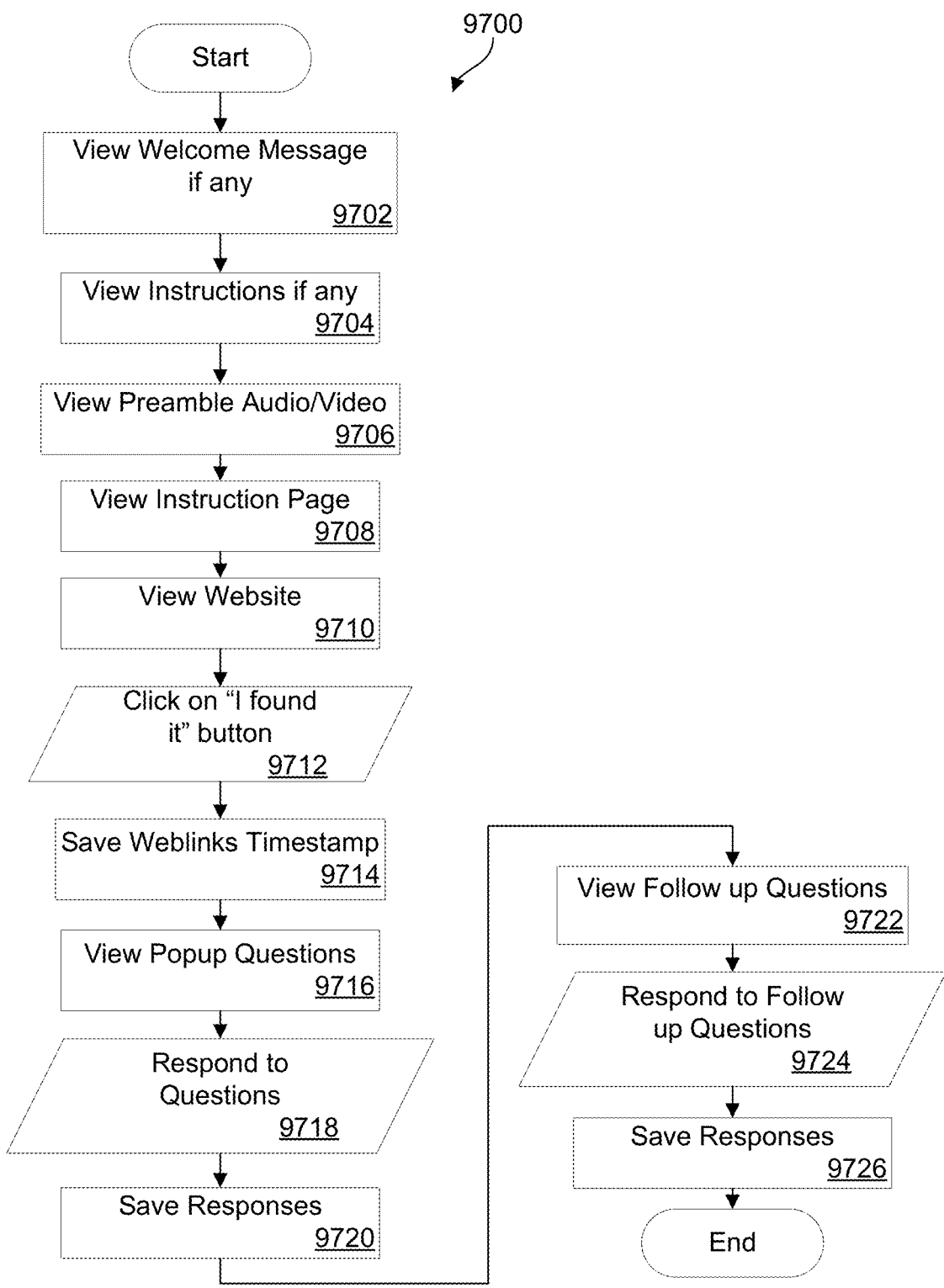

Referring now to FIG. 97, a process 9700 by which a user can participate in a Weblinks Survey is illustrated and discussed. As shown in block 9702, a user is presented with a welcome message, if there is any. As shown in block 9704, the user is presented with instructions, if there are any. As shown in block 9706, the user is presented with Preamble Audio/Video, if there is any. As shown in block 9708, the user is presented with instructions. As shown in block 9710, the user can be allowed to view a website. As shown in block 9712, the user clicks an "I Found It" button. As shown in block 9714, the Weblinks Timestamp is saved. As shown in blocks 9716 and 9718, the user can be allowed to view Pop-up questions and respond to the Pop-up questions. As shown in block 9720, the responses are saved. As shown in blocks 9722 and 9724, the user can be allowed to view follow-up questions and respond to the follow-up questions. As shown in block 9726, the responses are saved.

Figure 98:
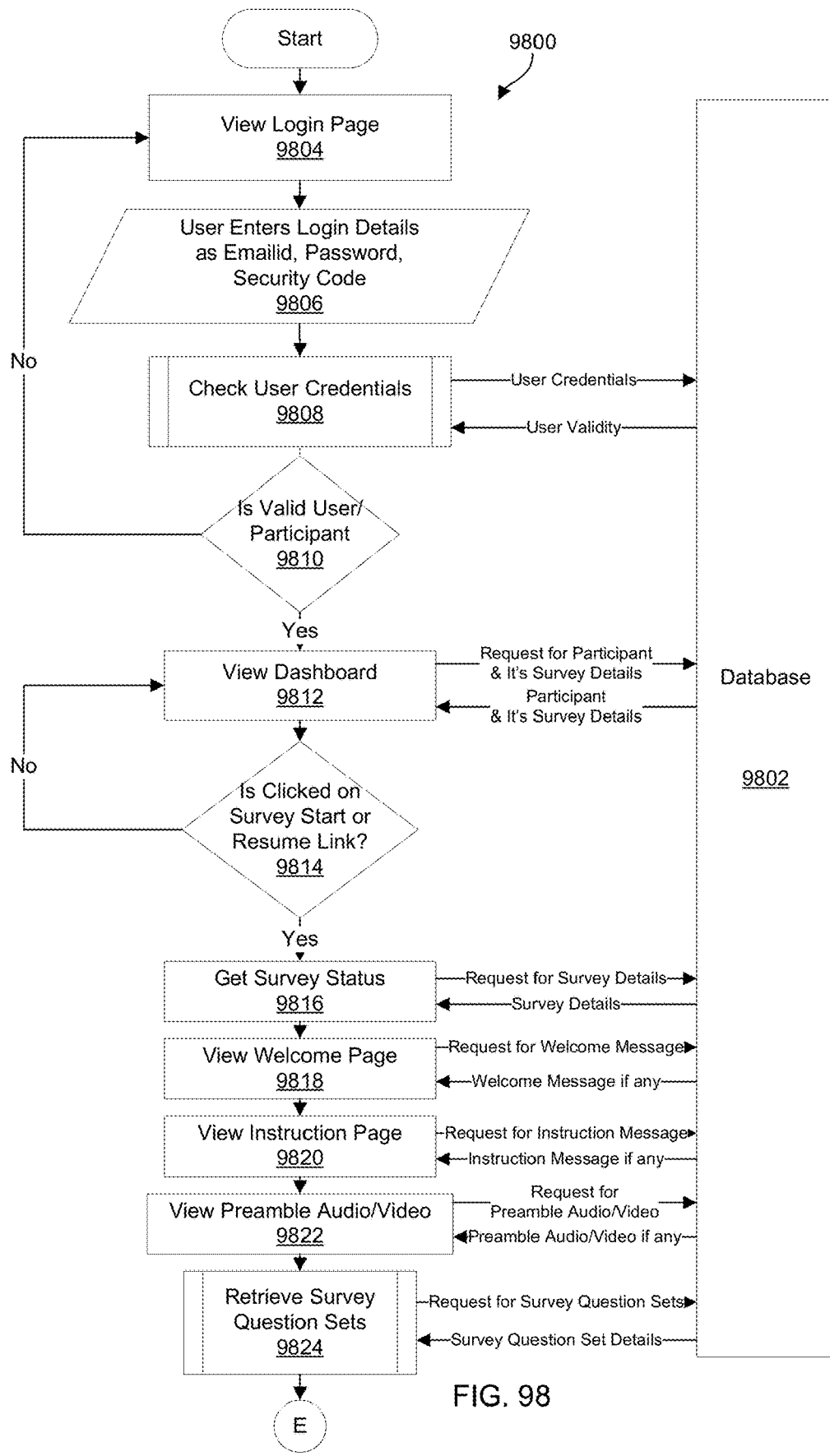

Referring now to FIG. 98, a process 9800 by which a user can participate in a survey is illustrated and discussed. As shown in block 9804, a user can be allowed to view a login page. As shown in block 9806, the user can be allowed to enter login details, which can include email ID, password, or a security code. As shown in block 9808, the user's credentials are checked. Checking credentials can include sending the user's credentials to a database 9802, which then returns a determination of the user's validity. As shown in block 9810, a determination is made whether the user is valid. If not, the user is returned to the login page. If yes, as shown in block 9812, the user can be allowed to view a dashboard. A request for user and survey details can be sent to the database 9802, and the details can be received from the database 9802. As shown in block 9814, a determination is made whether the user has clicked on a survey start or resume link. If the user has, as shown in block 9816, the survey status can be acquired by requesting the database 9802 to provide survey details. As shown in block 9818, the user can be allowed to view a welcome page that has been requested and received from database 9802. As shown in block 9820, the user can be allowed to view an instruction page that has been requested and received from database 9802. As shown in block 9822, the user can be allowed to view Preamble Audio/Video that has been requested and received from database 9802. As shown in block 9824, survey question sets are retrieved from database 9802, and the process proceeds to point E.

Figure 99:
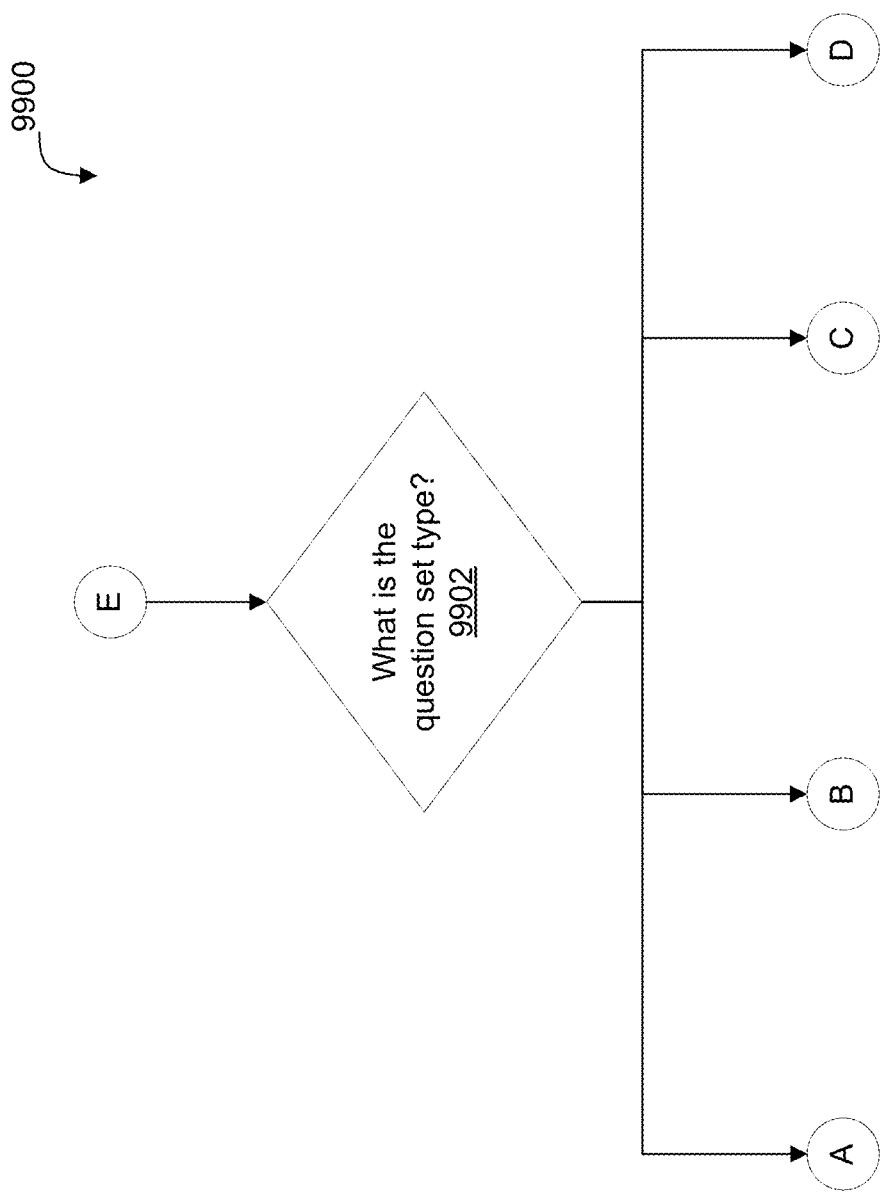

Referring now to FIG. 99, a process 9900 proceeding from point E by which a survey type is selected is illustrated and discussed. As shown in block 9902, a determination is made as to the question set type. Depending upon the survey type, the process will proceed to a different point. For example, if the survey type is Traditional, the process will proceed to point A. If the survey type is Face-Off Station, the process will proceed to point B. If the survey type is Face-Off Media, the process will proceed to point C. If the survey type is Weblinks, the process will proceed to point D.

Figure 100:
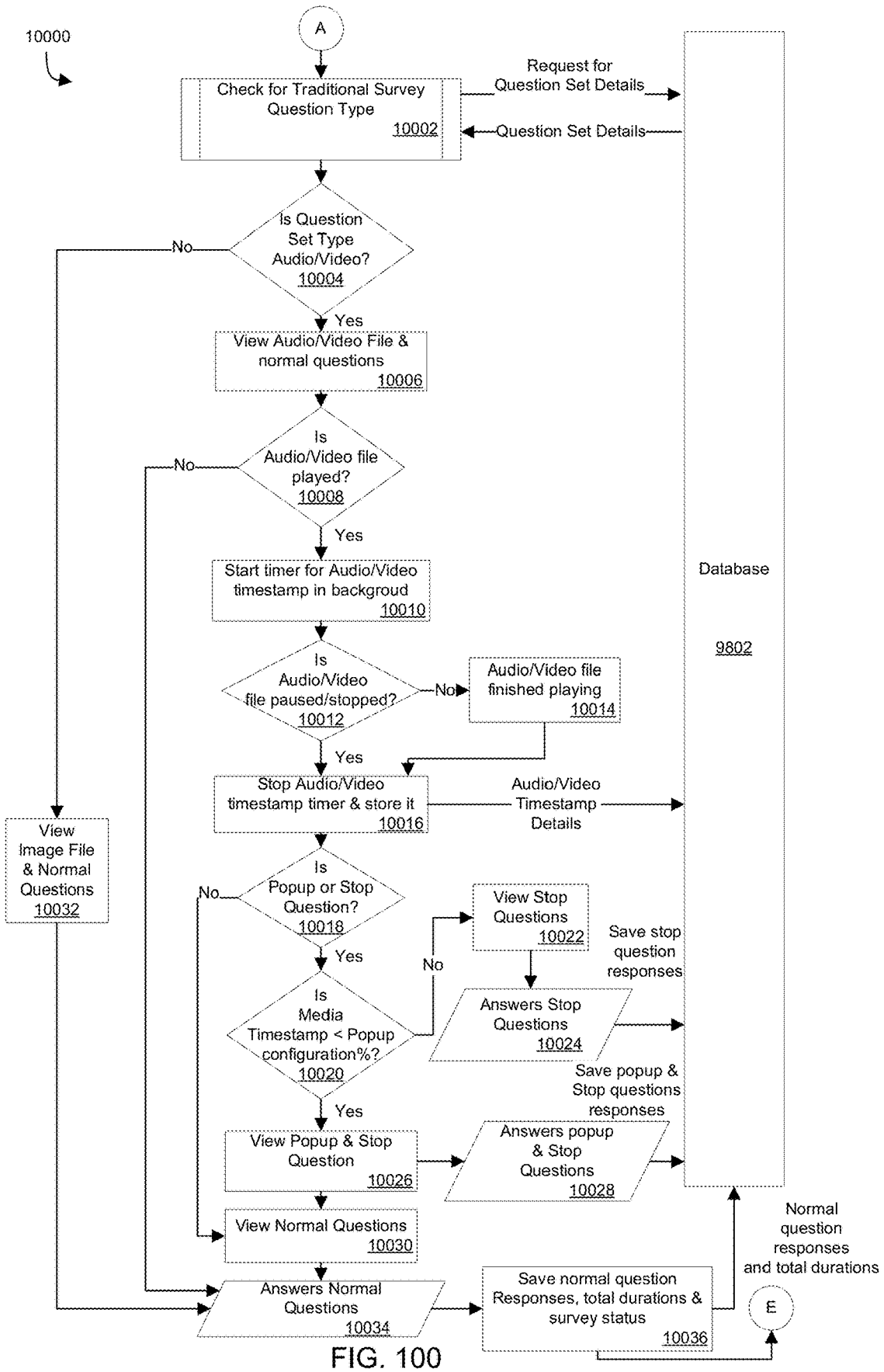

Referring now to FIG. 100, a process 10000 proceeding from point A enabling a user to participate in a traditional survey is illustrated and discussed. As shown in block 10002, question set details are requested and received from database 9802 to check for the traditional survey question type. As shown in block 10004, a determination is made whether the question set type is Audio/Video. If not, as shown in block 10032, the user can be allowed to view an image file and normal questions. If yes, as shown in block 10006, the user can be allowed to view the Audio/Video file and normal questions. As shown in block 10008, a determination is made whether an Audio/Video file is being played. If not, the process proceeds to allow the user to answer normal questions in block 10034. As shown in block 10010, the timer for Audio/Video Time Stamping is started in the background. As shown in block 10012, a determination is made whether the Audio/Video file is paused or stopped. If not, as shown in block 10014, the Audio/Video file can be allowed to finish playing. As shown in block 10016, the Audio/Video Time Stamping timer is stopped, and the Time Stamping details are stored in database 9802. In block 10018, a determination is made whether there is a Pop-up or Stop question. If there is, as shown in block 10020, then a determination is made whether the Media Time Stamp is less than the Pop-up configuration percentage. If not, as shown in blocks 10022 and 10024, the user can be allowed to view and answer Stop questions, the responses of which are saved in database 9802. As shown in blocks 10026 and 10028, the user can be allowed to view and answer Pop-up and Stop questions, the responses of which are saved in database 9802. As shown in blocks 10030, 10034, and 10036, the user can be allowed to view and answer normal questions, the responses to which, along with total durations and survey status, are saved in database 9802. The process then proceeds to point E.

Figure 101:
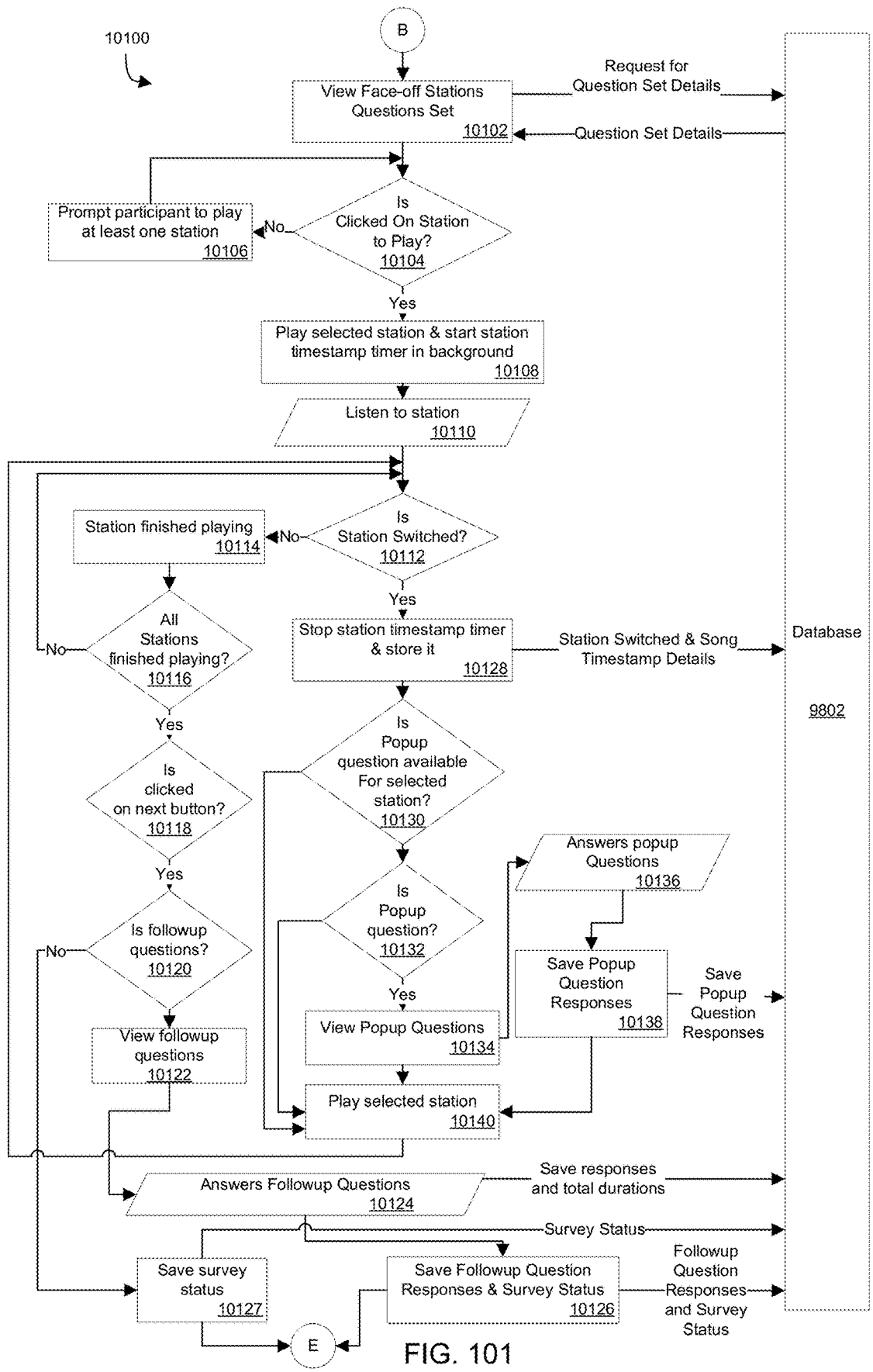

Referring now to FIG. 101, a process 10100 proceeding from point B by which a user can participate in a Face-Off Station survey is illustrated and discussed. As shown in block 10102, the user can be allowed to view a Face-Off Station question set, the details of which are requested and received from database 9802. As shown in block 10104, a determination is made whether the user has clicked on a station to play. If not, as shown in block 10106, the user is prompted to play at least one station. If yes, as shown in block 10108, the selected station if played, and a station Time Stamping timer is started in the background. As shown in block 10110, the user can be allowed to listen to the station. As shown in block 10112, a determination is made whether the station is switched. If not, as shown in block 10114, the station finishes playing. As shown in block 10116, a determination is made whether all stations have finished playing. As shown in block 10118, a determination is made whether the Next button is clicked. As shown in block 10120, a determination is made whether there are follow-up questions. If so, as shown in blocks 10122, 10124, and 10126, the user can be allowed to view and answer the follow-up questions, the responses to which are saved, along with the survey status, and saved in database 9802. If not, as shown in block 10127, the survey status is saved in database 9802. As shown in block 10128, if a station is switched, then the station Time Stamp timer is stopped and stored in database 9802. As shown in block 10130, a determination is made whether a Pop-up question is available for a selected station. As shown in block 10132, a determination is made whether there is a Pop-up question. If not, as shown in block 10140, the selected station is played. If so, as shown in blocks 10134, 10136, and 10138, the user can be allowed to view and answer Pop-up questions, the responses to which are saved in database 9802.

Figure 102:
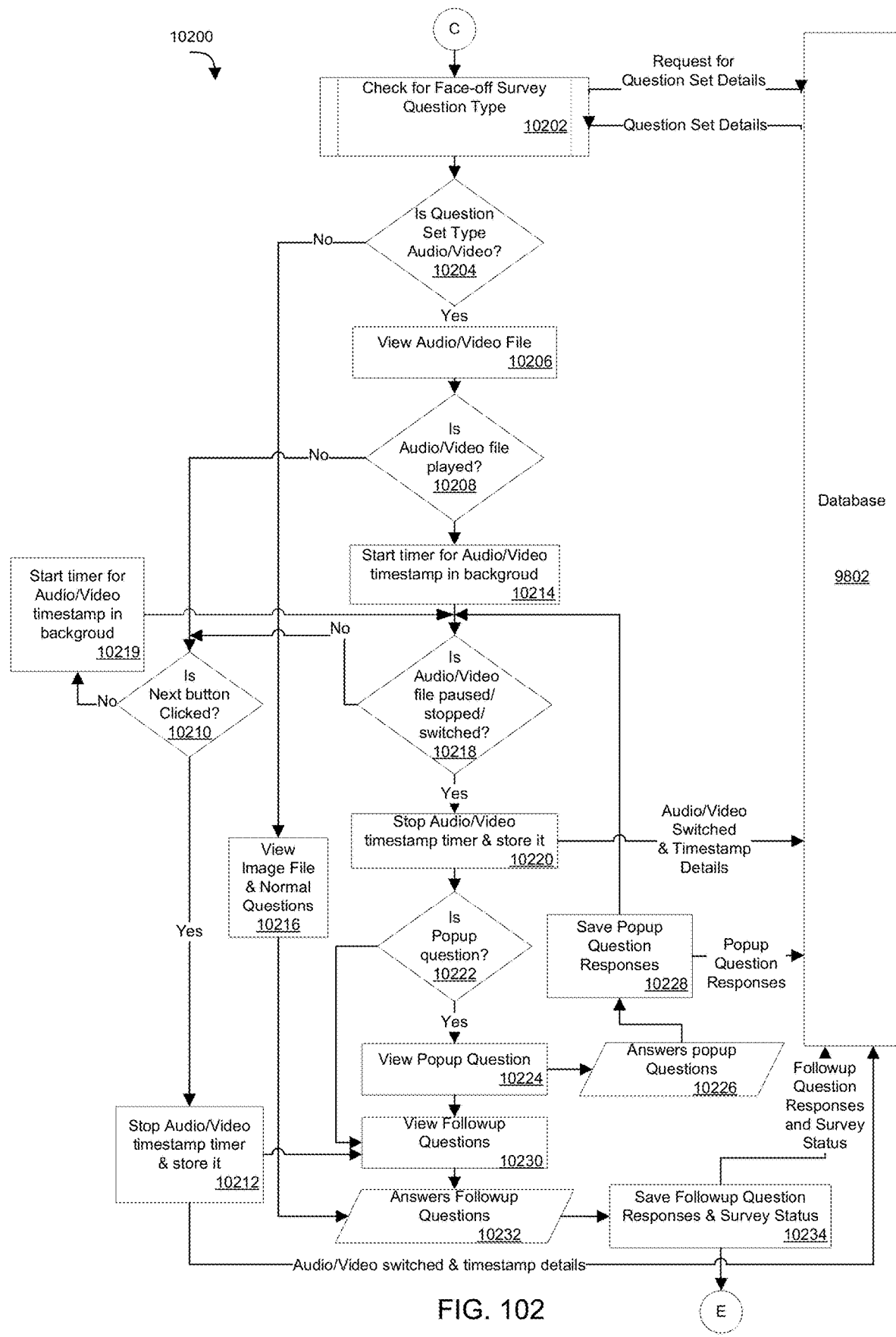

Referring now to FIG. 102, a process 10200 proceeding from point C by which a user can participate in a Face-Off Media survey is illustrated and discussed. As shown in block 10202, question set details are requested and received from database 9802 to check for the traditional survey question type. As shown in block 10204, a determination is made whether the question set type is Audio/Video. If not, as shown in block 10216, the user can be allowed to view the Image file and normal questions. If yes, as shown in block 10206, the user can be allowed to view the Audio/Video file. As shown in block 10208, a determination is made whether the Audio/Video file is being played. If not, as shown in blocks 10210 and 10212, if the Next button is not clicked, then the Audio/Video Time Stamping timer is stopped and stored in database 9802. If yes, as shown in block 10219, then the Audio/Video Time Stamping timer is started in the background. As shown in block 10218, a determination is made whether the Audio/Video file is paused, stopped, or switched. If so, as shown in block 10220, the Audio/Video Time Stamping timer is stopped and stored in database 9802. As shown in block 10222, a determination is made whether there is a Pop-up question. If so, as shown in blocks 10224, 10226, and 10228, the user can be allowed to view and answer the Pop-up questions, the responses to which are saved in database 9802. As shown in blocks 10230, 10232, and 10234, the user can be allowed to view and answer follow-up questions, the responses to which are saved, along with the survey status, in database 9802.

Figure 103:
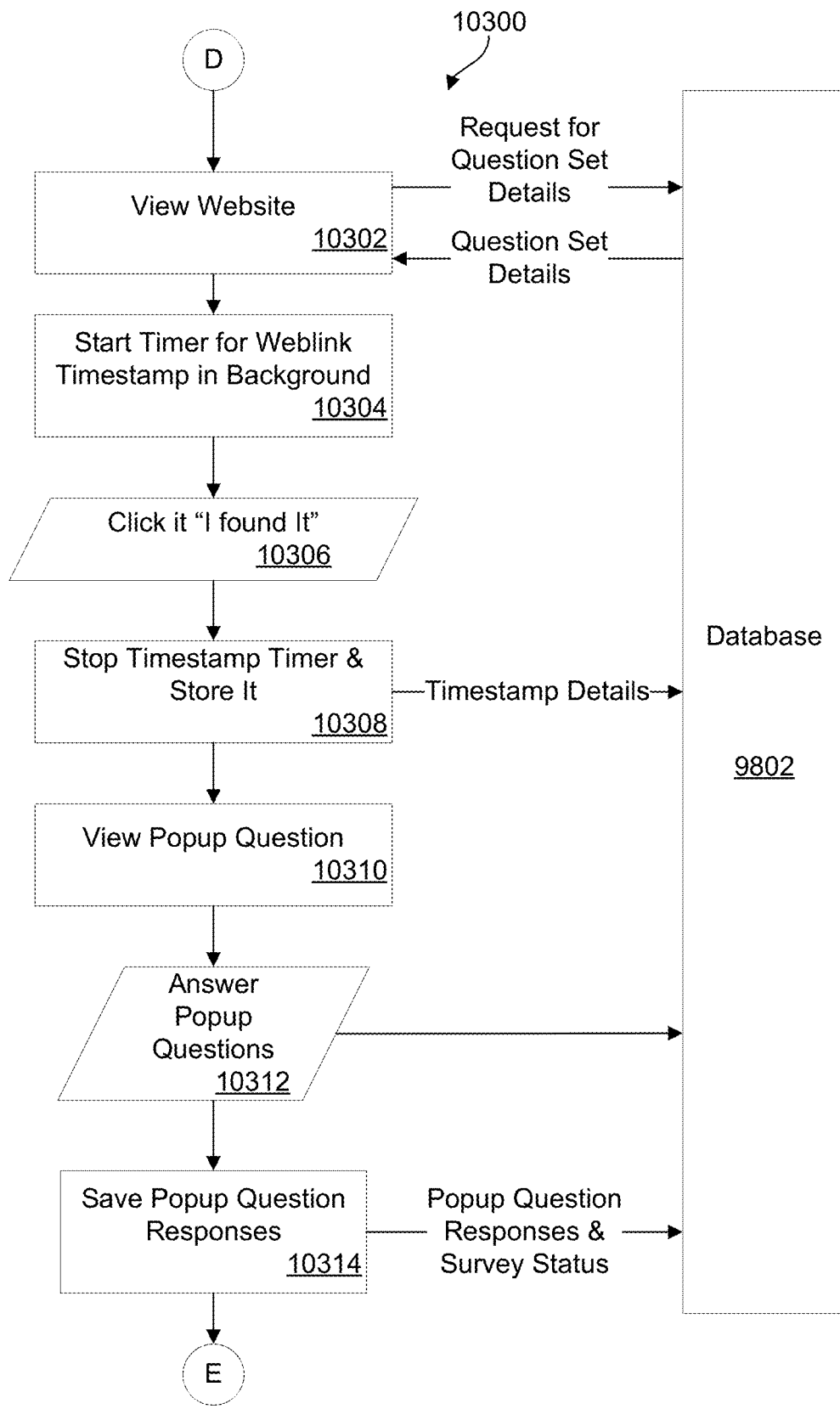

Referring now to FIG. 103, a process 10300 proceeding from point D by which a user can participate in a Weblinks survey is illustrated and discussed. As shown in block 10302, the user can be allowed to view a website, where question set details are requested and received from database 9802. As shown in block 10304, a Time Stamping timer for Weblinks is started in the background. As shown in block 10306, the user can be allowed to click on a button, which can state "I Found It". As shown in block 10308, the Time Stamping timer is stopped and stored in database 9802. As shown in blocks 10310, 10312, and 10314, the user can be allowed to view and answer Pop-up questions, the responses to which are saved in database 9802.

Figure 104:
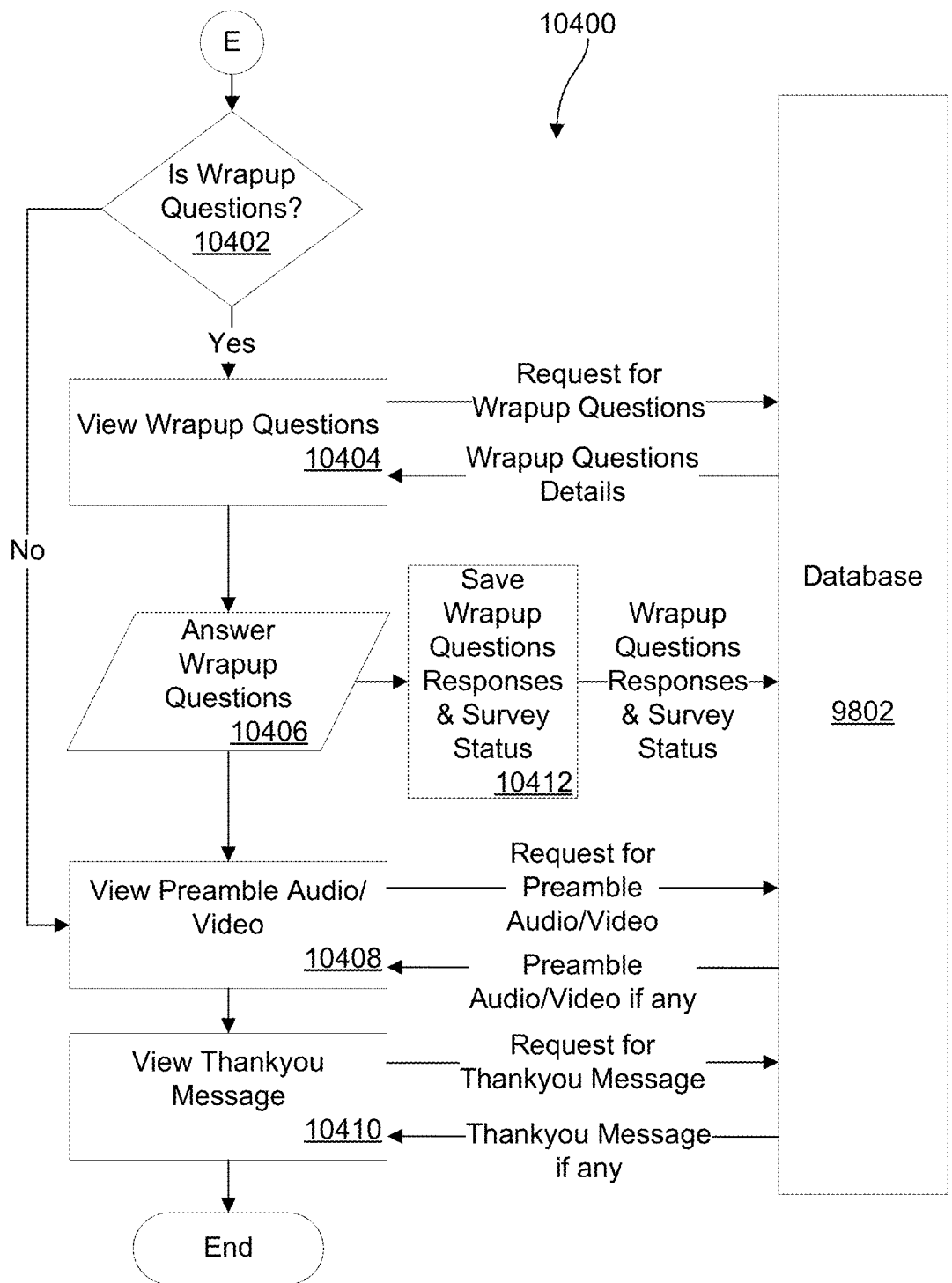

Referring now to FIG. 104, a process 10400 proceeding from point E by which a survey is wrapped up is illustrated and discussed. As shown in block 10402, a determination is made whether there are wrap-up questions. As shown in blocks 10404, 10406, and 10412, the user can be allowed to view and answer wrap-up questions, the responses to which, along with the survey status, are saved in database 9802. As shown in block 10408, the user can be allowed to view Preamble Audio/Video requested and received from database 9802. As shown in block 10410, the user can be allowed to view a thank-you message requested and received from database 9802, if there is one.

Figure 105:
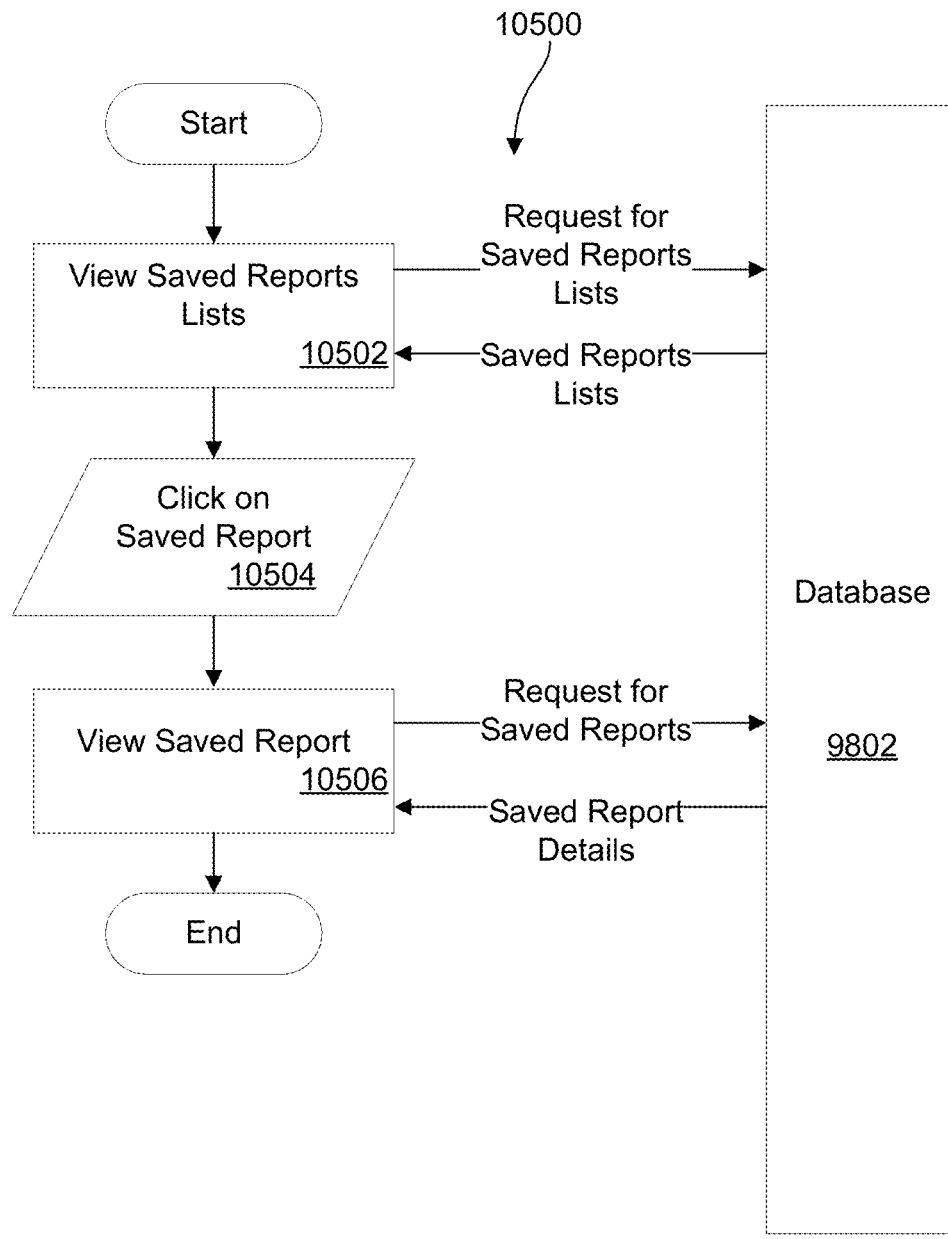

Referring now to FIG. 105, a process 10500 by which a client can view saved survey reports is illustrated and discussed. As shown in block 10502, the client can be allowed to view a saved reports list requested and received from database 9802. As shown in block 10504, the client can be allowed to click on a saved report. As shown in block 10506, the client can be allowed to view the saved report, the details of which are requested and received from database 9802.

Figure 106:
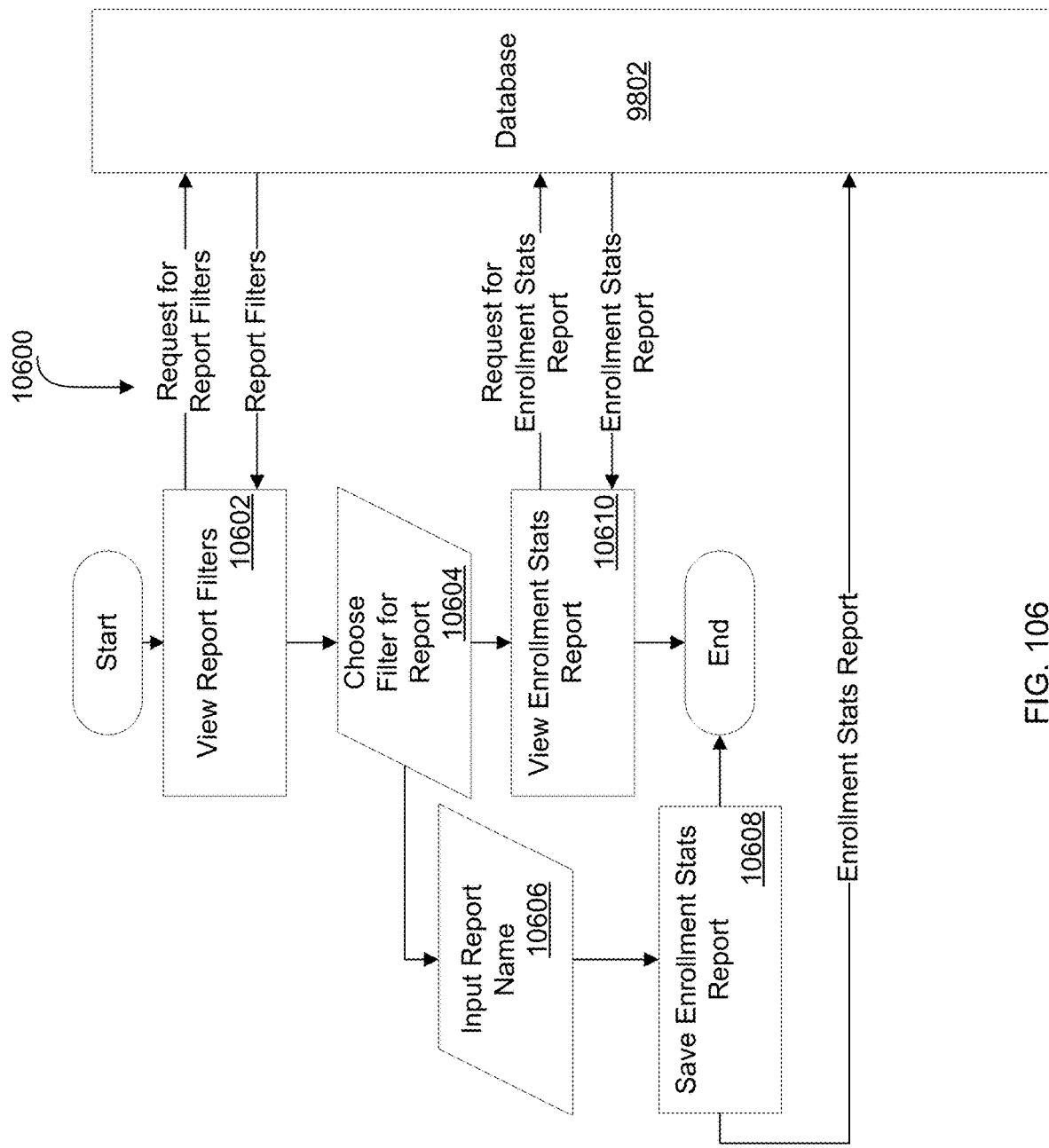

Referring now to FIG. 106, a process 10600 by which a client can generate a survey report is illustrated and discussed. As shown in block 10602, the client views report filters that have been requested and received from database 9802. As shown in block 10604, the client chooses filters for the report. As shown in blocks 10606 and 10608, the client can input the report name and save an Enrollment stats report in database 9802. As shown in block 10610, the client can view an Enrollment stats report requested and received from database 9802.

Figure 107:
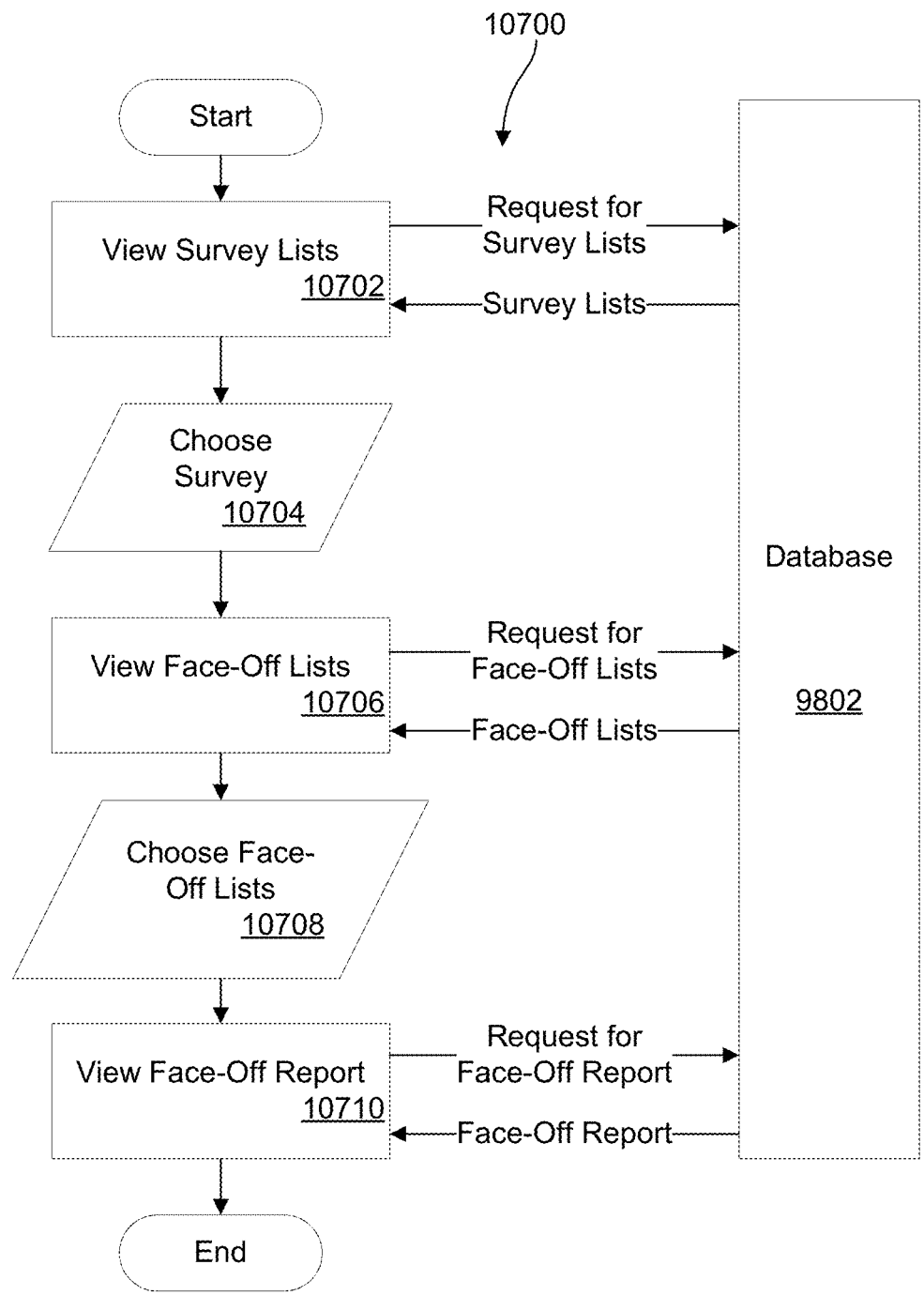

Referring now to FIG. 107, a process 10700 by which a client can view a Face-Off survey report is illustrated and discussed. As shown in block 10702, the client views survey lists requested and received from database 9802. As shown in block 10704, the client chooses a survey. As shown in block 10706, the client views Face-Off lists requested and received from database 9802. As shown in block 10708, the client chooses a Face-of list. As shown in block 10710, the client views a Face-Off report requested and received from database 9802.

Figure 108:
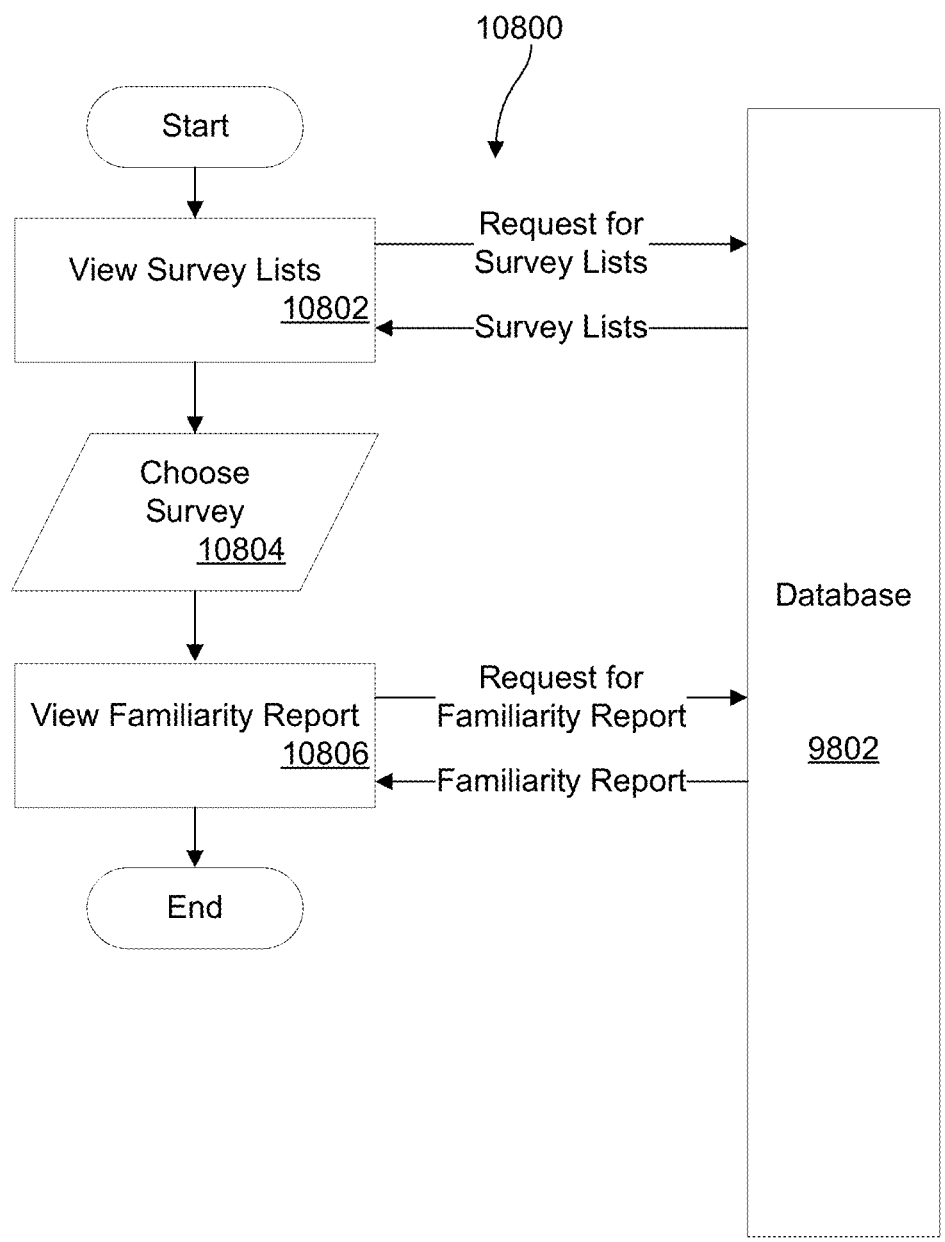

Referring now to FIG. 108, a process 10800 by which a client can view a Familiarity report is illustrated and discussed. As shown in block 10802, the client views survey lists requested and received from database 9802. As shown in block 10804, the client chooses a survey. As shown in block 10806, the client views a Familiarity report requested and received from database 9802.

Figure 109:
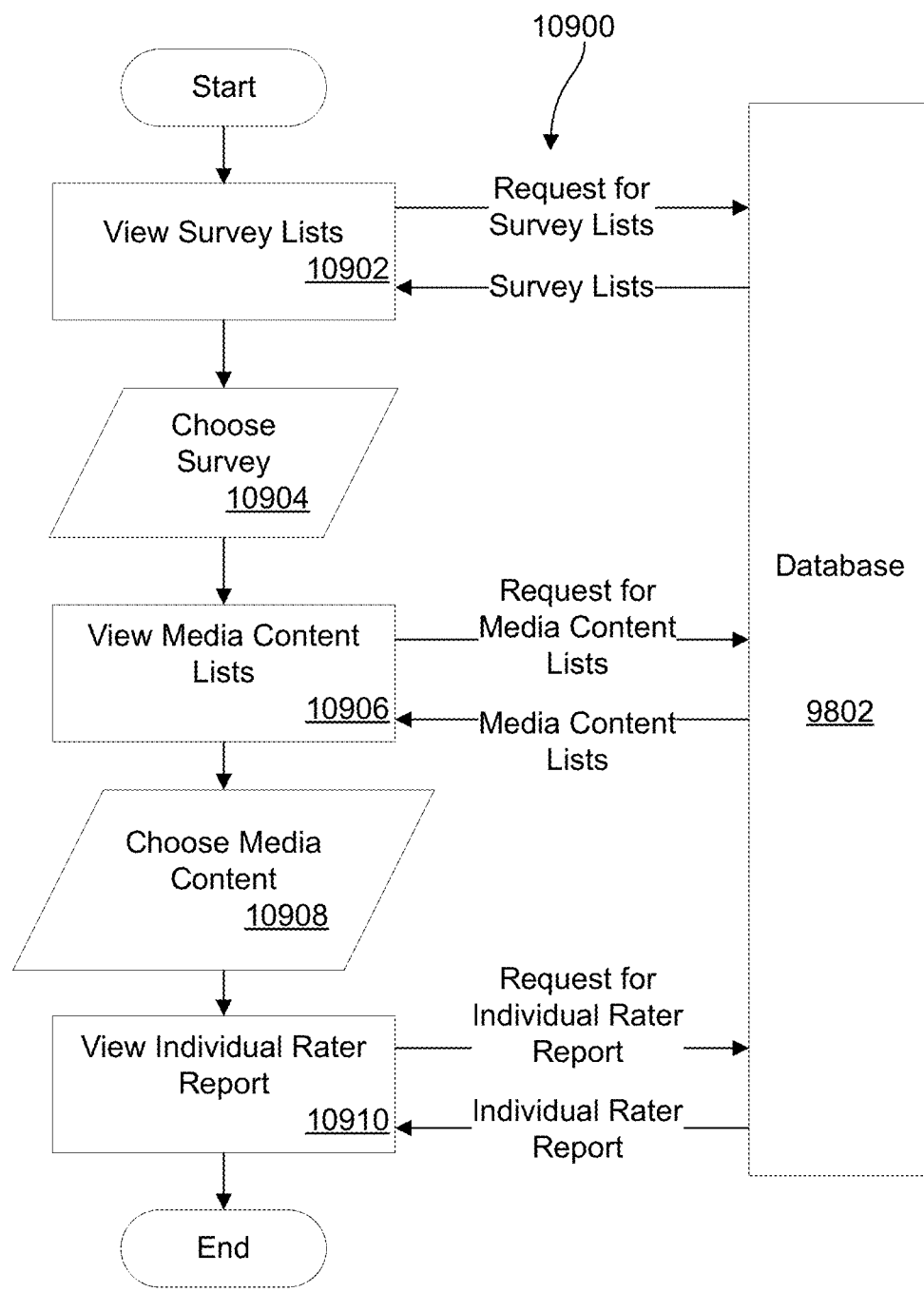

Referring now to FIG. 109, a process 10900 by which a client can view an individual rater report is illustrated and discussed. As shown in block 10902, the client views survey lists requested and received from database 9802. As shown in block 10904, the client chooses a survey. As shown in block 10906, the client views media content lists requested and received from database 9802. As shown in block 10908, the client chooses media content. As shown in block 10910, the client views an Individual rater report requested and received from database 9802.

Figure 110:
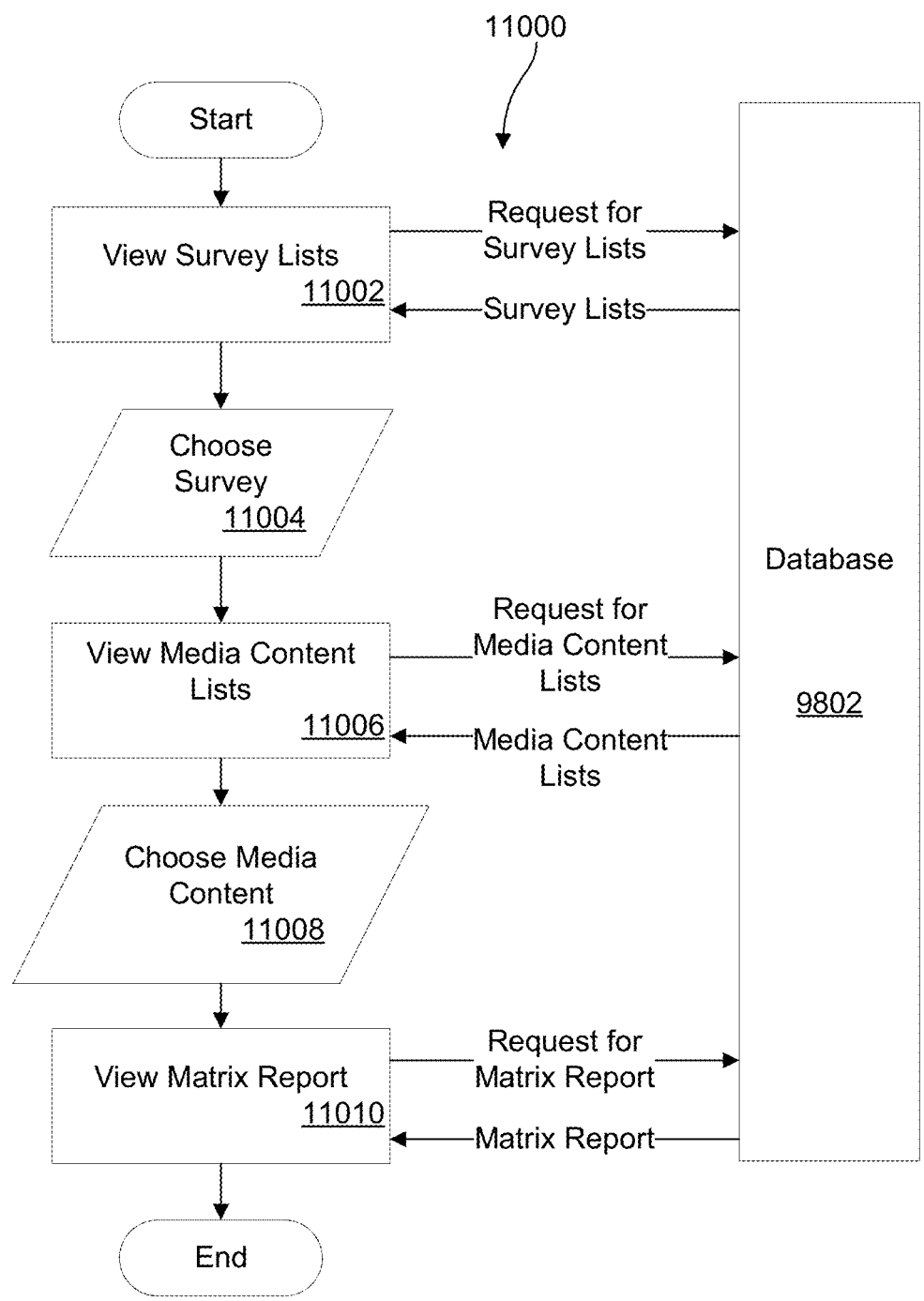

Referring now to FIG. 110, a process 11000 by which a client can view a Matrix report is illustrated and discussed. As shown in block 11002, the client views survey lists requested and received from database 9802. As shown in block 11004, the client chooses a survey. As shown in block 11006, the client views media content lists requested and received from database 9802. As shown in block 11008, the client chooses media content. As shown in block 11010, the client views a Matrix report requested and received from database 9802.

Figure 111:
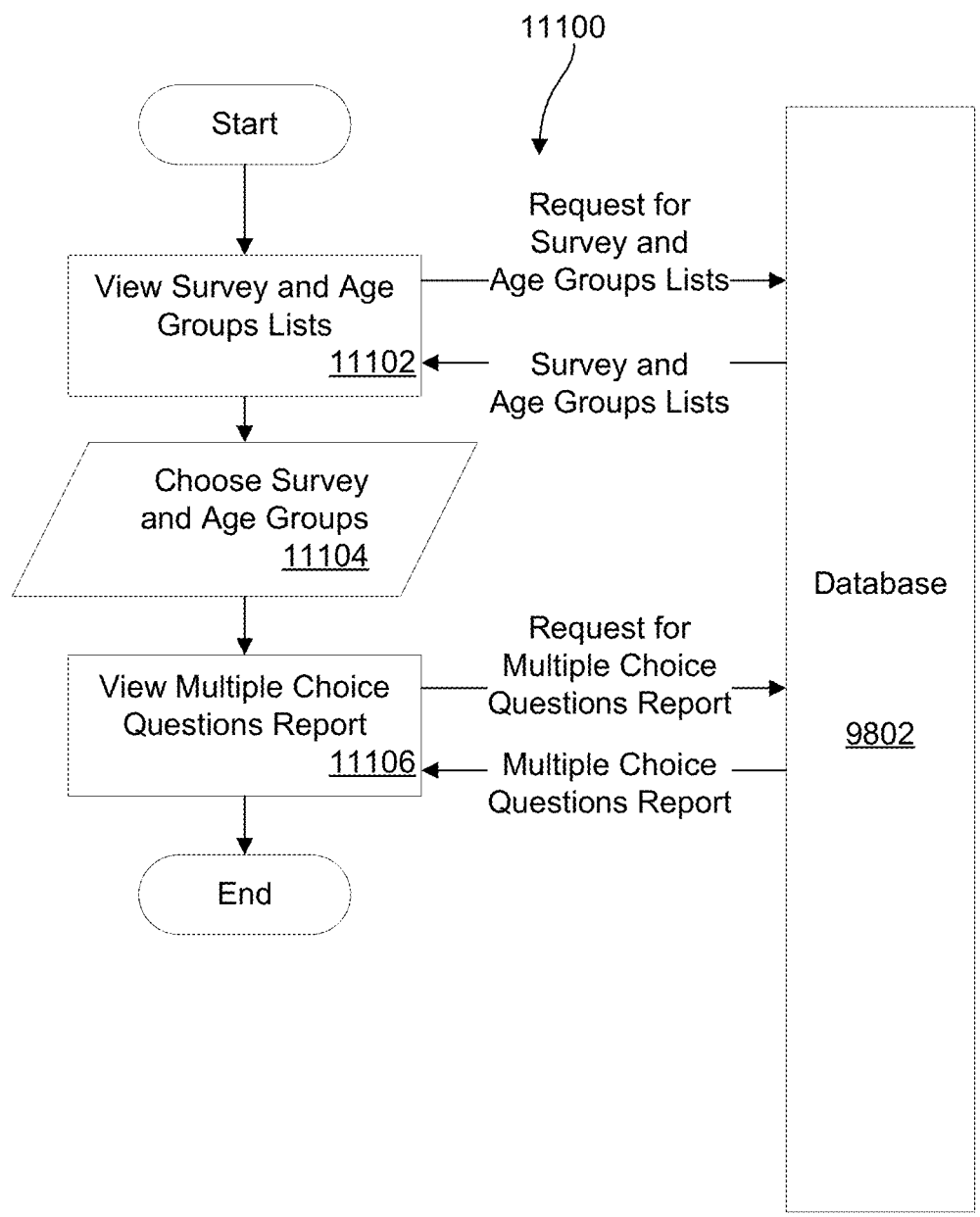

Referring now to FIG. 111, a process 11100 by which a client can view a Multiple choice questions report is illustrated and discussed. As shown in block 11102, the client views survey and age group lists requested and received from database 9802. As shown in block 11104, the client chooses a survey and one or more age groups. As shown in block 11106, the client views a Multiple choice questions report requested and received from database 9802.

Figure 112:
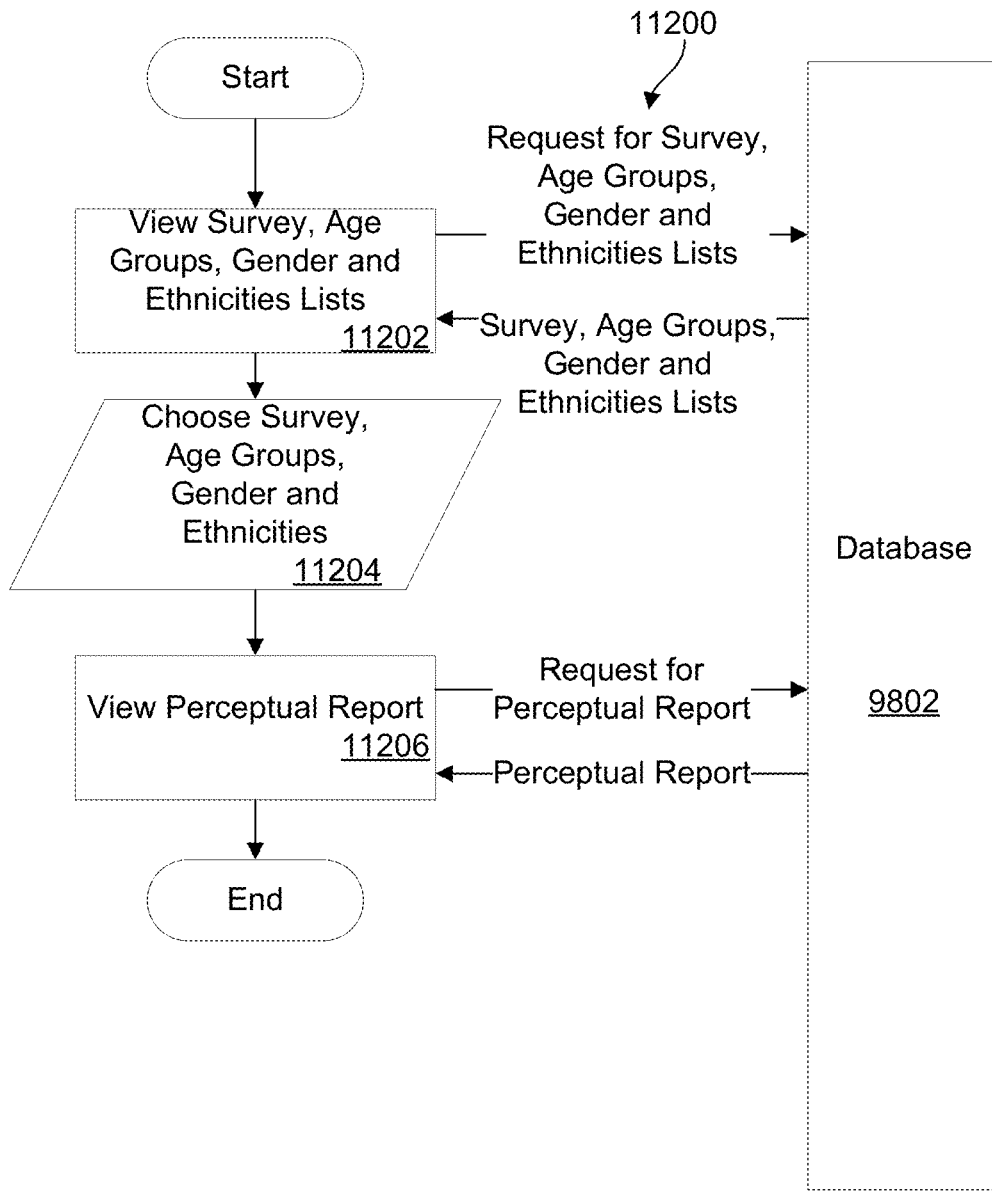

Referring now to FIG. 112, a process 11200 by which a client can view a perceptual report is illustrated and discussed. As shown in block 11202, the client views survey, age group, gender, and ethnicities lists requested and received from database 9802. As shown in block 11204, the client chooses a survey and one or more age groups, gender, and ethnicities. As shown in block 11206, the client views a perceptual report requested and received from database 9802.

Figure 113:
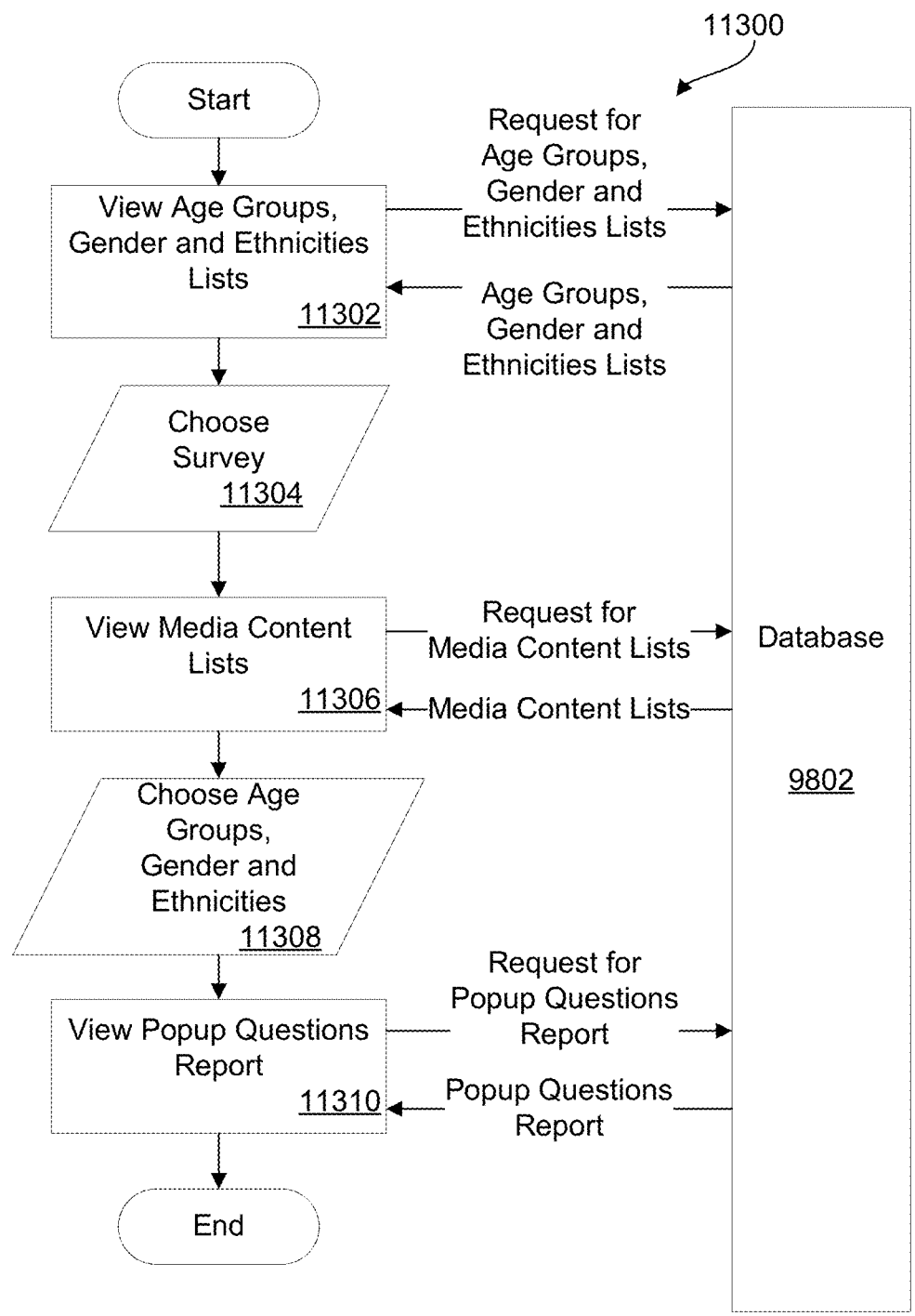

Referring now to FIG. 113, a process 11300 by which a client can view a Popup questions report is illustrated and discussed. As shown in block 11302, the client views survey, age group, gender, and ethnicities lists requested and received from database 9802. As shown in block 11304, the client chooses a survey. As shown in block 11306, the client views media content lists requested and received from database 9802. As shown in block 11308, the client chooses a survey and one or more age groups, gender, and ethnicities. As shown in block 11310, the client views a Pop-up questions report requested and received from database 9802.

Figure 114:
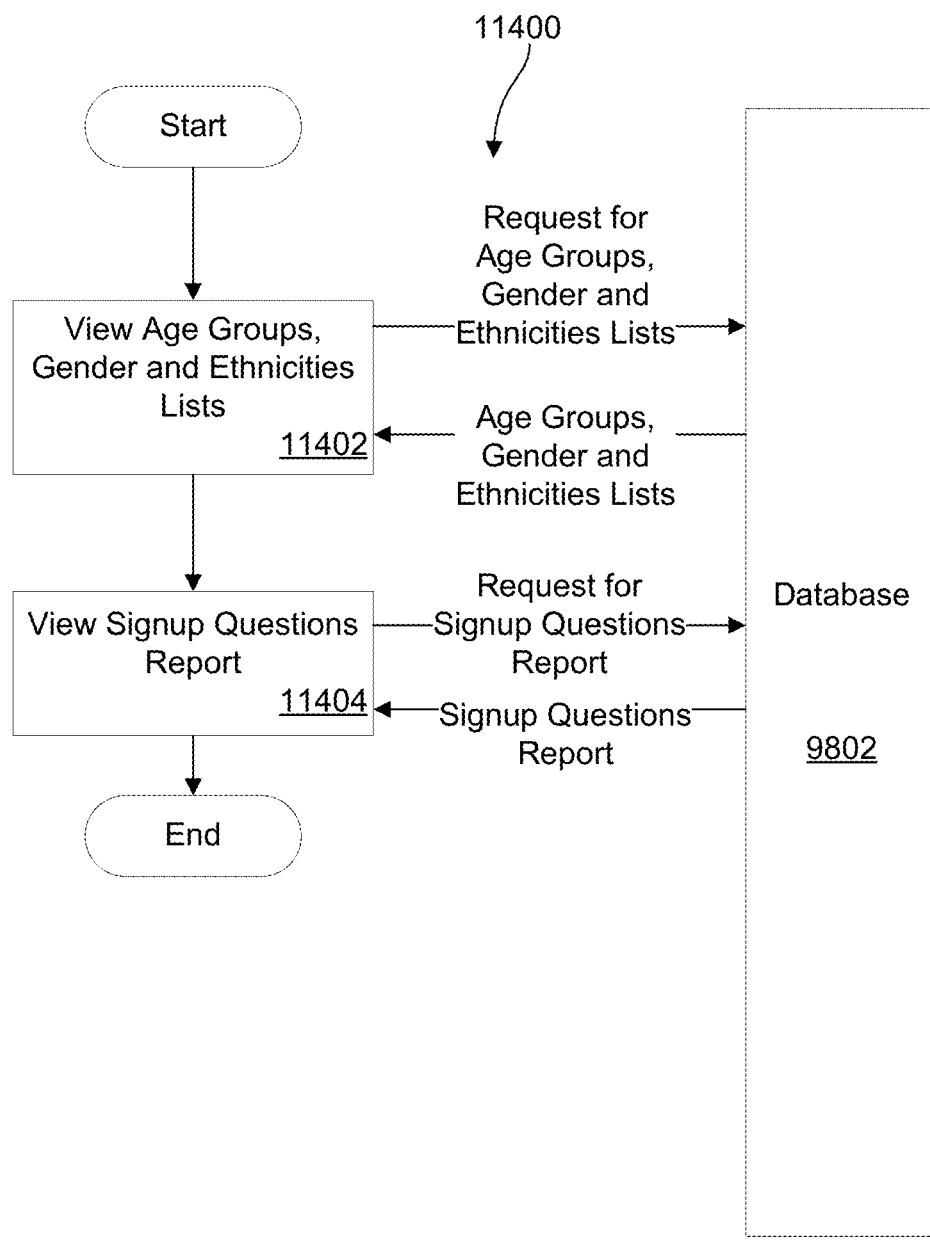

Referring now to FIG. 114, a process 11400 by which a client can view a signup questions report is illustrated and discussed. As shown in block 11402, the client views age group, gender, and ethnicities lists requested and received from database 9802. As shown in block 11404, the client views a signup questions report requested and received from database 9802.

Figure 115:
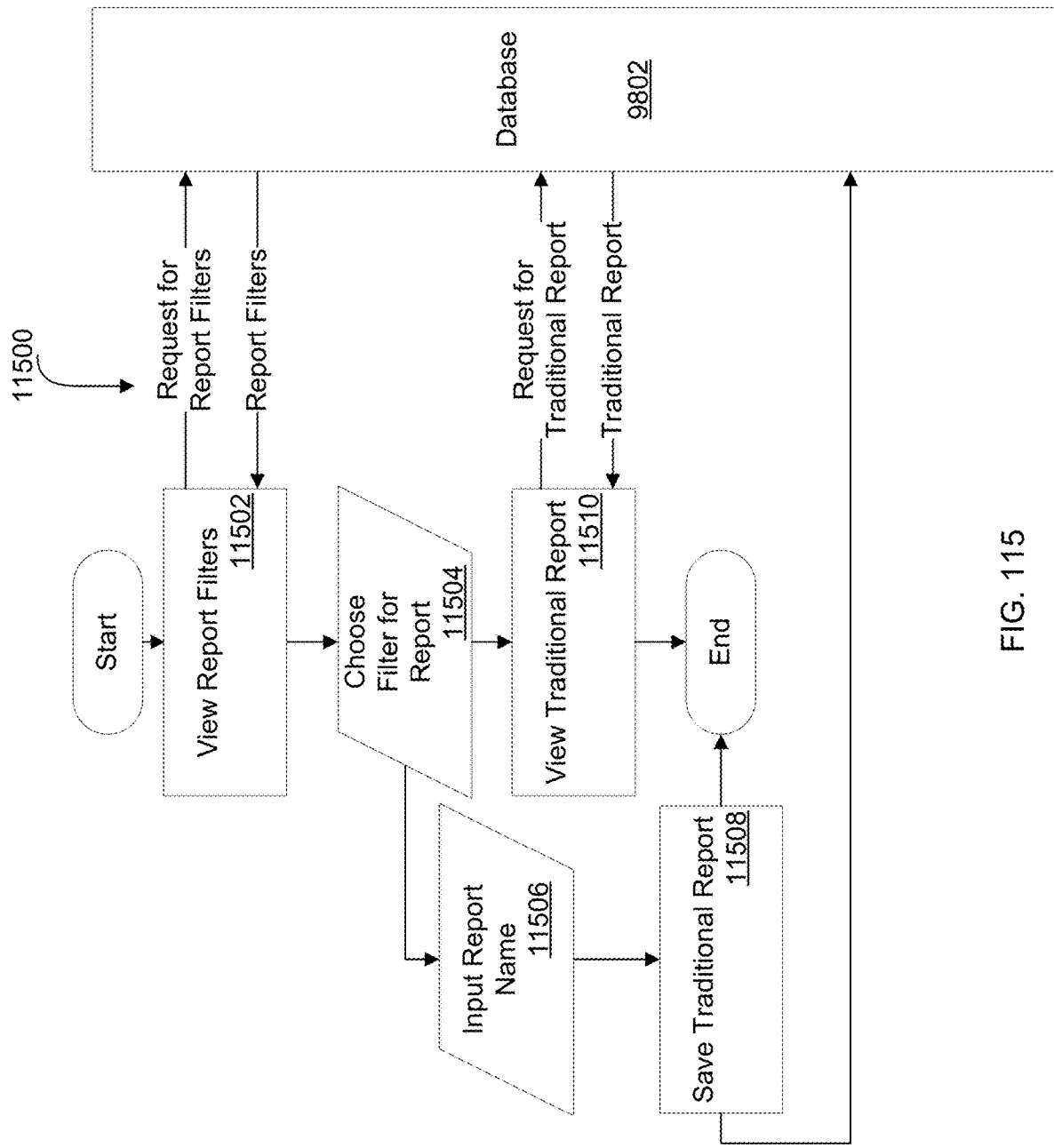

Referring now to FIG. 115, a process 11500 by which a client can generate and view a traditional report is illustrated and discussed. As shown in block 11502, a client views report filters requested and received from database 9802. As shown in block 11504, the client chooses filters for the report. As shown in blocks 11506 and 11508, the client can input the report name and save a traditional report in database 9802. As shown in block 11510, the client can view a traditional report requested and received from database 9802.

Figure 116:
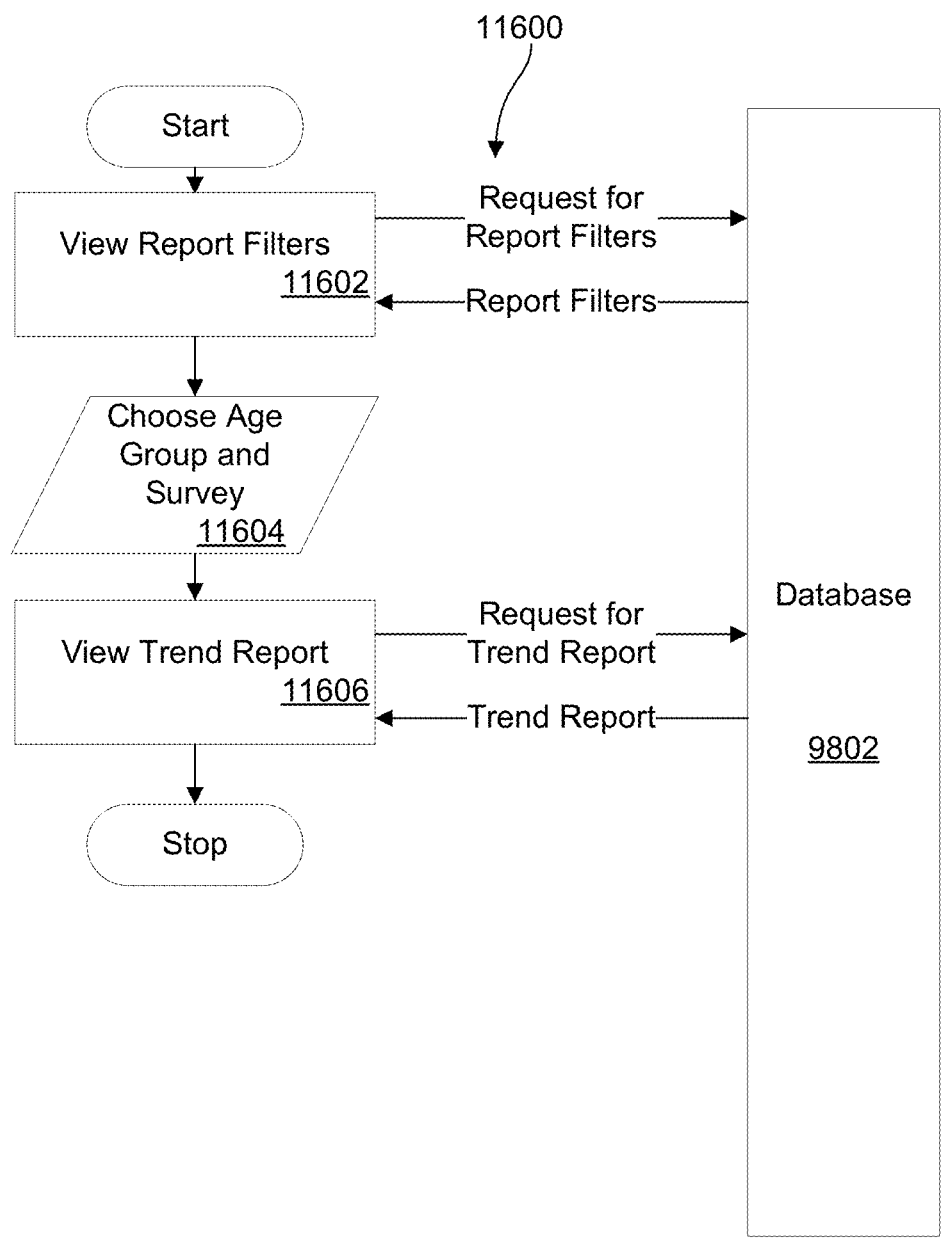

Referring now to FIG. 116, a process 11600 by which a client can view a trend report is illustrated and discussed. As shown in block 11602, the client views report filters requested and received from database 9802. As shown in block 11604, the client chooses one or more age groups, and gender. As shown in block 11606, the client views a trend report requested and received from database 9802.

Figure 117:
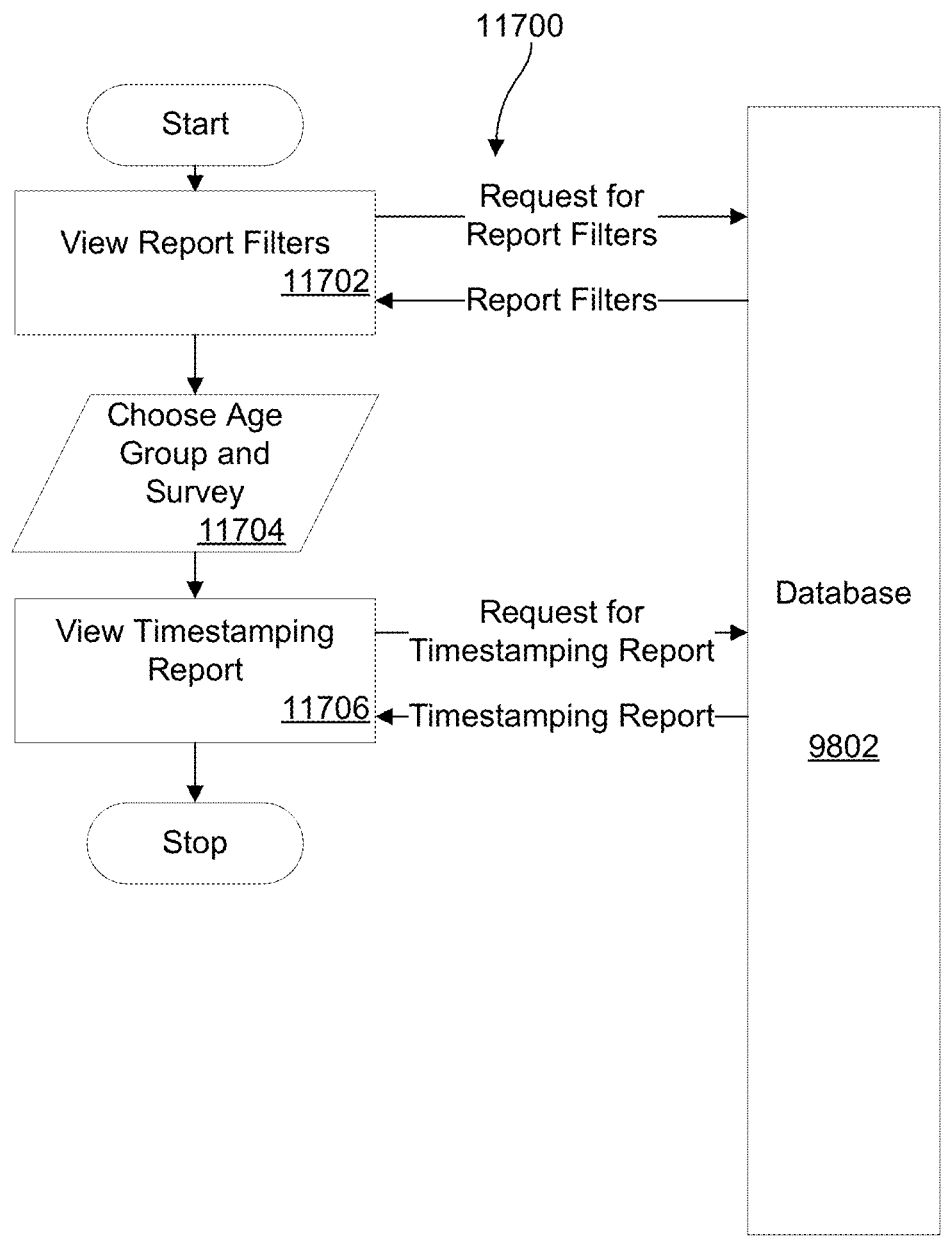

Referring now to FIG. 117, a process 11700 by which a client can view a Time Stamping report is illustrated and discussed. As shown in block 11702, the client views report filters requested and received from database 9802. As shown in block 11704, the client chooses a survey and one or more age groups. As shown in block 11706, the client views a Time Stamping report requested and received from database 9802.

Figure 118:
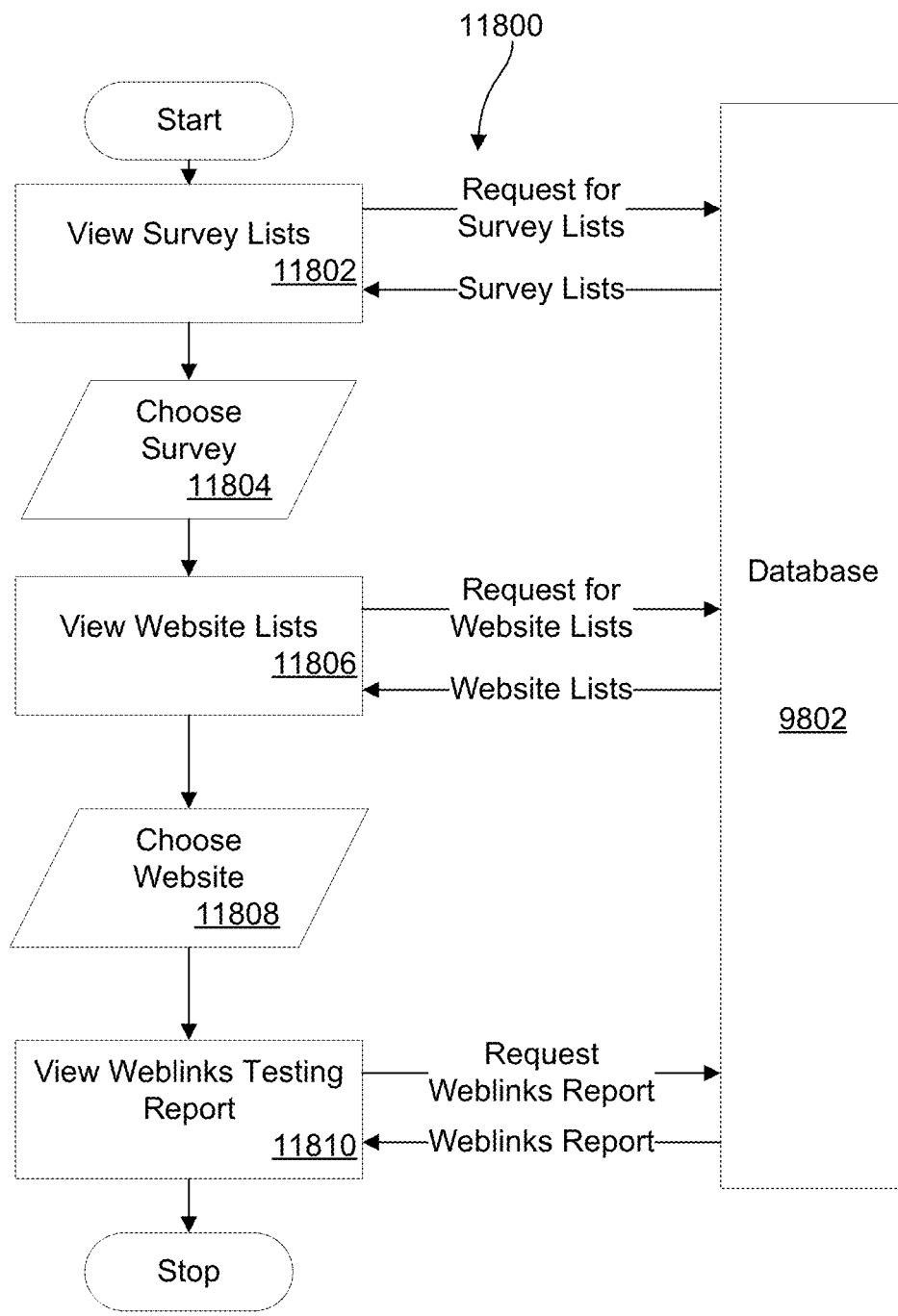

Referring now to FIG. 118, a process 11800 by which a client can view a Weblinks testing report is illustrated and discussed. As shown in block 11802, the client views survey lists requested and received from database 9802. As shown in block 11804, the client chooses a survey. As shown in block 11806, the client views website lists requested and received from database 9802. As shown in block 11808, the client chooses a website. As shown in block 11810, the client views a Weblinks testing report requested and received from database 9802.

Figure 119:
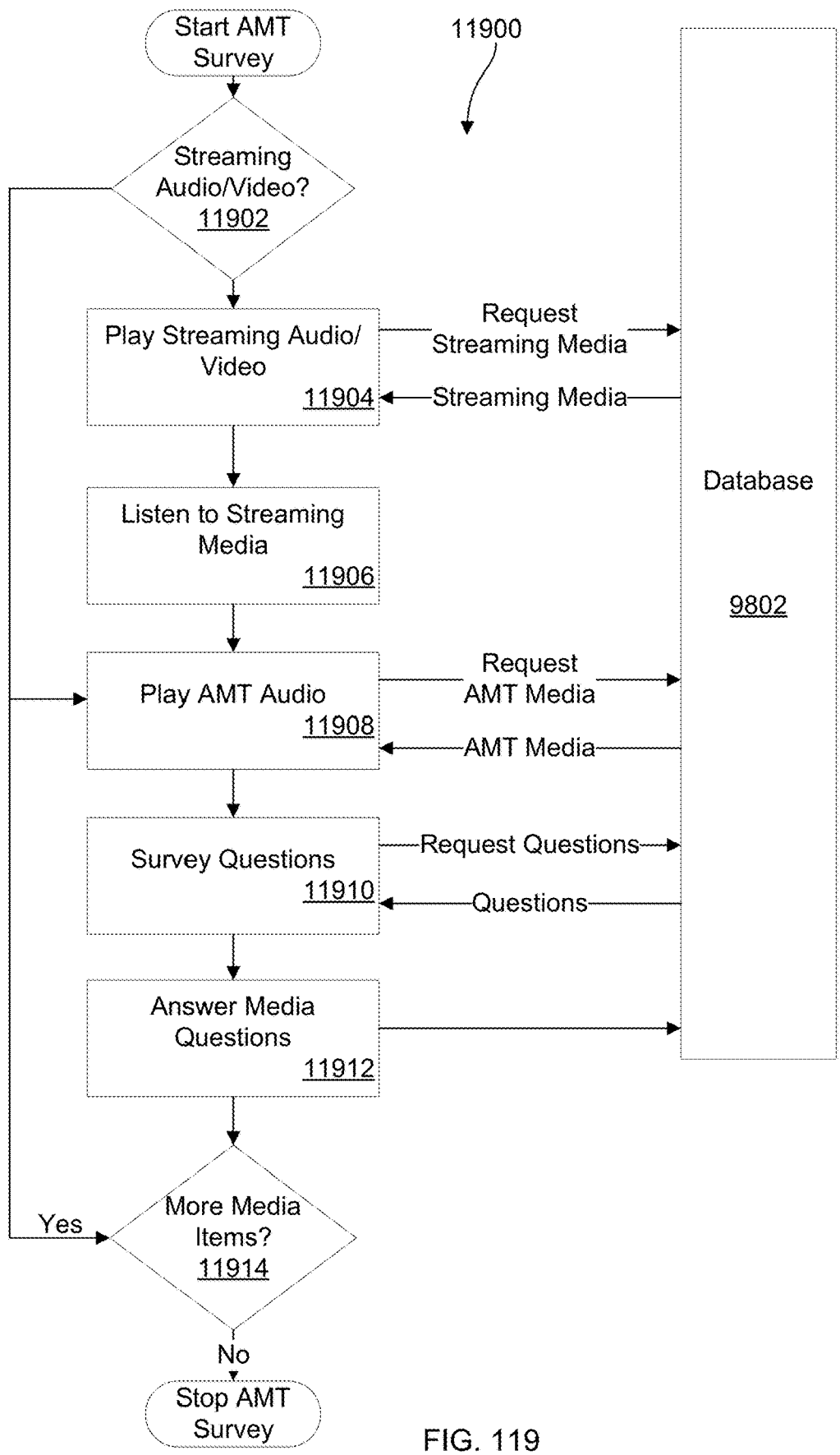

Referring now to FIG. 119, a process 11900 by which a user can participate in an AMT survey is illustrated and discussed. As shown in block 11902, a determination is made whether there is Streaming Audio/Video present. If there is, as shown in block 11904, streaming Audio/Video requested and received from database 9802 is played for the user. As shown in block 11906, the user can be allowed to listen to streaming media. As shown in block 11908, AMT Audio requested and received from database 9802 is played for the user. As shown in block 11910, the user is provided with survey questions requested and received from database 9802. As shown in block 11912, the user can be allowed to answer media questions. As shown in block 11914, a determination is made whether there are more media items.

It should be understood that there are many different possible variants of this inventive concept, all of which are included in the scope of this invention disclosure. In fact, the invention disclosure is intended to comprise a plurality of inventive embodiments, each of which may comprise some combination of some or all of the elements described herein (but which may also optionally exclude one or more of the elements generally described herein). If any copyright or trademark material of an unrelated third party is used in the sample screens shown above, Applicant contends that this use may be authorized and/or is merely exemplary (to aid in clarity) and is a de minimis fair use that does not result in any confusion or improper advantage and/or harm to the owner (especially since this provisional patent application is not intended for publication, but shall be kept secret in the U.S. Patent Office). It should also be understood that the use of the word "database" is meant to be inclusive of any computer/electronic storage media (memory storage) capable of holding electronic data and allowing the data to be extracted electronically. Thus, a database could be stored on a server, a hard-drive, or internal memory, or it could be located on a CD, disk, electronic tape, etc. by way of non-exclusive example. Likewise, the word "database" is intended to include one or more separate, independent database(s) (designated for a specific type of information) and/or a portion of a larger database (that may be partitioned into several smaller database tables). Thus, the term "database" as used herein is inclusive of a table in a database (which may include several such tables). Also, the computer system could be a designated specific purpose machine designed to include specific physical components and to perform the process tasks, or it could be a general purpose computer machine programmed to be configured to perform the process tasks. In such case, the program/software may be stored on computer readable media, which is then operable to transform the general purpose computer machine into a specific purpose machine that performs as discussed above.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings refer to a "Field of Invention," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention", "software", etc. in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the ultimate claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the term "optionally" and the like with respect to any element of an embodiment means that the element is not required, or alternatively, the element is required, both alternatives being within the scope of the embodiment(s).

What is claimed is:

1. A method comprising:
   streaming a plurality of media items from a hosting server to a participant device;
   receiving, at the hosting server from the participant device, a plurality of time-stamp information indicating interaction times associated with a participant interaction with each media item, wherein the time-stamp information is received at the hosting server during a time the media item is being streamed to the participant device, wherein the time-stamp information includes a time stamp representing an elapsed time between presentation of a designated portion of each media item and occurrence of an event associated with the participant device;
   for each media item, in response to receiving the time-stamp information: 'determining, from the time-stamp information, a consumed portion of the media item by determining a time between start and stop actions, the consumed portion of the media item corresponding to a portion of the media item streamed to the participant device prior to the interaction time;
   determining whether the consumed portion of the media item satisfies a threshold pop-up percentage;
   conditionally transmitting survey content to the participant device based on whether the consumed portion of the media item satisfies the threshold pop-up percentage, wherein conditionally transmitting includes:
   transmitting first survey content in response to determining that the threshold pop-up percentage has not been satisfied; and
   transmitting second survey content, different from the first survey content, in response to determining that the threshold pop-up percentage has been satisfied.

2. The method of claim 1, wherein the participant interaction with the media item includes:
   a participant making a selection to at least temporarily stop playback of the media item.

3. The method of claim 1, further comprising:
   streaming a plurality of media items from the hosting server to the participant device;
   receiving, at the hosting server from the participant device, a plurality of time-stamp information indicating interaction times associated with participant interactions with each of the plurality of media items;
   obtaining a plurality of pop-up percentages applicable to individual media items of the plurality of media items;
   making a determination, for each of the plurality of media items, whether a consumed portion satisfies a corresponding pop-up percentage; and
   transmitting survey content to the participant device in accordance with the determination.

4. The method of claim 1, wherein:
   the time-stamp information includes a time stamp representing an elapsed time between presentation of a designated portion of the media item and occurrence of an event associated with the participant device.

5. A hosting server comprising:
   a processor; a memory coupled to the processor and configured to store a program of instructions executed by the processor; a communications interface coupled to the processor and configured to work in cooperation with the processor to communicate with a participant device via a communications network; the processor configured to:
   stream a plurality of media items to the participant device;
   receive, from the participant device, a plurality of time-stamp information indicating interaction times associated with a participant interaction with each media item, wherein the time-stamp information is received at the hosting server during a time the media item is being streamed to the participant device, wherein the time-stamp information includes a time stamp representing an elapsed time between presentation of a designated portion of each media item and occurrence of an event associated with the participant device;
   for each media item, in response to receiving the time-stamp information: determine, from the time-stamp information, a consumed portion of the media item by determining a time between start and stop actions, the consumed portion of the media item corresponding to a portion of the media item streamed to the participant device prior to the interaction time;
   determine whether the consumed portion of the media item satisfies a threshold pop-up percentage; conditionally transmit survey content to the participant device based on whether the consumed portion of the media item satisfies the threshold pop-up percentage, wherein conditionally transmitting includes:
   transmitting first survey content in response to determining that the threshold pop- up percentage has not been satisfied; and
   transmitting second survey content, different from the first survey content, in response to determining that the threshold pop-up percentage has been satisfied.

6. The hosting server of claim 5, wherein the participant interaction with the media item includes:
a participant making a selection to at least temporarily stop playback of the media item.

7. The hosting server of claim 5, the processor further configured to:
stream a plurality of media items from the hosting server to the participant device;
receive, at the hosting server from the participant device, a plurality of time-stamp information indicating interaction times associated with participant interactions with each of the plurality of media items;
obtain a plurality of pop-up percentages applicable to individual media items of the plurality of media items;
make a determination, for each of the plurality of media items, whether a consumed portion satisfies a corresponding pop-up percentage; and
transmit survey content to the participant device in accordance with the determination.

8. The hosting server of claim 5, wherein:
the time-stamp information includes a time stamp representing an elapsed time between presentation of a designated portion of the media item and occurrence of an event associated with the participant device.

9. A system comprising:
a hosting server including a processor and associated memory;
a participant device, including a processor and associated memory, the participant device
coupled to the hosting server via a communications network;
the participant device configured to execute a survey provided by the hosting server,
wherein executing the survey includes:
generating time-stamp information associated with participant interactions with the survey;
transmitting the time-stamp information to the hosting server
the hosting server configured to:
stream a plurality of media items from to the participant device;
receive, from the participant device, a plurality of time-stamp information indicating interaction times associated with a participant interaction with each media item, wherein the time-stamp information is received at the hosting server during a time the media item is being streamed to the participant device, wherein the time-stamp information includes a time stamp representing an elapsed time between presentation of a designated portion of each media item and occurrence of an event associated with the participant device;
for each media item, in response to receiving the time-stamp information:
determine, from the time-stamp information, a consumed portion of the media item by determining a time between start and stop actions, the consumed portion of the media item corresponding to a portion of the media item streamed to the participant device prior to the interaction time;
determine whether the consumed portion of the media item satisfies a threshold pop-up percentage; and
conditionally transmit survey content to the participant device based on whether the consumed portion of the media item satisfies the threshold pop-up percentage, wherein conditionally transmitting includes:
transmitting first survey content in response to determining that the threshold pop-up percentage has not been satisfied; and
transmitting second survey content, different from the first survey content, in response to determining that the threshold pop-up percentage has been satisfied.

10. The system of claim 9, wherein the participant interaction with the media item includes:
a participant making a selection to at least temporarily stop playback of the media item.

11. The system of claim 9, the hosting server further configured to:
stream a plurality of media items from the hosting server to the participant device;
receive, at the hosting server from the participant device, a plurality of time-stamp information indicating interaction times associated with participant interactions with each of the plurality of media items;
obtain a plurality of pop-up percentages applicable to individual media items of the plurality of media items;
make a determination, for each of the plurality of media items, whether a consumed portion satisfies a corresponding pop-up percentage; and
transmit survey content to the participant device in accordance with the determination.

\* \* \* \* \*